United States Patent [19]

Nakayama et al.

[11] Patent Number: 5,739,961
[45] Date of Patent: Apr. 14, 1998

[54] ZOOM LENS

[75] Inventors: Hiroki Nakayama; Akihisa Horiuchi; Hitoshi Mukaiya, all of Kanagawa-ken; Yasunori Murata, Tokyo; Fumihito Wachi, Kanagawa-ken, all of Japan

[73] Assignee: Canon Kabushiki Kaisha, Tokyo, Japan

[21] Appl. No.: 474,186

[22] Filed: Jun. 7, 1995

Related U.S. Application Data

[62] Division of Ser. No. 149,364, Nov. 9, 1993, abandoned.

[30] Foreign Application Priority Data

| Apr. 30, 1992 | [JP] | Japan | 5-128207 |
| Nov. 13, 1992 | [JP] | Japan | 4-303929 |
| Nov. 13, 1992 | [JP] | Japan | 4-303938 |
| Nov. 13, 1992 | [JP] | Japan | 4-303939 |
| Apr. 30, 1993 | [JP] | Japan | 5-128205 |
| Apr. 30, 1993 | [JP] | Japan | 5-128206 |
| Apr. 30, 1993 | [JP] | Japan | 5-128208 |
| Apr. 30, 1993 | [JP] | Japan | 5-128213 |

[51] Int. Cl.$^6$ ............................................. G02B 15/14
[52] U.S. Cl. ................................. 359/687; 359/684
[58] Field of Search ................................. 359/684, 687

[56] References Cited

U.S. PATENT DOCUMENTS

| 5,138,492 | 8/1992 | Hamano et al. | 359/690 |
| 5,191,476 | 3/1993 | Sato | 359/687 |
| 5,247,393 | 9/1993 | Sugawara | 359/690 |

FOREIGN PATENT DOCUMENTS

| 56-048607 | 5/1981 | Japan. |
| 57-111507 | 7/1982 | Japan. |
| 58-160913 | 9/1983 | Japan. |
| 61-296317 | 12/1986 | Japan. |
| 62-24213 | 2/1987 | Japan. |
| 62-247316 | 10/1987 | Japan. |
| 63-247316 | 10/1988 | Japan. |
| 3158813 | 7/1991 | Japan. |
| 3200113 | 9/1991 | Japan. |
| 3215810 | 9/1991 | Japan. |
| 5-60971 | 3/1993 | Japan. |
| 5-60972 | 3/1993 | Japan. |

*Primary Examiner*—Georgia Y. Epps
*Assistant Examiner*—Dawn-Marie Bey
*Attorney, Agent, or Firm*—Fitzpatrick, Cella, Harper & Scinto

[57] ABSTRACT

A zoom lens includes, from front to rear, a first lens unit having a positive refractive power, a second lens unit having a negative refractive power, a third lens unit having a positive refractive power and a fourth lens unit having a positive refractive power, at least the second and fourth lens units being moved to effect zooming, wherein the maximum image angle is increased while the diameter of the first lens unit is extremely reduced.

4 Claims, 56 Drawing Sheets

ZOOM LENS

This application is a division of application Ser. No. 08/149,364, filed Nov. 9, 1993, abandoned.

BACKGROUND OF THE INVENTION

1. Field of the Invention

This invention relates to zoom lenses of the rear focus type and, more particularly, to a zoom lens of the rear focus type suited to cameras for photography or video cameras, which has a wide image angle ($2\omega \geq 65°$ in the wide-angle end) and a high range (of 10 or above), while still maintaining a minimization of the diameter of the front lens element to be achieved, thus contributing to a compact form as a whole.

2. Description of the Related Art

Recently, the domestic video camera has its body decreased in size and weight. Along with this, a remarkable advance has come even in making the photographic lens of zoom type therefor in compact form, as much effort is devoted particularly to shortening of the physical length, minimization of the diameter of the front lens element, and reduction of the complexity of structure.

To accomplish these ends at once, the focusing provision is made in other than the front or first lens unit. The zoom lenses employing such a means are known to be of the so-called rear focus type.

In general, the use of the rear focus type in zoom lens makes the effective diameter of the first lens unit smaller than when the first lens unit is movable for focusing. Thus, it facilitates a compact form of the entirety of the lens system. It also makes it possible to do close-up photography, particularly photomacrography. Further, because the focusing lens unit is relatively small in size and light in weight, a small driving power suffices for moving that lens unit, giving yet another advantage of enabling fast focus adjustment to be done.

A zoom lens of such rear focus type is disclosed in, for example, Japanese Laid-Open Patent Applications No. Sho 62-24213 and No. Sho 62-247316, comprising, from front to rear, a positive first lens unit, a negative second lens unit, a positive third lens unit and a positive fourth lens unit, wherein the second lens unit is moved to vary the focal length, while the fourth lens unit compensates for the shift of an image plane with zooming and serves to effect focusing.

In Japanese Laid-Open Patent Application No. Sho 58-160913, a zoom lens comprises, from front to rear, a first lens unit of positive refractive power, a second lens unit of negative refractive power, a third lens unit of positive refractive power and a fourth lens unit of positive refractive power. The first and second lens units are moved to vary the focal length, while simultaneously moving the fourth lens unit to compensate for the image shift with zooming. Of these lens units, one or two lens units are moved to effect focusing. However, the examples described above, because of their putting most of the varifocal function in the lens unit on the object side of an aperture stop, necessitate a large space between the front lens element and the aperture stop in the wide-angle positions. This tends to deepen the position of an entrance pupil of the entire system. Hence, the first lens element has to get a huge diameter.

Meanwhile, there is a previous proposal in Japanese Laid-Open Patent Application No. Sho 61-296317 that a lens unit behind the aperture stop is made axially movable for zooming to take a share of the varifocal function, thereby shortening the distance from the front lens element to the aperture stop. Thus, a zoom lens whose front lens element has its diameter reduced to a minimum is obtained.

In such prior known zoom lenses, however, the operating mechanism tends to be complicated in structure, because the lens units movable for zooming lie on both sides of the aperture stop which is stationary during zooming. Again, the first lens unit is used in focusing. To admit a light beam going to the corner of the image frame with an object at a minimum distance, the diameter of the front lens element is, therefore, increased largely. If the diameter of the front lens element is reduced by adopting the rear focus type, the refractive power arrangement will be found to be far from the most appropriate one. Another problem arises in that the variation of aberrations with focusing is not corrected well enough.

Japanese Laid-Open Patent Application No. Sho 56-48607 (Patent Publication No. Sho 61-44288), has, on the other hand, made a proposal in view of the zoom lens comprising, from front to rear, a first lens unit of positive refractive power which is stationary during zooming and movable for focusing, a second lens unit of negative refractive power movable for variation of the focal length, a third lens unit movable for maintaining the constant position of the image plane and a fourth lens unit of positive refractive power which is stationary during zooming. In this proposal, if, as the diameter of the axial light beam becomes largest in the wide angle end or somewhat zoomed positions therefrom, the stop that lies in front of the relay lens is moved forward, the diameter of the front lens element is advantageously shortened. In its embodiments, therefore, the stop is made to move. Further, it is also proposed that the stop and the third lens unit are moved in unison. Since, however, focusing is done by the first lens unit, the diameter of the front lens element is increased so as to admit the oblique beam to the marginal zone for the object at the minimum distance. So, attempts have been made to reduce the diameter of the front lens element by employing the rear focus type. However, alternative problems have arisen in that the refractive power arrangement is not most suited to it, and that sufficient stability of correction of aberrations is not maintained over the extended focusing range by using the rear focus type.

To a similar aim, another Japanese Laid-Open Patent Application No. Sho 57-111507 has even made a proposal that a zoom lens is constructed with a first lens unit of positive refractive power for focusing which is stationary during zooming and movable for focusing, a second lens unit of negative refractive power and a third lens unit of positive refractive power, the second and third lens units being moved in opposite directions during zooming, and the third lens unit being comprised of two positive components which move in differential relation, that is, in the form of four components of plus-minus-plus-plus arrangement. In this proposal, the aperture stop is positioned within the third lens unit. With this construction and arrangement, however, because the second and third lens units move in opposite directions to each other, there is need to widen the space between the second and third lens units in the wide-angle end. Also, because the stop takes its place in the third lens unit, the entrance pupil comes to the rearmost position in the wide-angle end. This is not suited to minimize the diameter of the front lens element and the physical length of the entire system. This zoom lens, too, has the first lens unit used as the focusing lens. Therefore, the diameter of the front lens element must be increased greatly. Otherwise, for the minimum object distance, the corner illumination would be far less than the central one. If the rear focus type is adopted to overcome this problem, the refractive power arrangement will fail to be most suited to minimize that diameter. Another alternative problem arises in that the change to the rear focusing leaves the variation of aberrations with focusing not sufficiently corrected.

Again, even in Japanese Laid-Open Patent Application No. Hei 3-200113, with the use of a similar feature, a proposal is made that a zoom lens comprises, from front to rear, a positive first lens unit which is stationary during zooming, a negative second lens unit which moves axially back and forth to vary the focal length, a positive third lens unit which moves in association with the movement of the second lens unit, and a positive fourth lens unit which is either partly or entirely moved to compensate for the image shift with variation of the focal length. According to this proposal, the movement of the third lens unit in association with the movement of the second lens unit is made for the purpose of reducing the burden on the fourth lens unit of compensating for the image shift and letting the third lens unit have its share of the compensating function. In more detail, it is desirable that the third lens unit moves forward when zooming goes from an intermediate position to the telephoto end. With this feature, however, similarly to the prior known example described above, the second and third lens units move in opposite directions. To permit this, therefore, the separation between the second and third lens units must be widened in the region of the wide-angle side. This implies that the entrance pupil takes its place at the rearmost position in the wide-angle end. This situation is not favorable to minimization of the diameter of the front lens element and of the physical length of the entire system.

Japanese Laid-Open Patent Application No. Hei 3-158813 also discloses a similar zoom lens which comprises, from from to rear, a positive first lens unit, a negative second lens unit, a positive third lens unit and a positive fourth lens unit, the second and third lens units being moved axially to vary the focal length and the aperture stop being moved in unison with the third lens unit. According to its proposal, the separation between the second and third lens units decreases when zooming from the wide-angle end to the telephoto end. Even in the embodiments thereof, the third lens unit having the aperture stop takes its place at the rearmost position in the wide-angle end. For the wide-angle end or a more or less zoom position therefrom at which the axial beam becomes largest in diameter, the neighborhood of the third lens unit in which the aperture stop lies is brought nearest to the image plane. As this means that the entrance pupil is deepened, the diameter of the front lens element is difficult to shorten. Moreover, large distortion appears. Hence, there is a drawback that it is not suited to a shortening of the diameter of the front lens element and a minimization of the size of the entire system.

In addition to these, Japanese Laid-Open Patent Application No. Hei 3-215810 has made a proposal in a zoom lens of the rear focus type which comprises, from front to rear, a first lens unit of positive refractive power, a second lens unit of negative refractive power, a stop, a third lens unit of positive refractive power and a fourth lens unit of positive refractive power. When zooming from the wide-angle end to the telephoto end, the second lens unit is moved toward the image side, while the stop and the third and fourth lens units are simultaneously moved in respective different loci convex toward the object side and in differential relation to one another. The fourth lens unit is also moved for focusing. According to this proposal, a necessity arises in that a reasonable space between the stop and the third lens unit be created. Further, the second lens unit, the stop, the third lens unit and the fourth lens unit move independently of one another, and the differences between the shapes of the movement loci are very appreciable. This leads to another disadvantage of increasing the complexity of structure of the operating mechanism. In addition, because the third lens unit and the stop move axially in different ways during zooming, the pupil varies its position relative to the third lens unit. So, the spherical, comatic and longitudinal chromatic aberrations whose variation is to be controlled by the third lens unit increase greatly. Again, as far as these features are concerned, for the maximum image angle to increase ($2\omega \geq 60°$), much improvement yet remains to be made, since the power arrangement and the relation in which the lens units move are found not to be most suited to the much desired increase of the maximum image angle.

As has been discussed above, in the zoom lens in general, the so-called rear focus type is more suited than focusing by the first lens unit to achieve the simultaneous fulfillment of the requirements of shortening the size of the entire system and of minimizing the diameter of the front lens element.

In the prior art, for example, the above-mentioned Japanese Laid-Open Patent Applications No. Sho 62-24213 and No. 62-247316, attempts are made to further increase the maximum image angle. In an intermediate region of the zooming range nearer to the wide-angle end, however, the height of incidence of the off-axial light beam on the first lens unit becomes higher. As a result, the effective diameter of the first lens unit comes to increase. As a countermeasure to this, the separation between the first lens unit and the stop may be shortened. However, the second lens unit that takes the main part of the function of varying the focal length lies in between the first lens unit and the stop. The decreasing of the separation between the first lens unit and the stop, therefore, leads to an insufficient space for the zooming movement of the second lens unit, thus sacrificing the assurance of the desired zoom ratio, particularly, of 10 or more. To obtain the desired zoom ratio under the condition that the separation between the first lens unit and the stop is shortened, the second lens unit has to get a stronger negative refractive power, which causes the Petzval sum to increase in the negative sense. So, the curvature of field tends to be over-corrected. Moreover, the sensitivity of the second lens unit to the shift of an image plane gets higher. The tolerances to which the lens unit is manufactured becomes too severe to be acceptable.

SUMMARY OF THE INVENTION

An object of the present invention is to overcome the above-described drawbacks of the conventional examples and, in particular, to achieve improvements of the above-mentioned Japanese Laid-Open Patent Application No. Hei 3-215810. Another object of the present invention is to provide a zoom lens which has its front lens element decreased in the diameter, while still assuring the maximum image angle to be increased (to $2\omega > 65°$) at a high range (of not less than 10). Still another object of the present invention is to provide a zoom lens whose size and weight are minimized in such a manner that good performance is maintained throughout the entire zooming range and the entire focusing range.

In each of the views and graphic representations of the lenses, I denotes the first lens unit, II the second lens unit, III the third lens unit, and IV the fourth lens unit. S stands for the sagittal image surface, M for the meridional image surface, d for the spectral d-line and g for the spectral g-line.

DETAILED DESCRIPTION OF THE PREFERRED EMBODIMENTS

Figure 1A:
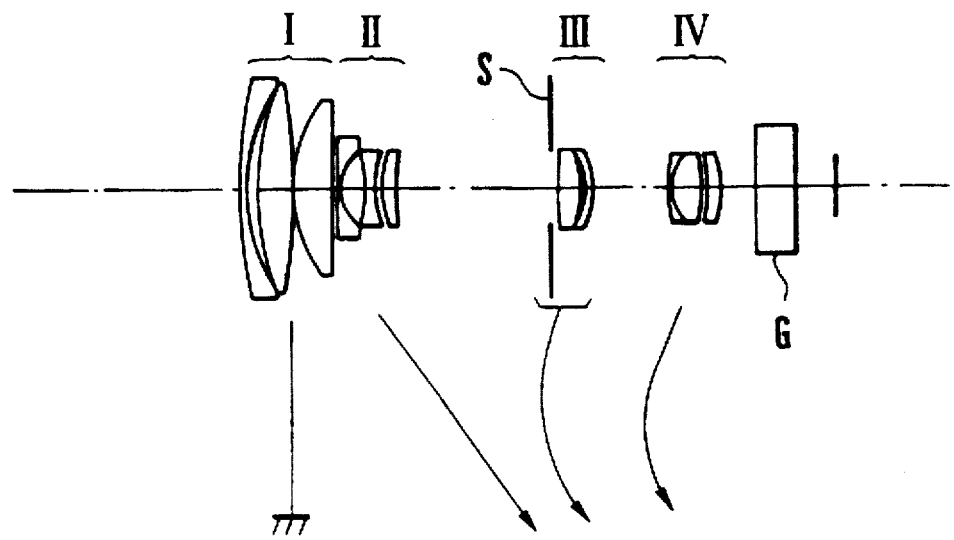
FIGS. 1(A) to 1(D) show a numerical example 1 of a zoom lens of the invention with FIG. 1(A) being a longitudinal section view and FIGS. 1(B), 1(C) and 1(D) graphic representations of the aberrations in the wide-angle end, an intermediate position and the telephoto end, respectively.
Figure 1B:
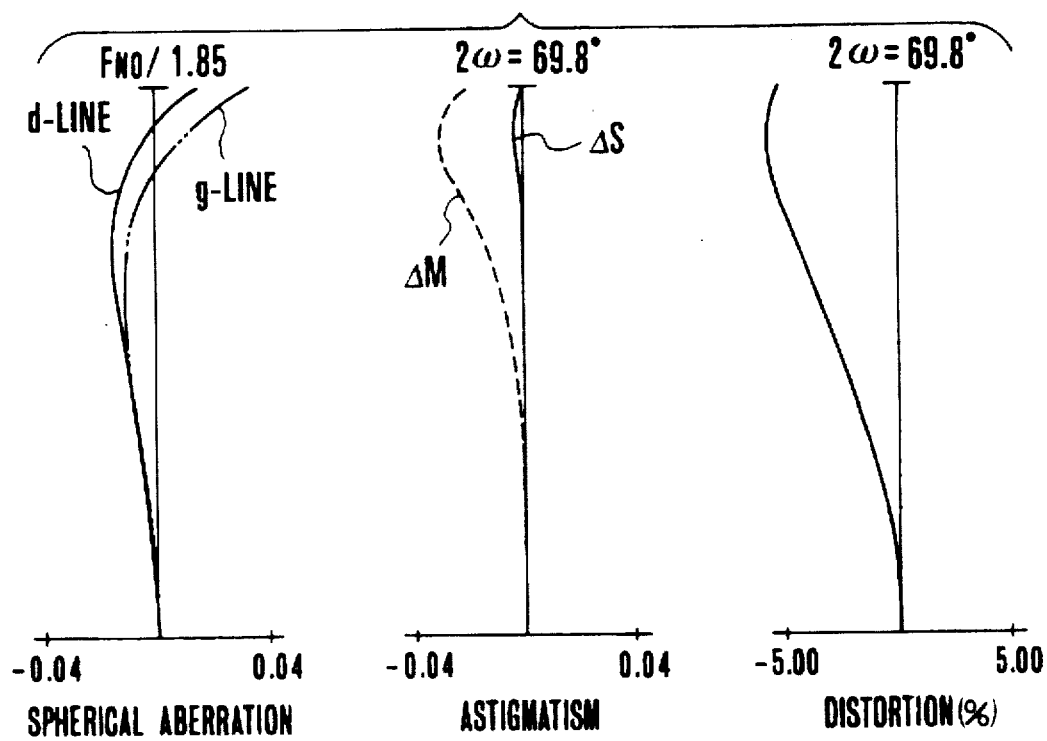
Figure 1C:
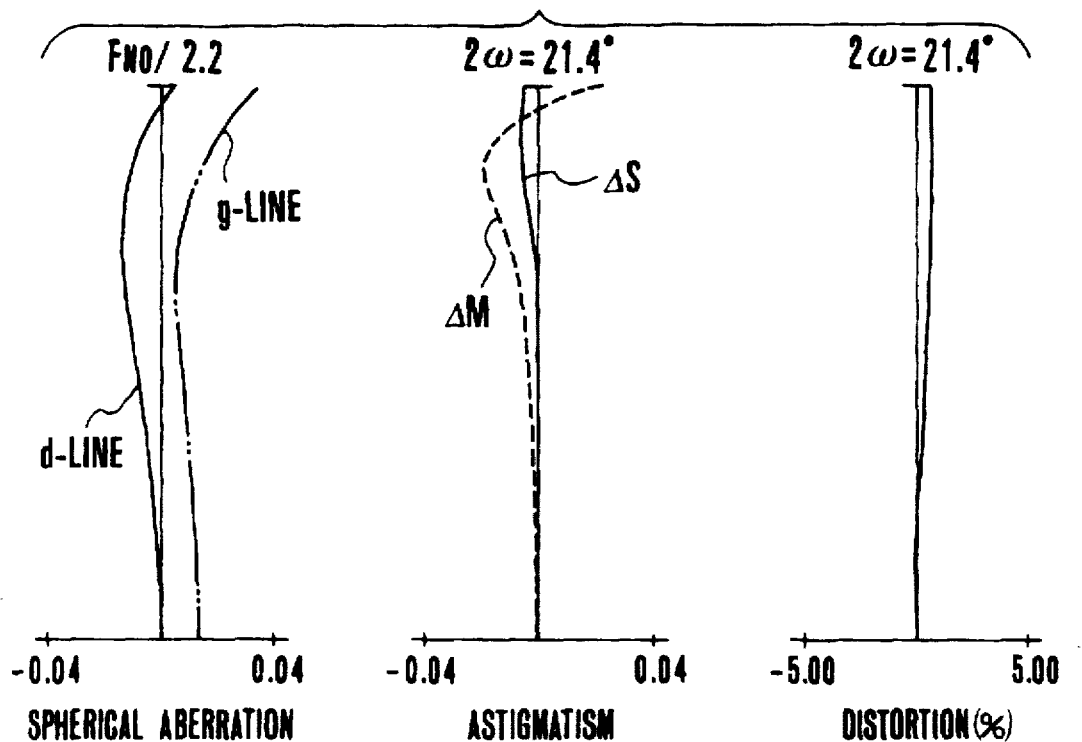
Figure 1D:
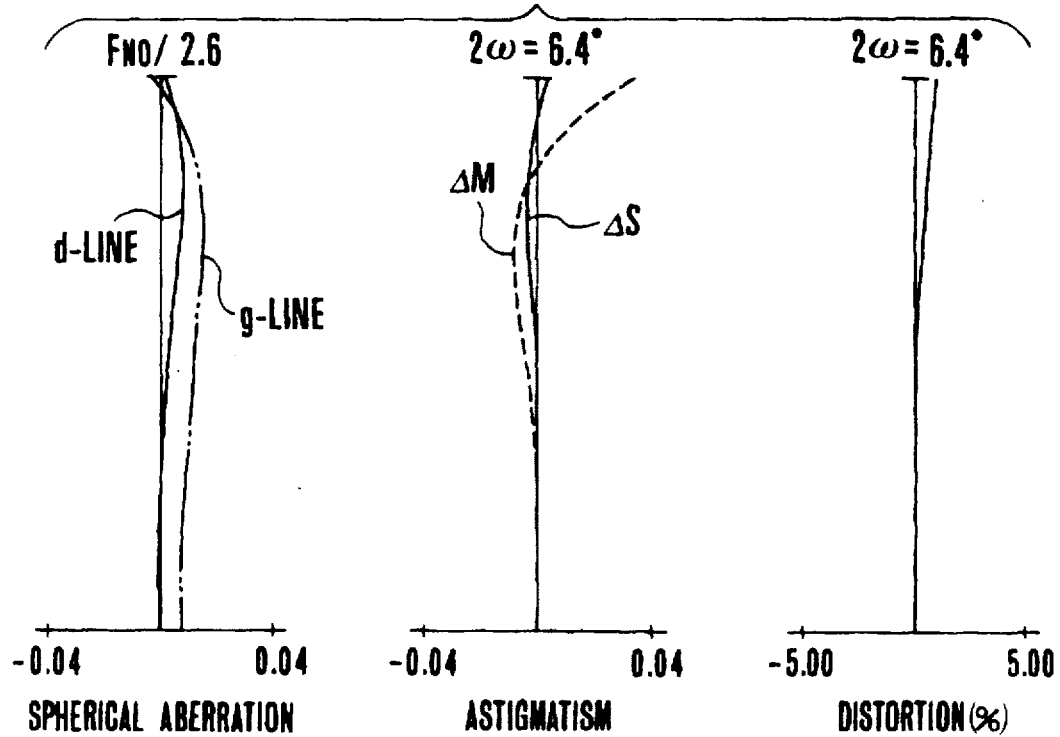
Figure 2A:
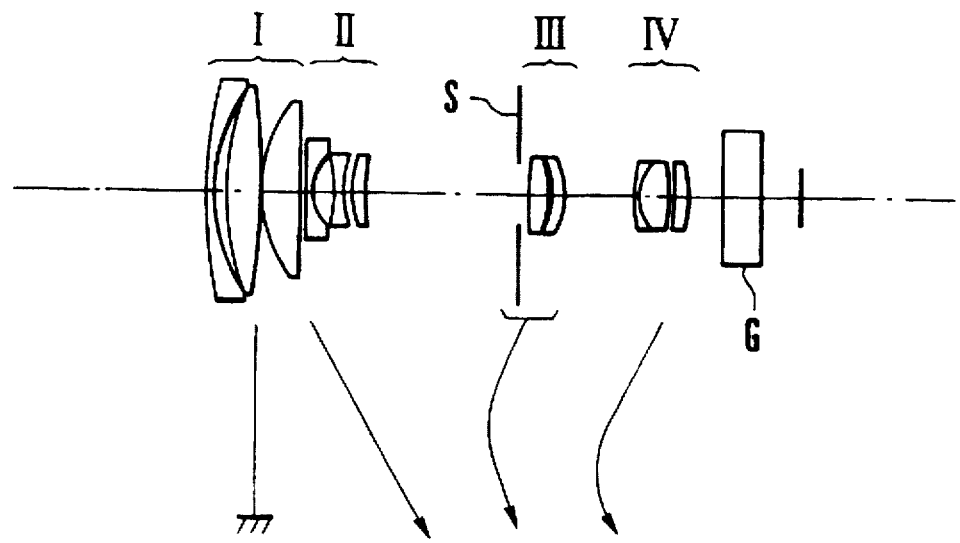
FIGS. 2(A) to 2(D) show a numerical example 2 of a zoom lens of the invention with FIG. 2(A) being a longitudinal section view and FIGS. 2(B), 2(C) and 2(D) graphic representations of the aberrations in the wide-angle end, an intermediate position and the telephoto end, respectively.
Figure 2B:
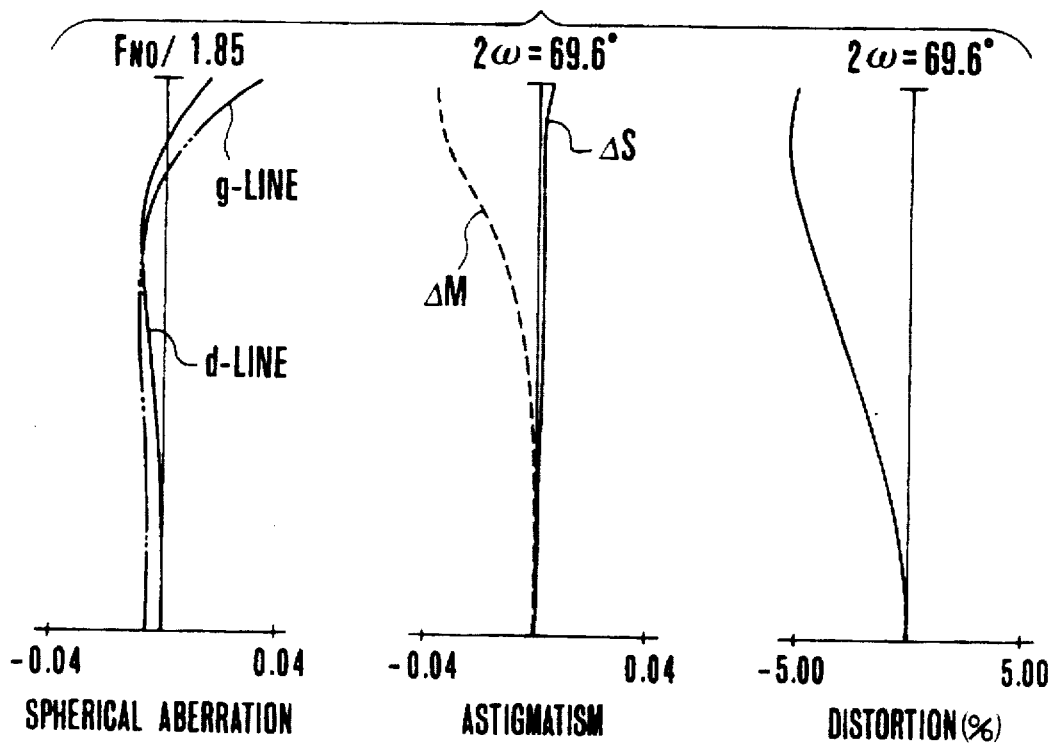
Figure 2C:
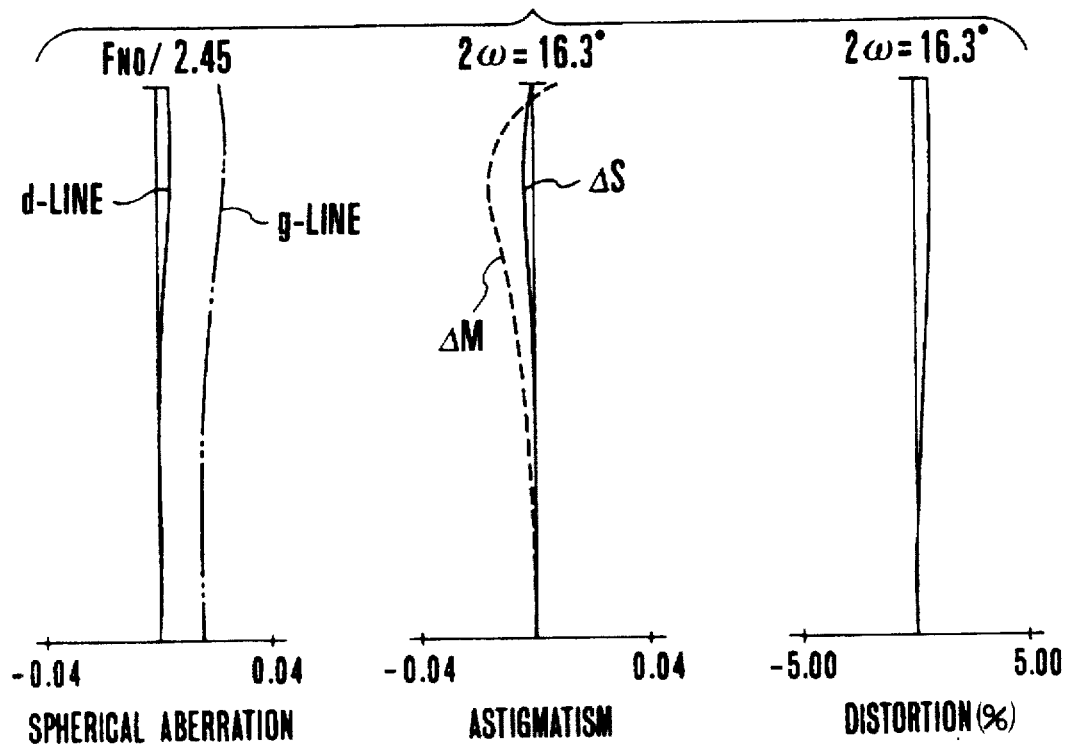
Figure 2D:
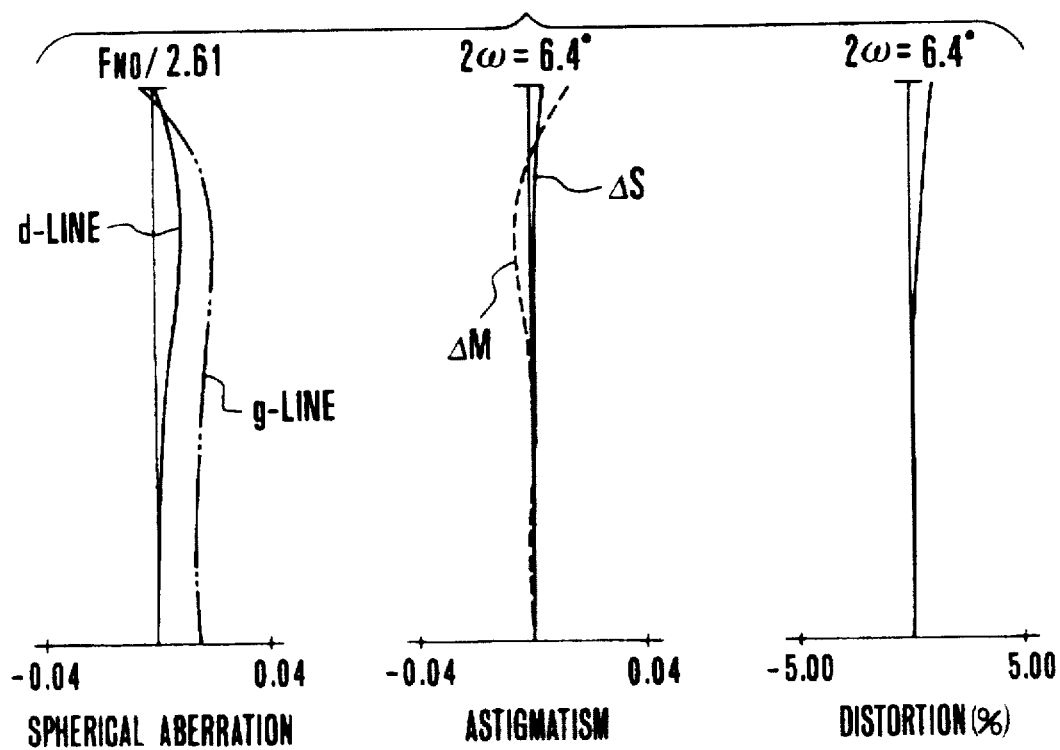
Figure 3A:
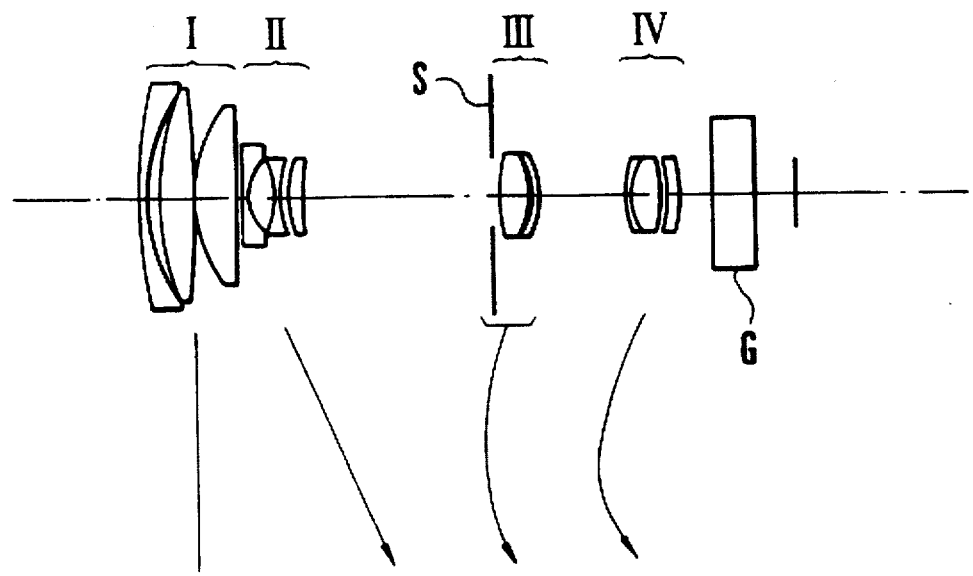
FIGS. 3(A) to 3(D) show a numerical example 3 of a zoom lens of the invention with FIG. 3(A) being a longitudinal section view and FIGS. 3(B), 3(c) and 3(D) graphic representations of the aberrations in the wide-angle end, an intermediate position and the telephoto end, respectively.
Figure 3B:
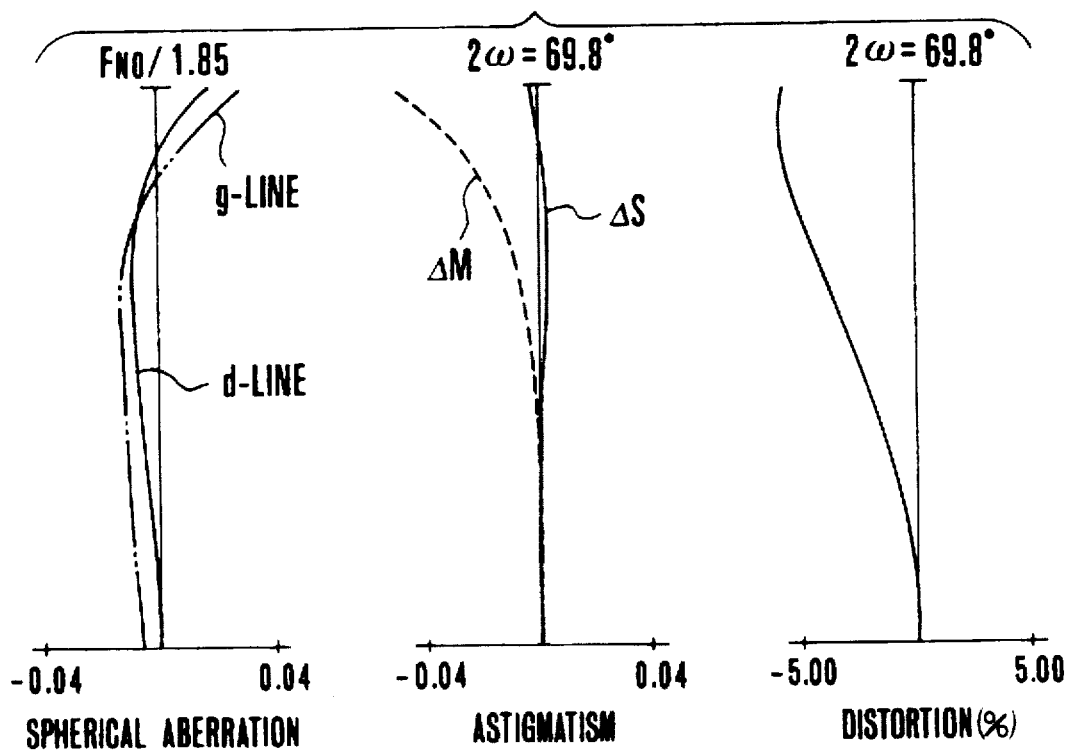
Figure 3C:
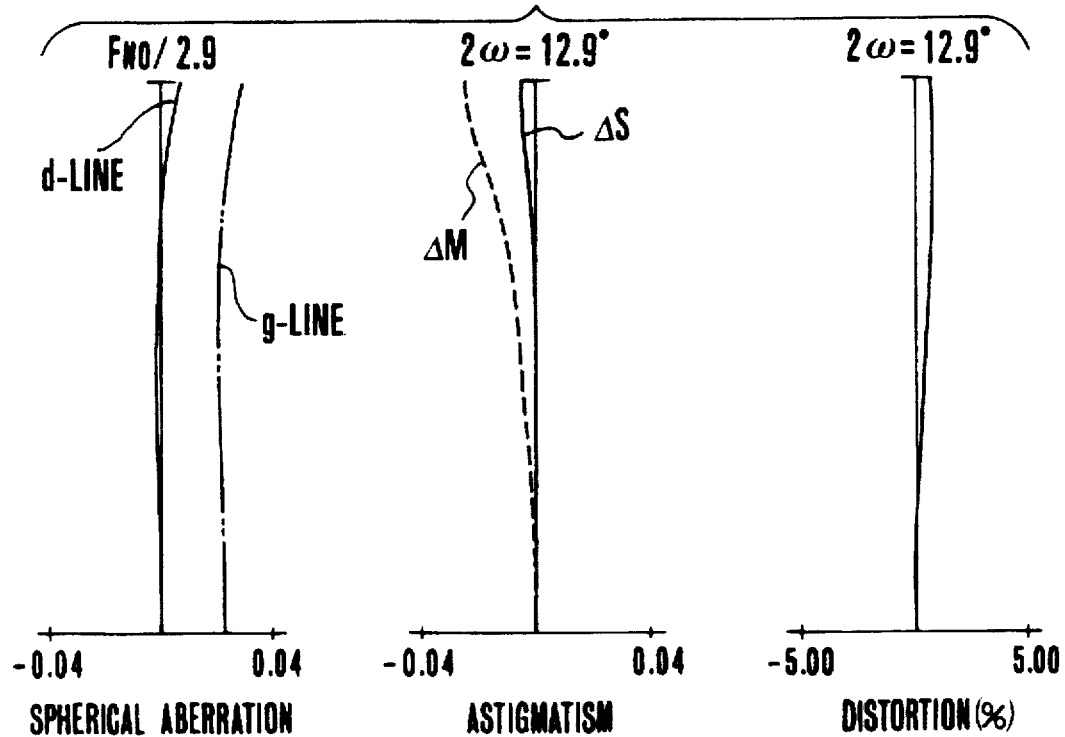
Figure 3D:
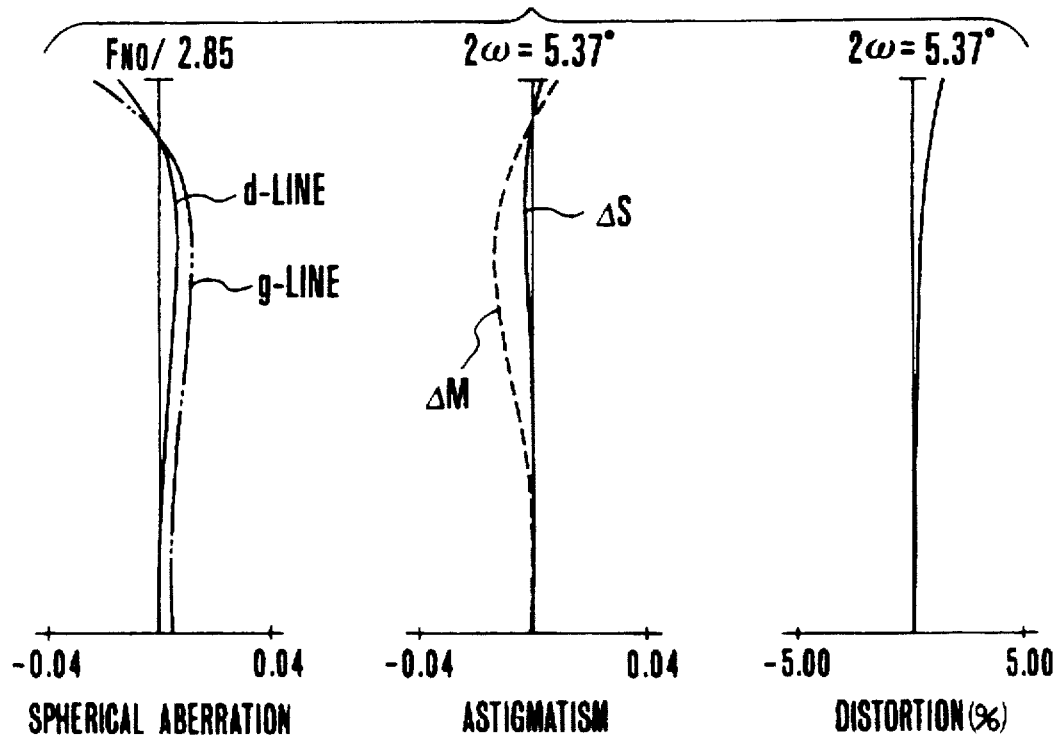
Figure 4A:
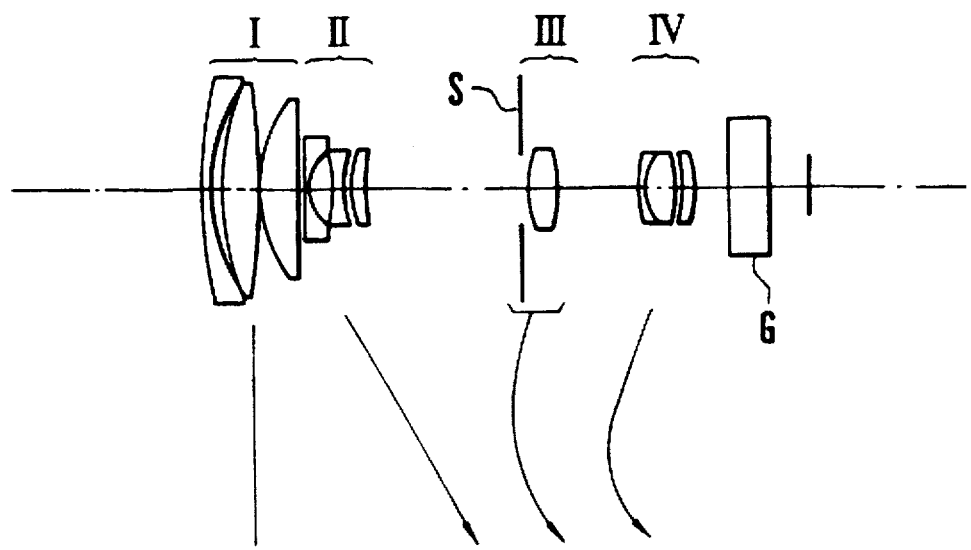
FIGS. 4(A) to 4(D) show a numerical example 4 of a zoom lens of the invention with FIG. 4(A) being a longitudinal section view and FIGS. 4(A), 4(B) and 4(D) graphic representations of the aberrations in the wide-angle end, an intermediate position and the telephoto end, respectively.
Figure 4B:
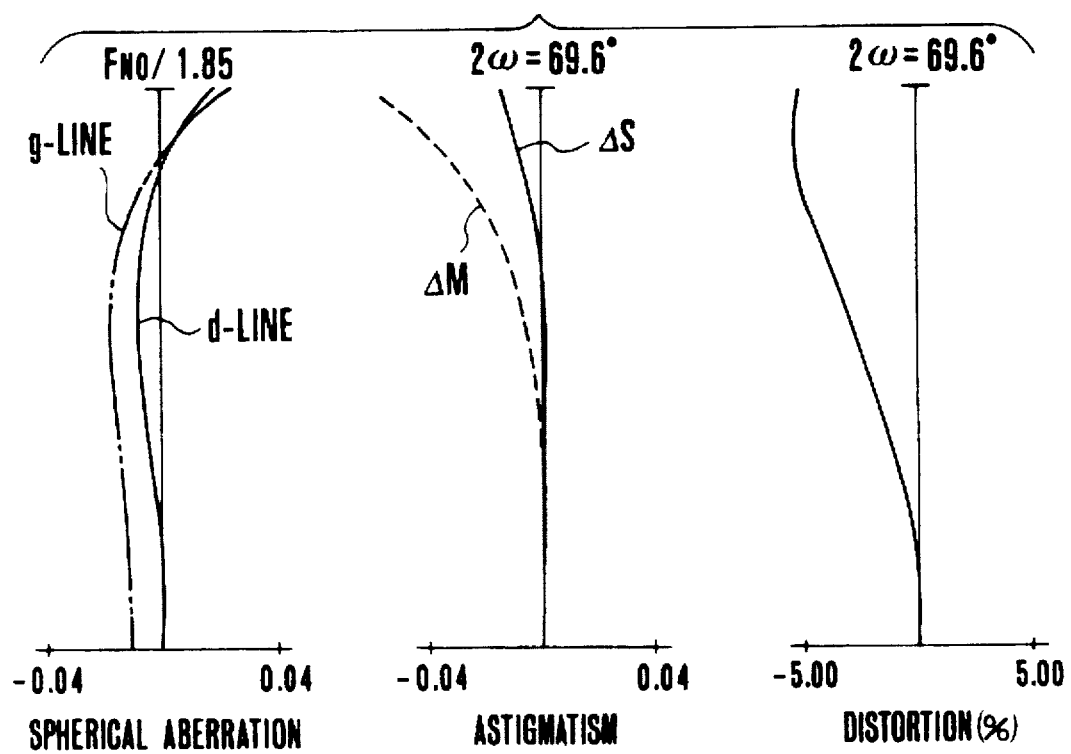
Figure 4C:
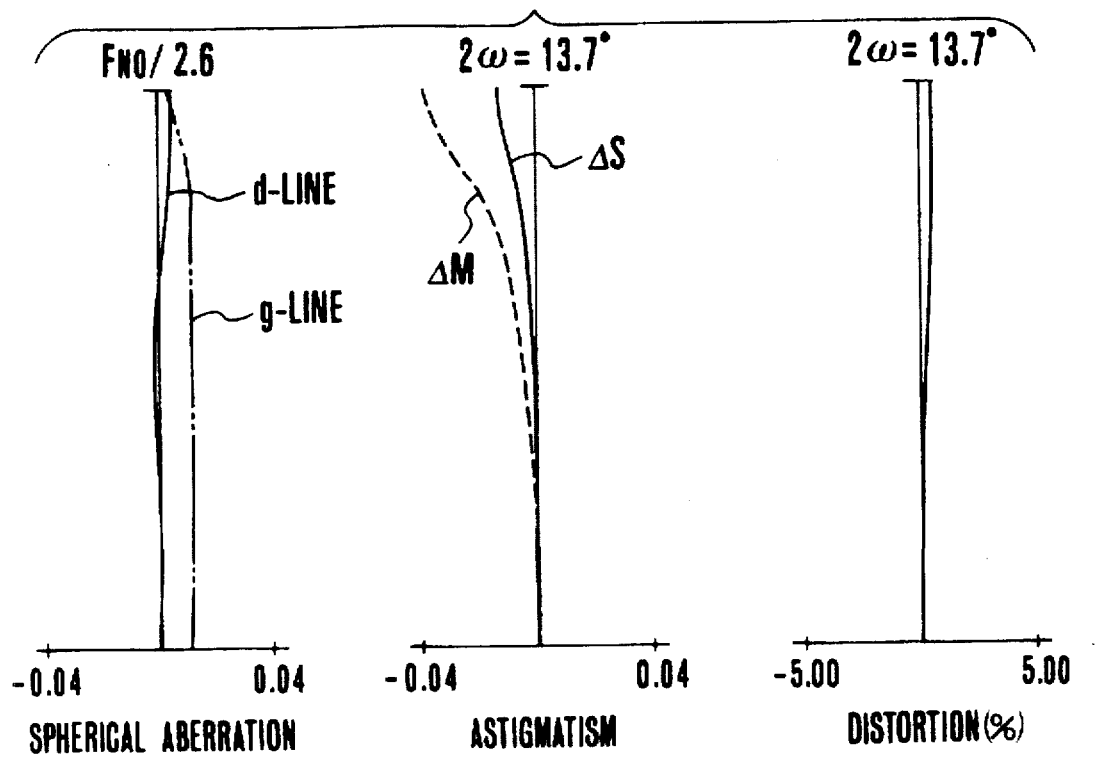
Figure 4D:
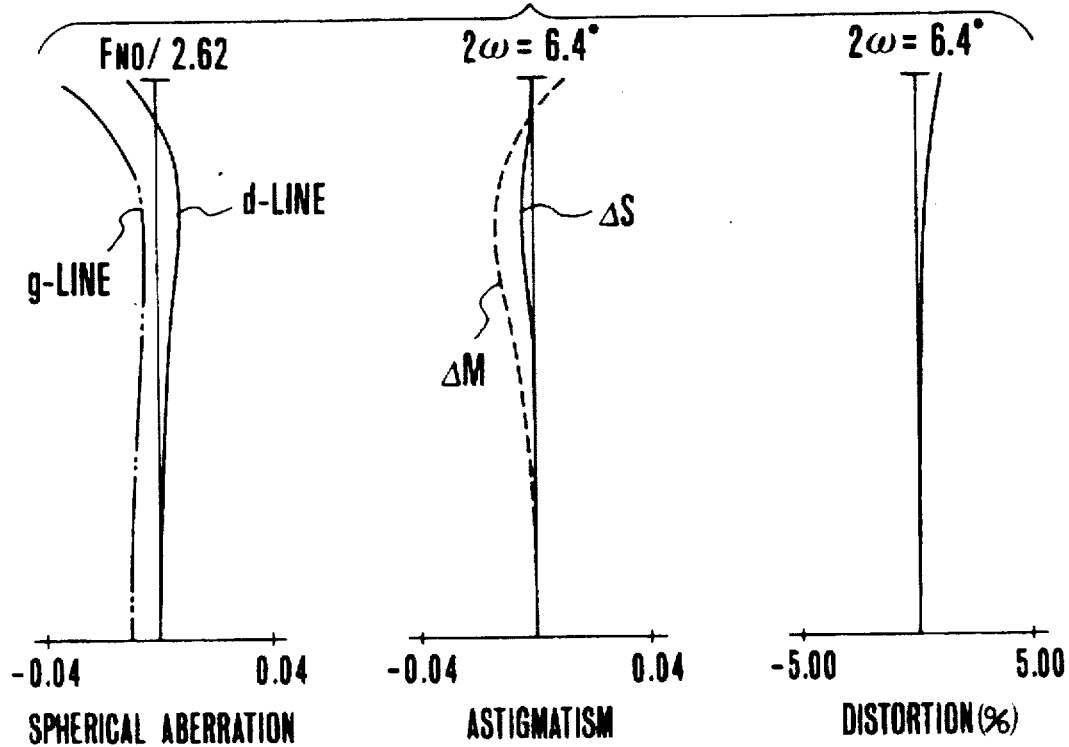
Figure 5A:
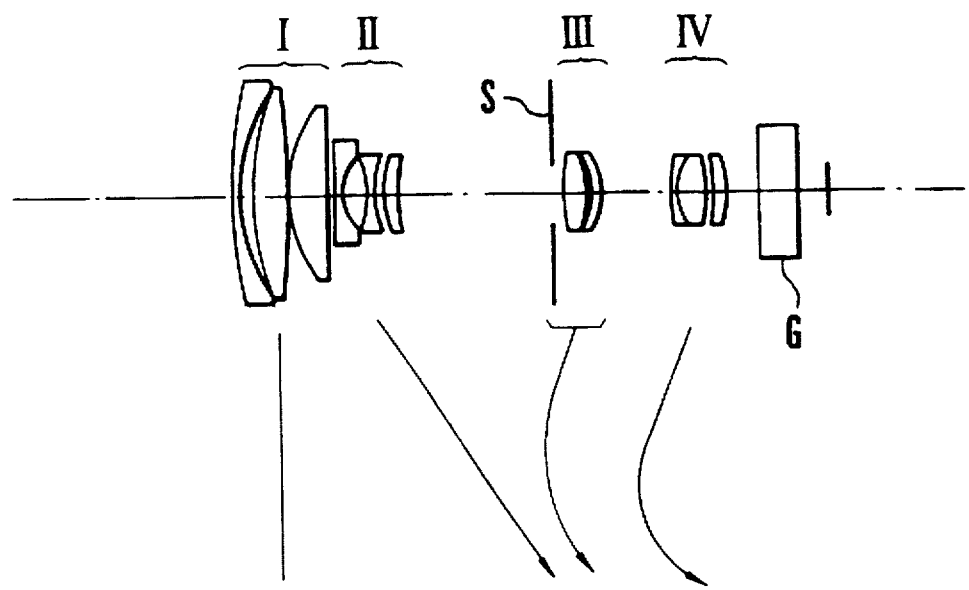
FIGS. 5(A) to 5(D) show a numerical example 5 of a zoom lens of the invention with FIG. 5(A) being a longitudinal section view and FIGS. 5(B), 5(C) and 5(D) graphic representations of the aberrations in the wide-angle end, an intermediate position and the telephoto end, respectively.
Figure 5B:
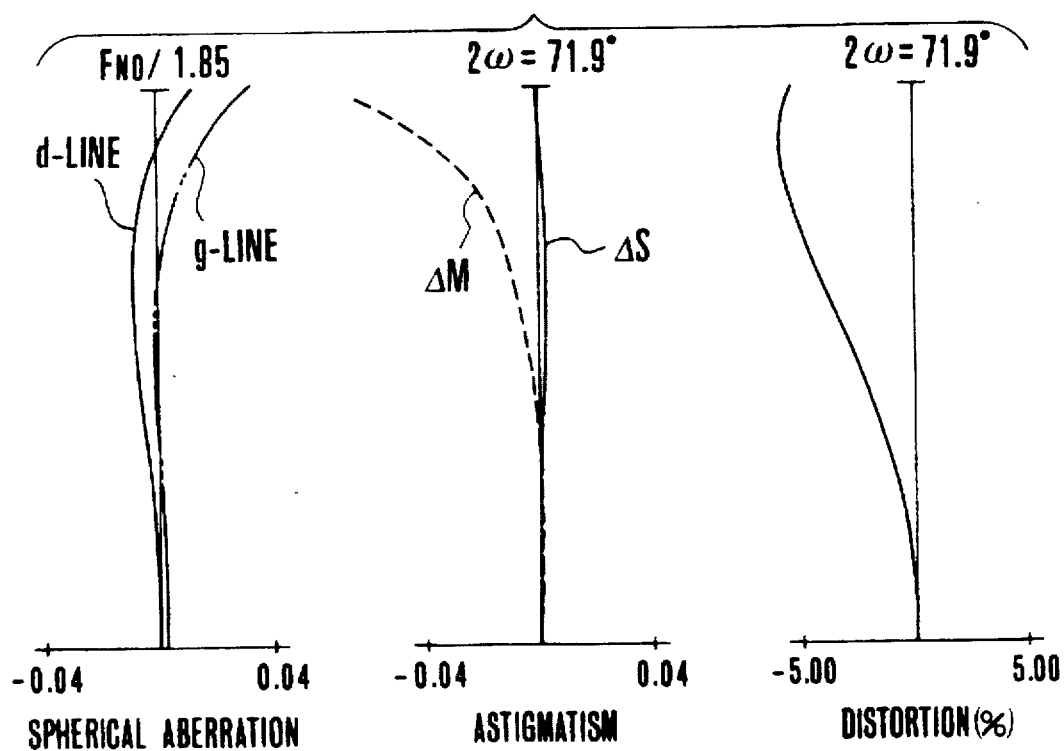
Figure 5C:
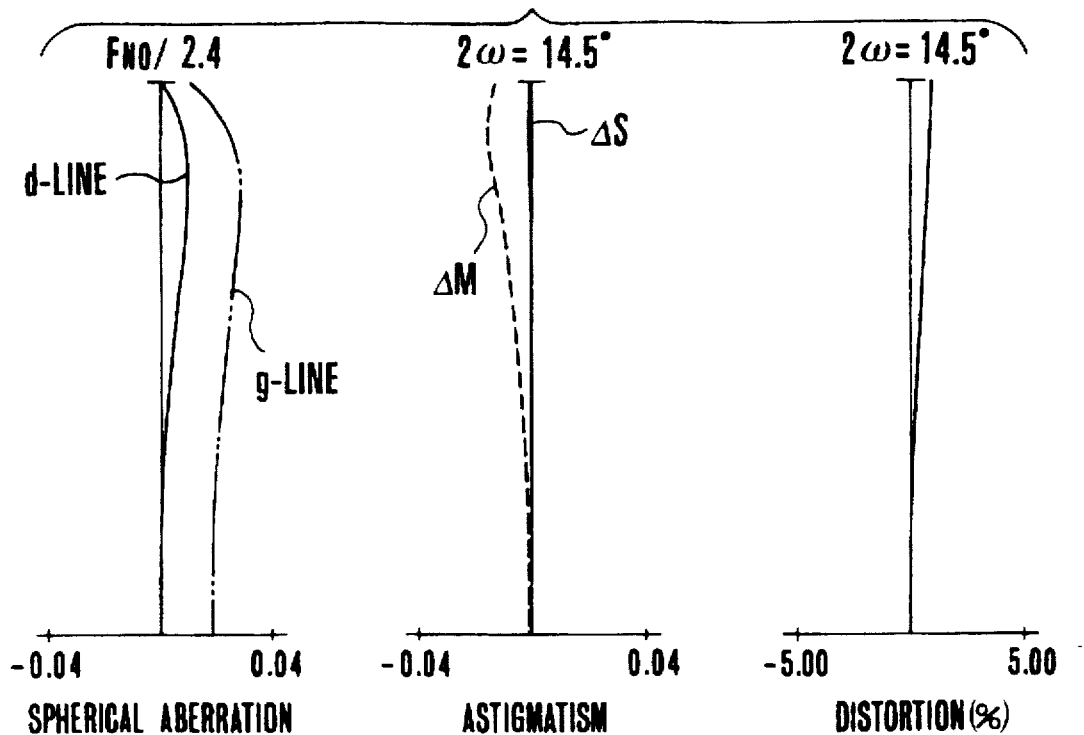
Figure 5D:
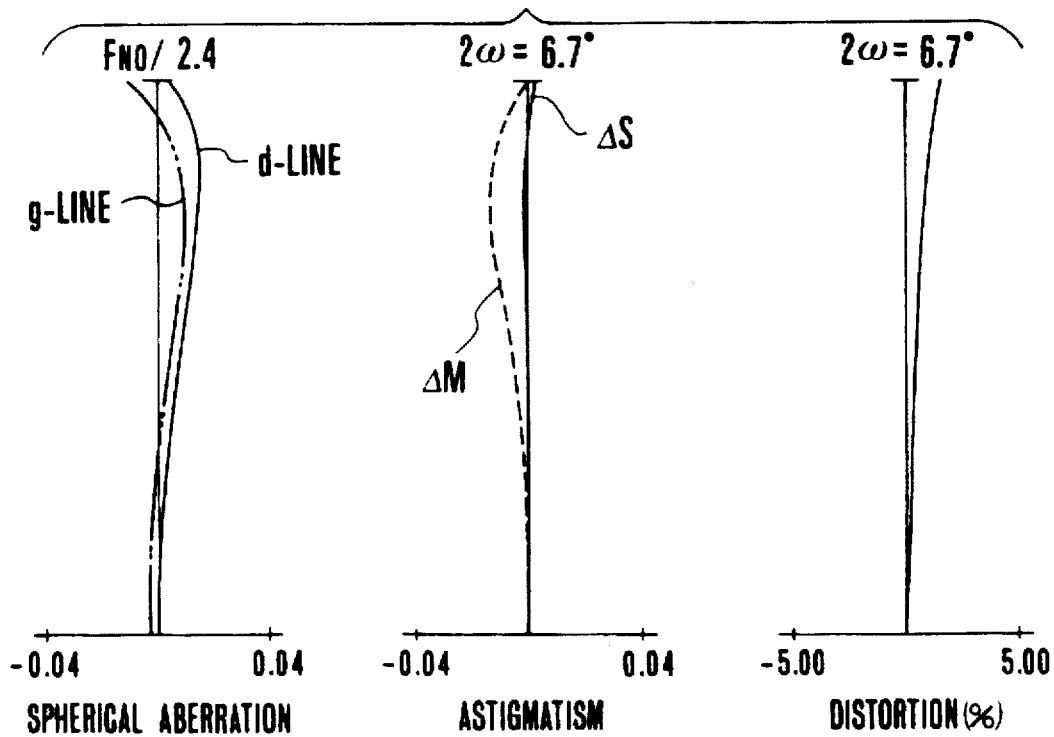
Figure 6A:
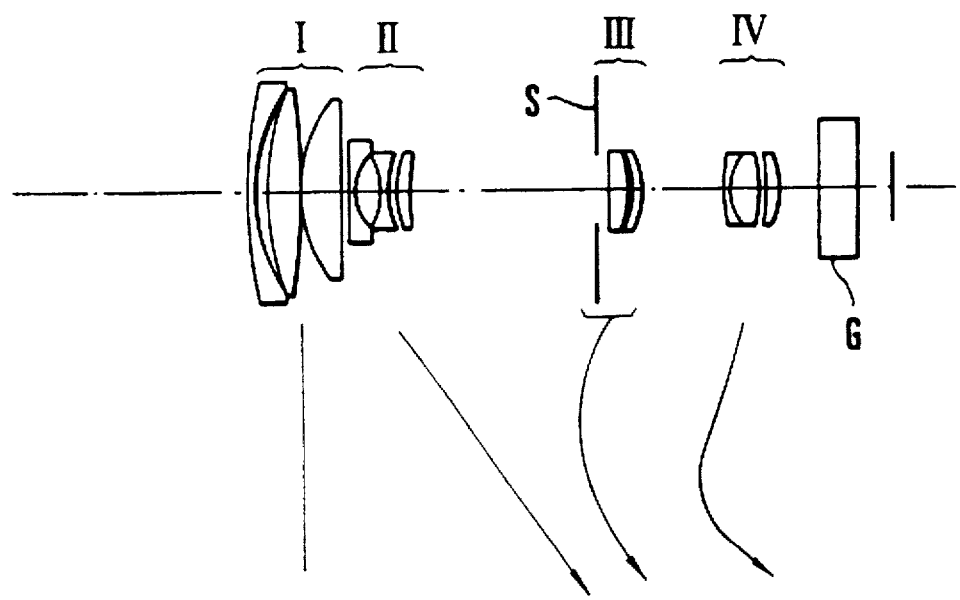
FIGS. 6(A) to 6(D) show a numerical example 6 of a zoom lens of the invention with FIG. 6(A) being a longitudinal section view and FIGS. 6(B), 6(C) and 6(D) graphic representations of the aberrations in the wide-angle end, an intermediate position and the telephoto end, respectively.
Figure 6B:
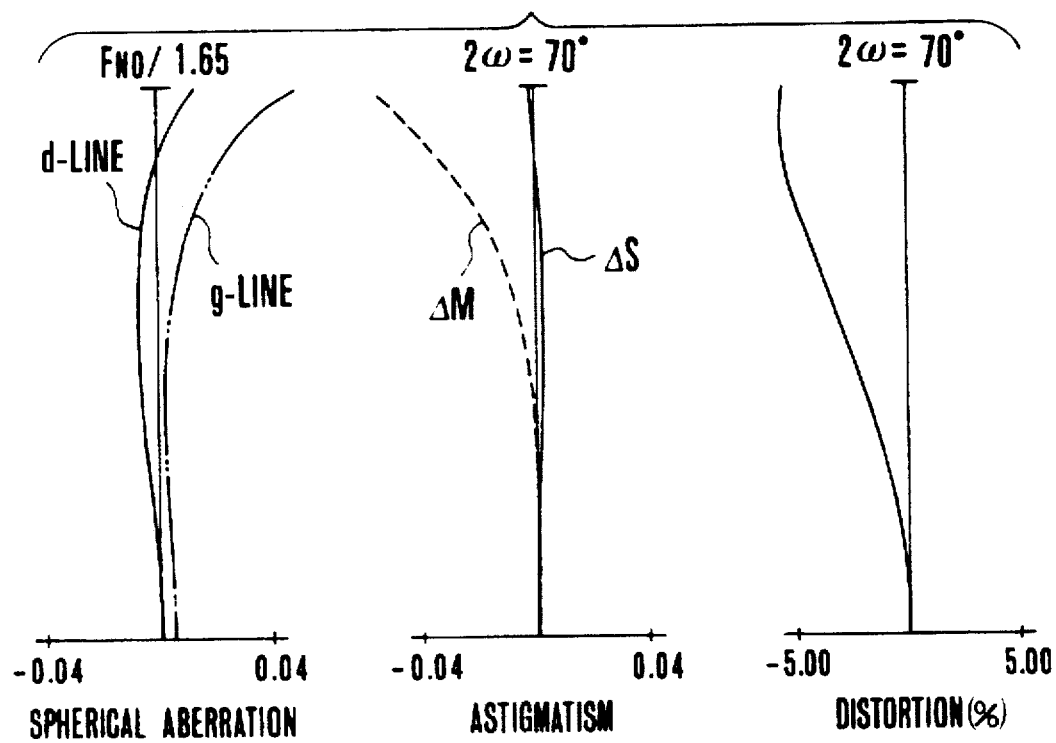
Figure 6C:
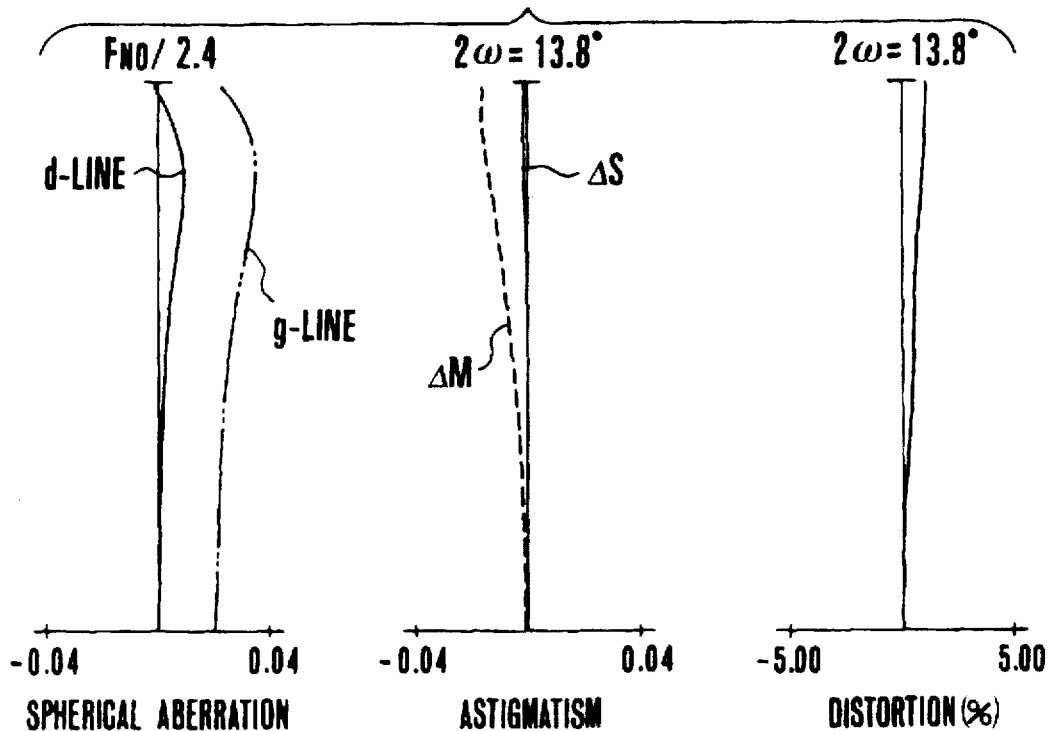
Figure 6D:
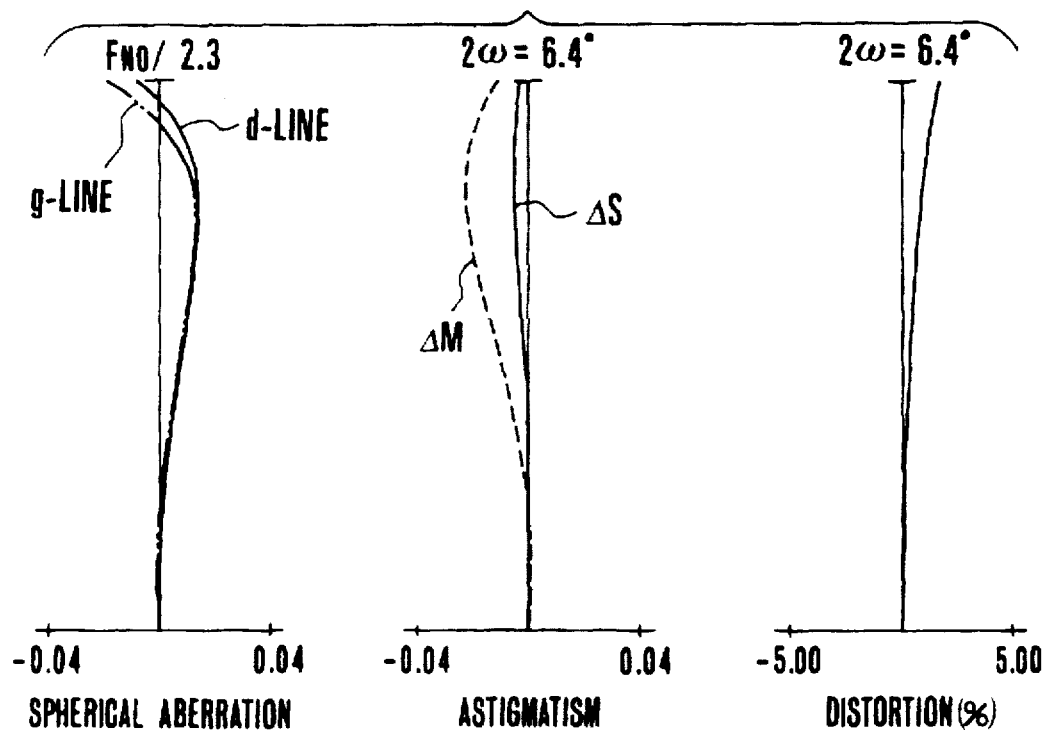
Figure 7A:
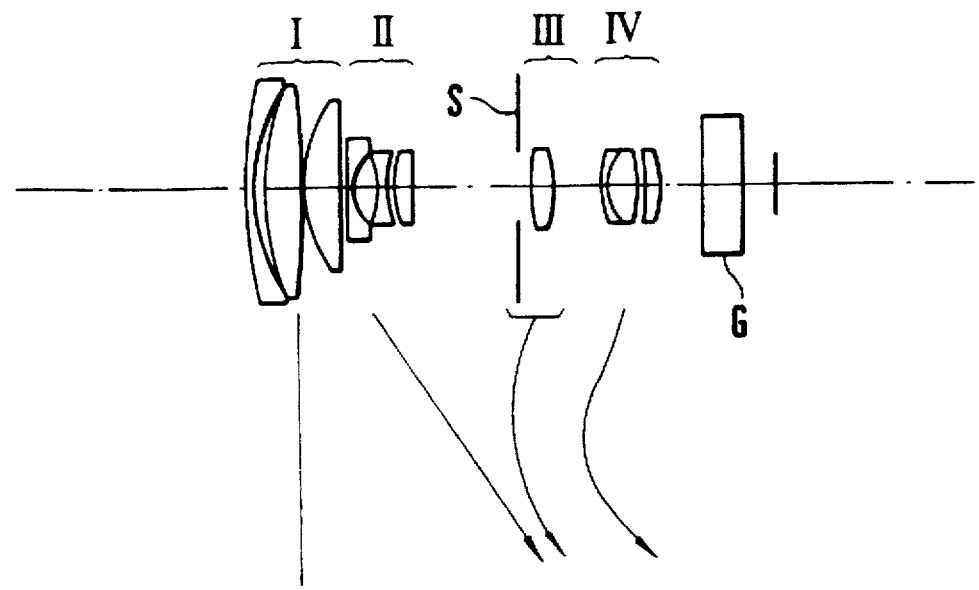
FIGS. 7(A) to 7(D) show a numerical example 7 of a zoom lens of the invention with FIG. 7(A) being a longitudinal section view and FIGS. 7(B), 7(C) and 7(D) graphic representations of the aberrations in the wide-angle end, an intermediate position and the telephoto end, respectively.
Figure 7B:
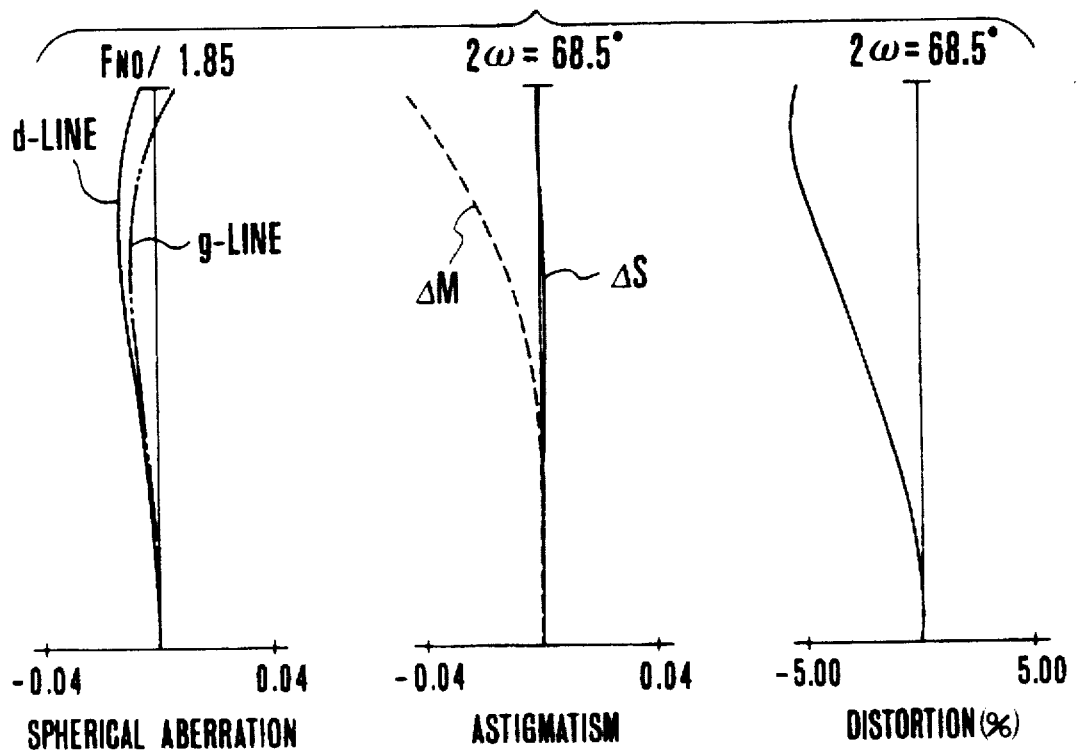
Figure 7C:
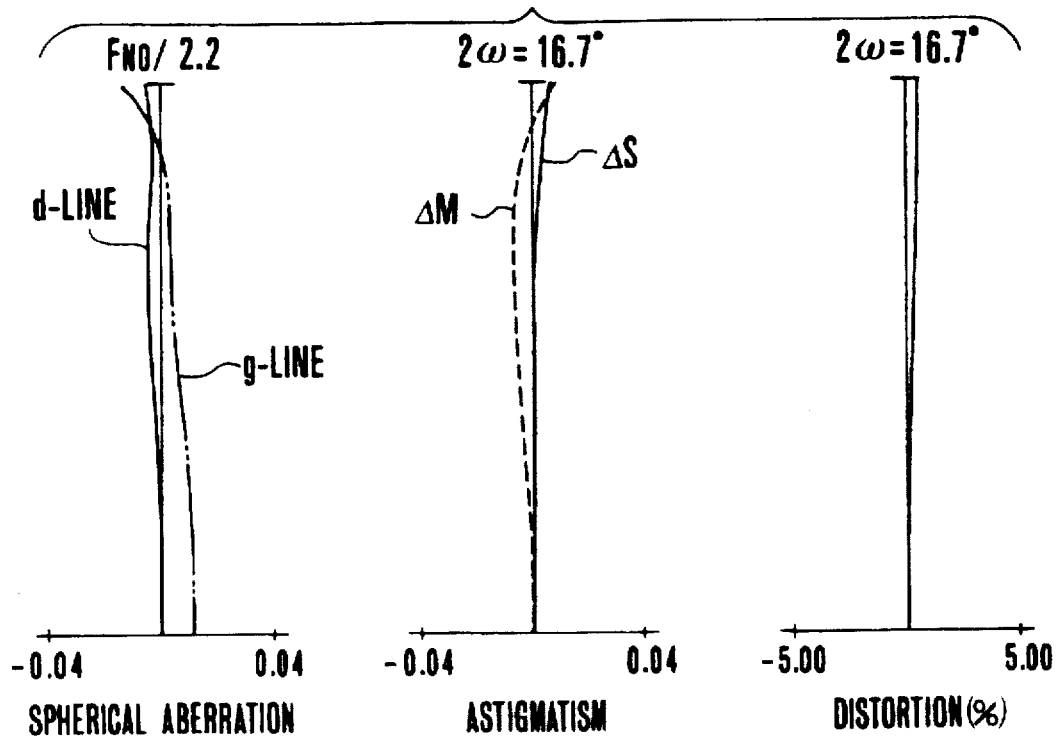
Figure 7D:
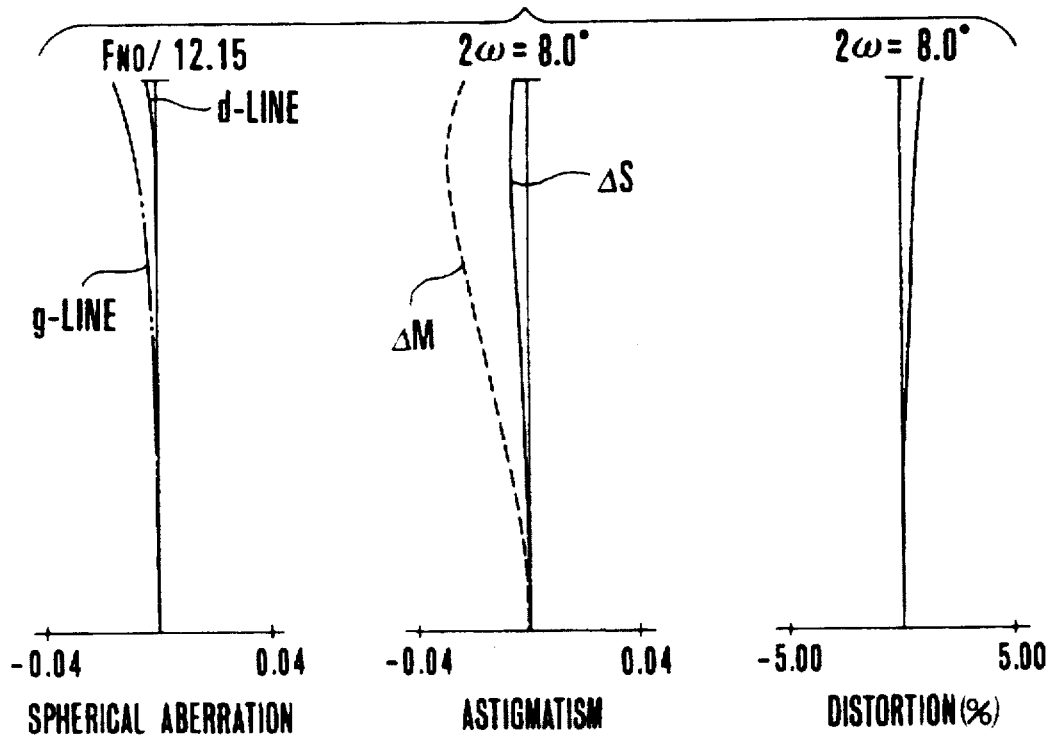
Figure 8A:
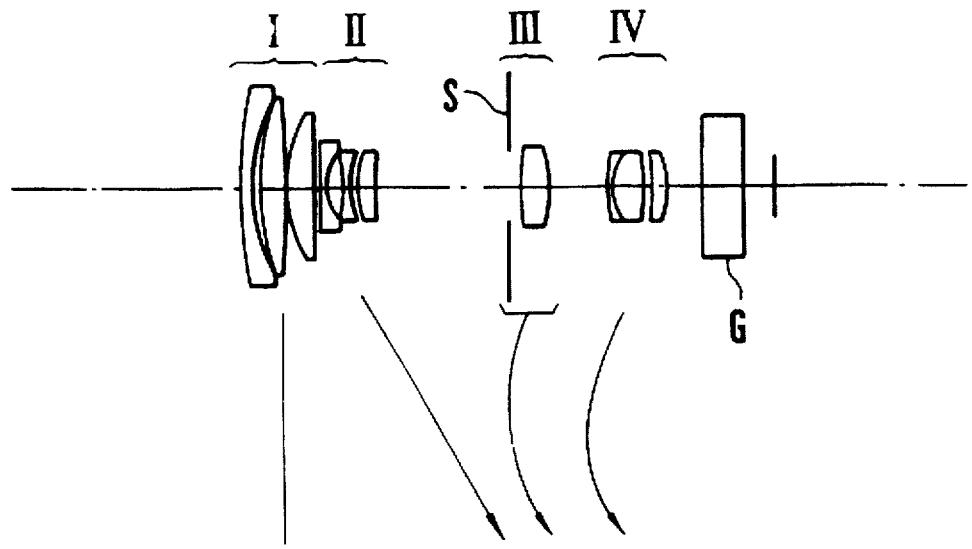
FIGS. 8(A) to 8(D) show a numerical example 8 of a zoom lens of the invention with FIG. 8(A) being a longitudinal section view and FIGS. 8(B), 8(C) and 8(D) graphic representations of the aberrations in the wide-angle end, an intermediate position and the telephoto end, respectively.
Figure 8B:
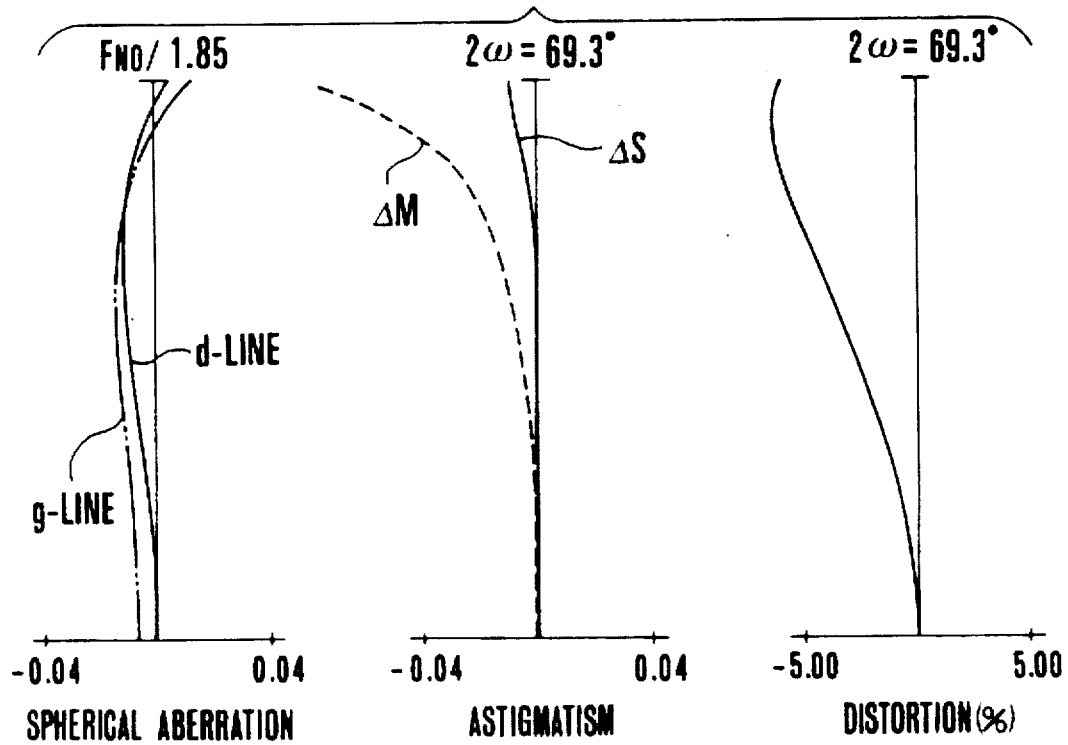
Figure 8C:
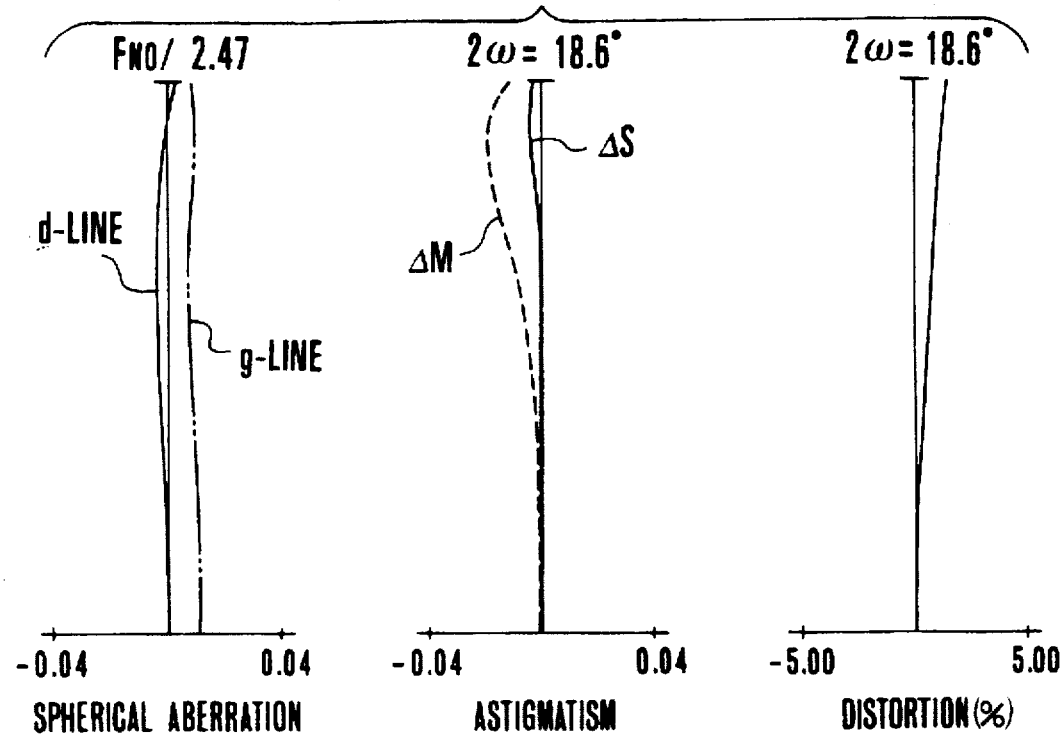
Figure 8D:
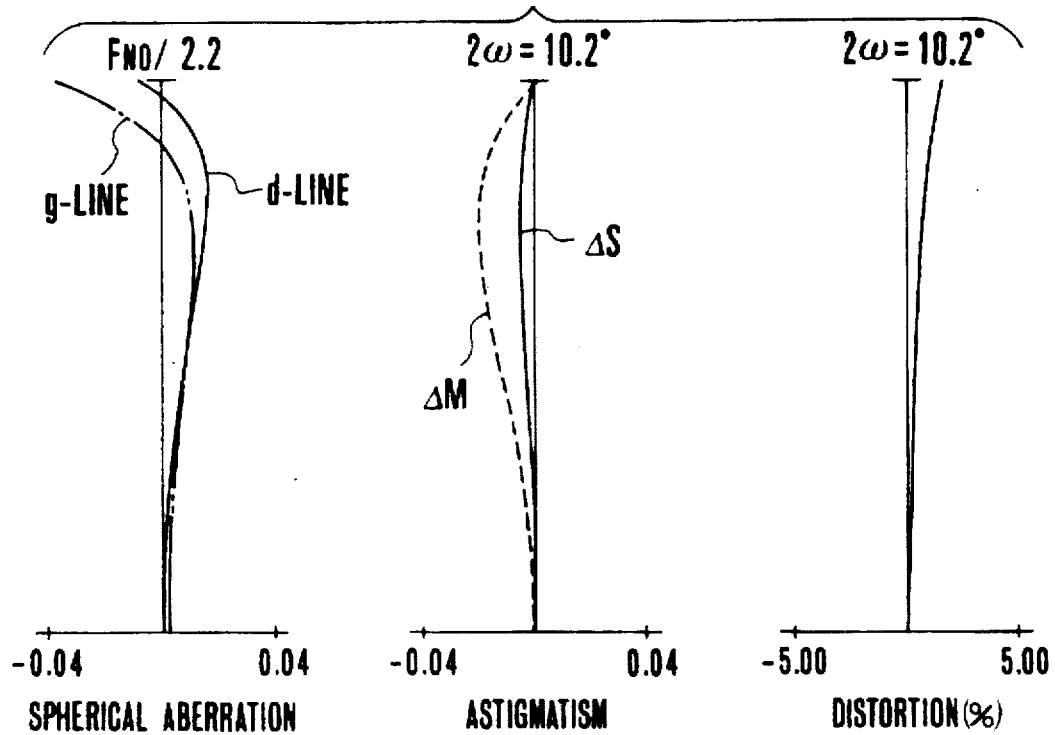
Figure 9A:
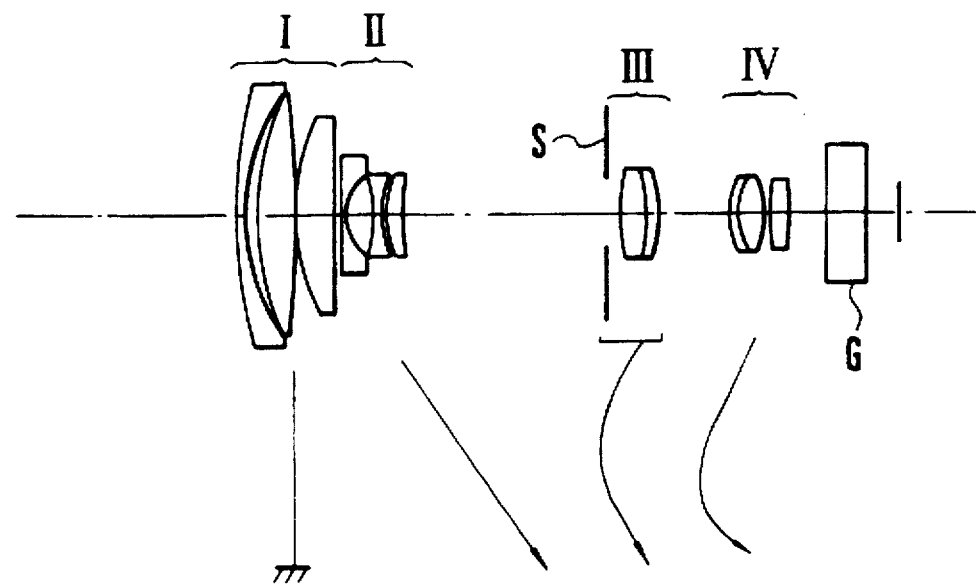
FIGS. 9(A) to 9(D) show a numerical example 9 of a zoom lens of the invention with FIG. 9(A) being a longitudinal section view and FIGS. 9(B), 9(C) and 9(D) graphic representations of the aberrations in the wide-angle end, an intermediate position and the telephoto end, respectively.
Figure 9B:
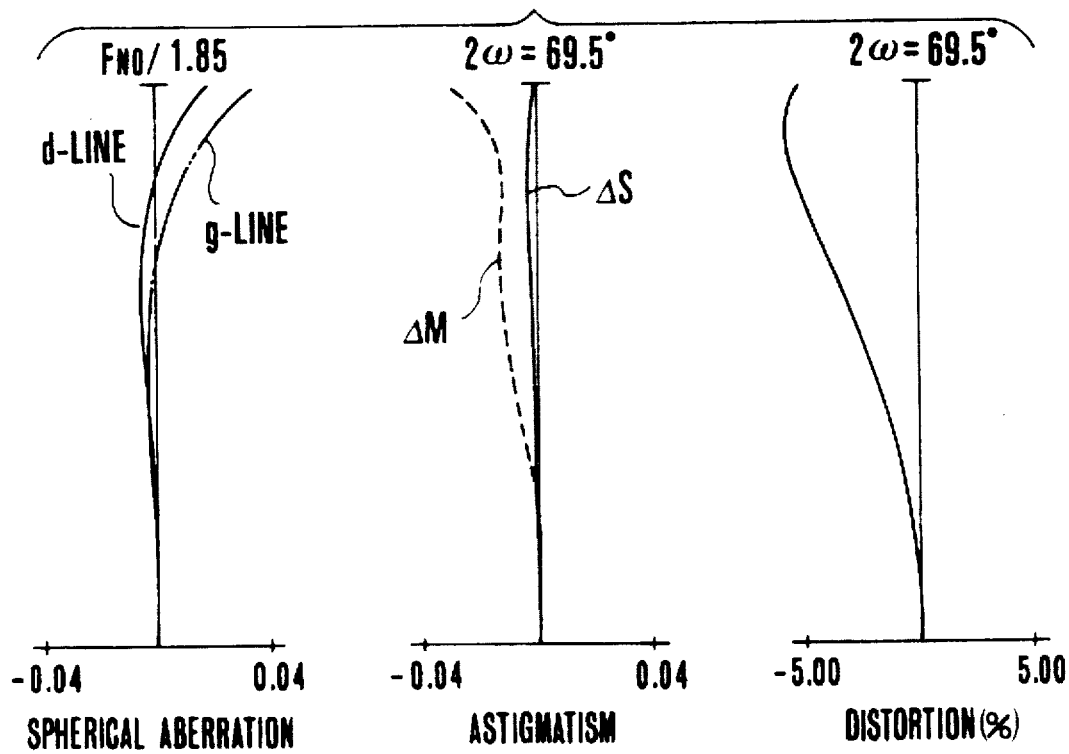
Figure 9C:
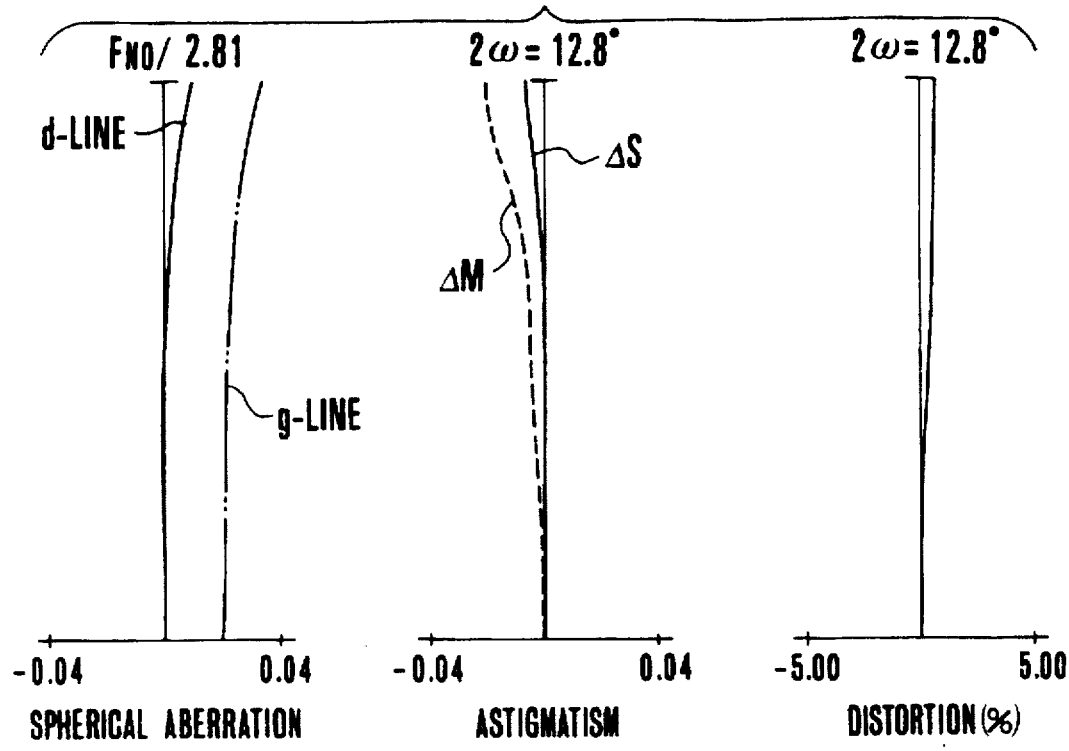
Figure 9D:
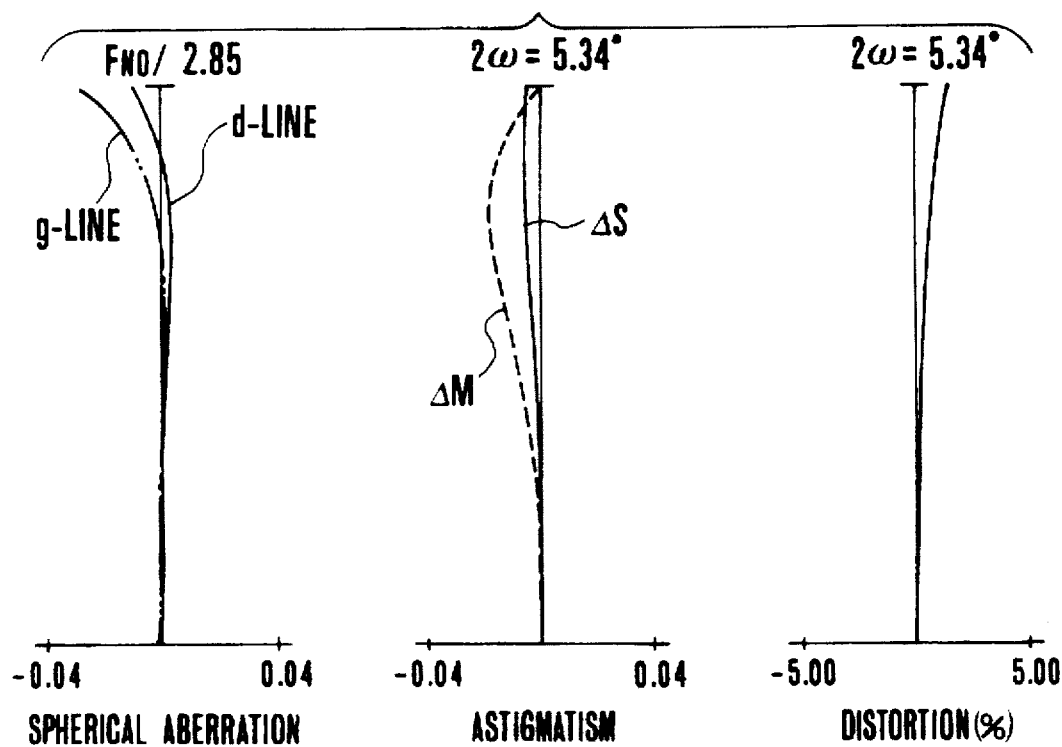
Figure 10A:
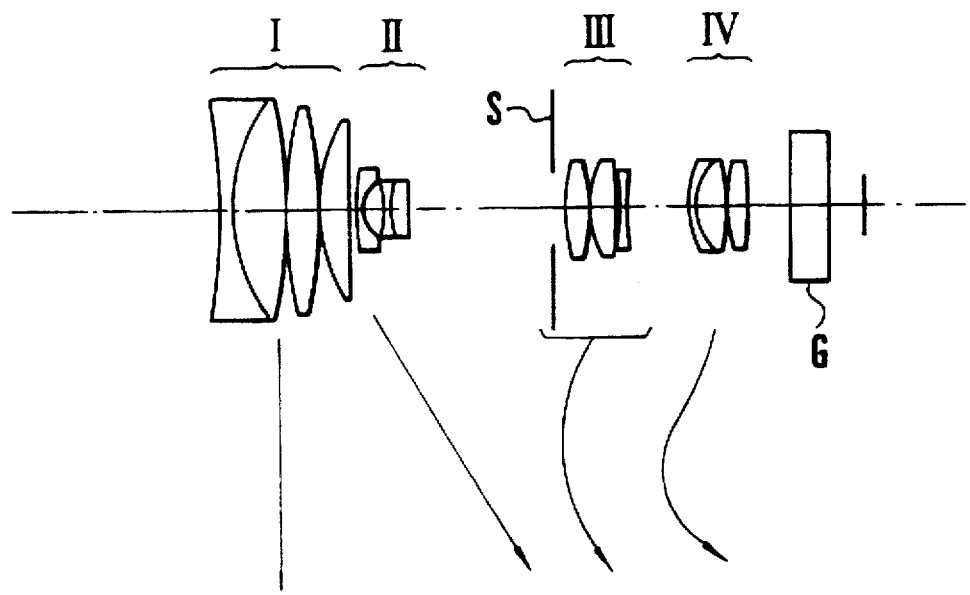
FIGS. 10(A) to 10(D) show a numerical example 10 of a zoom lens of the invention with FIG. 10(A) being a longitudinal section view and FIGS. 10(B), 10(C) and 10(D) graphic representations of the aberrations in the wide-angle end, an intermediate position and the telephoto end, respectively.
Figure 10B:
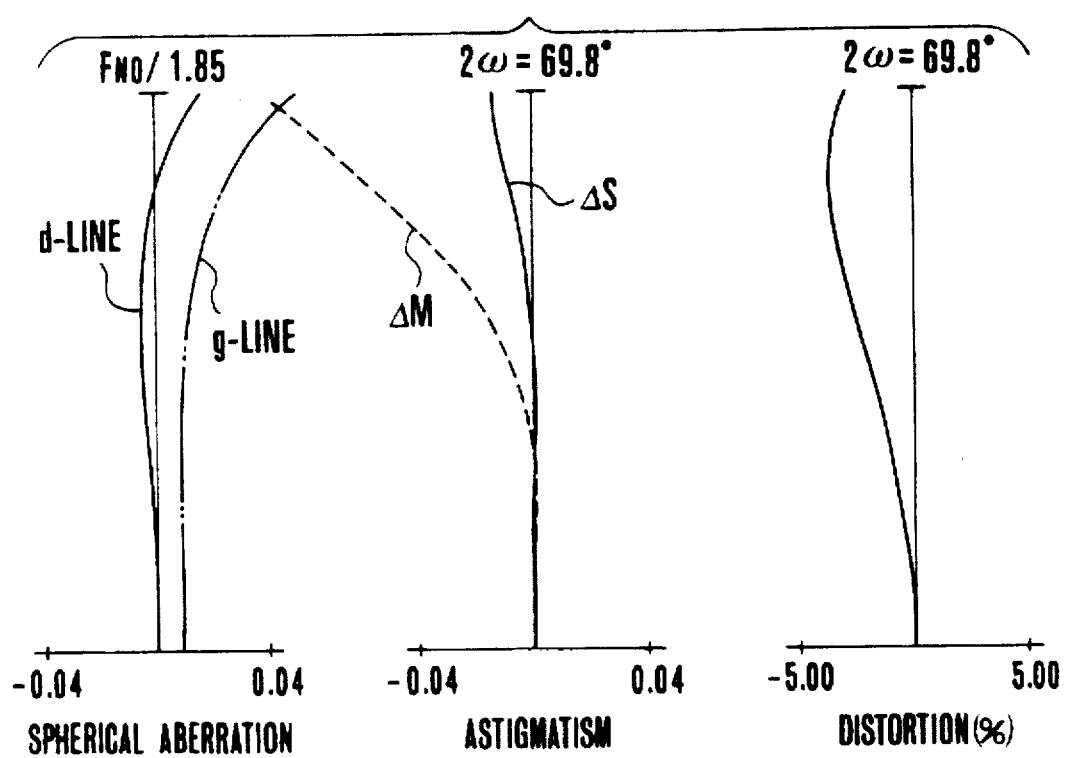
Figure 10C:
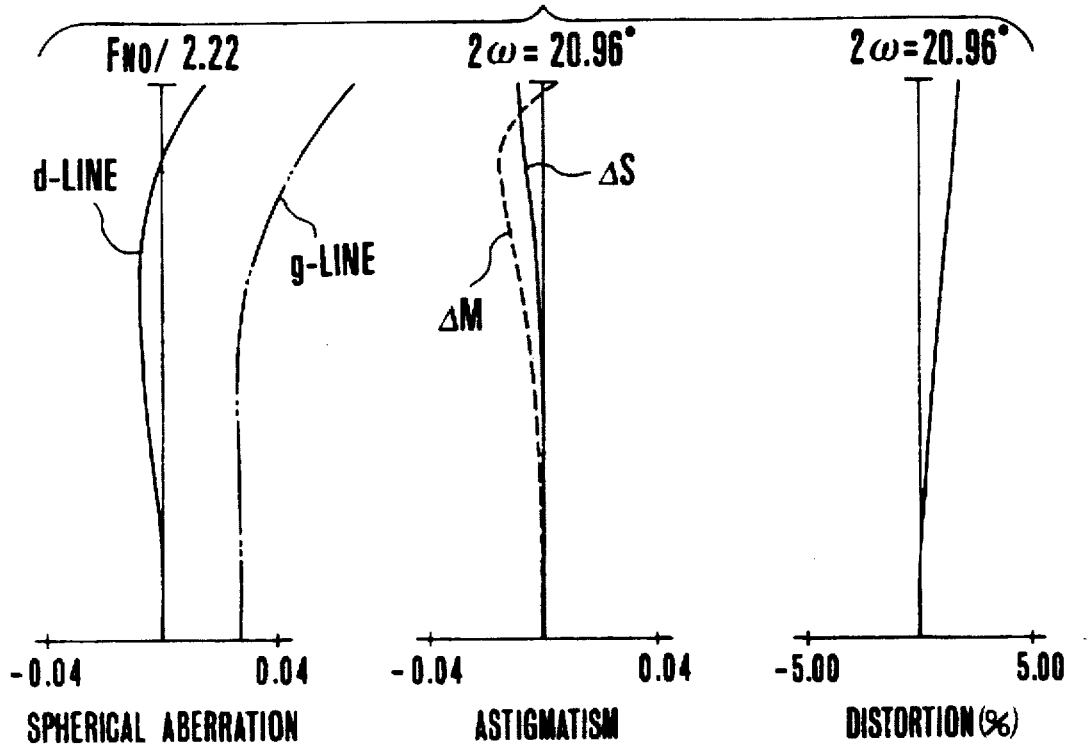
Figure 10D:
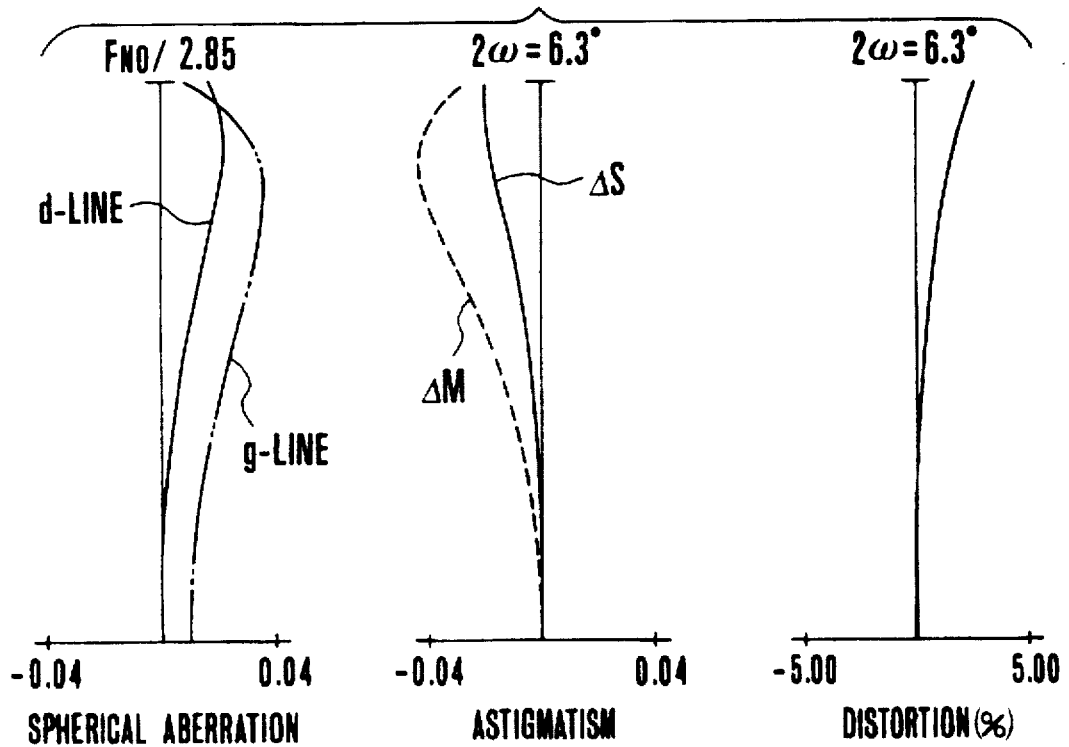
Figure 11A:
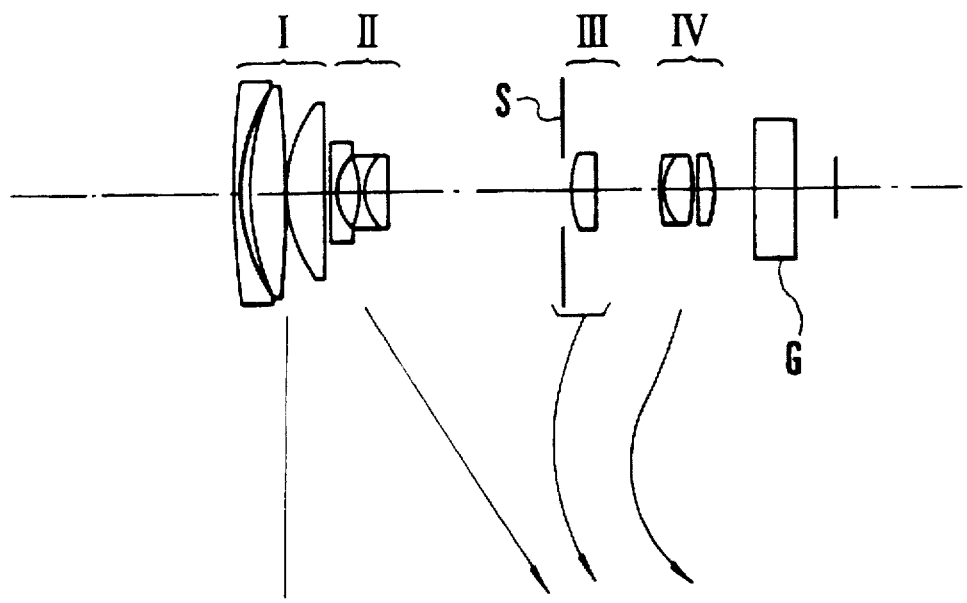
FIGS. 11(A) to 11(D) show a numerical example 11 of a zoom lens of the invention with FIG. 11(A) being a longitudinal section view and FIGS. 11(B), 11(C) and 11(D) graphic representations of the aberrations in the wide-angle end, an intermediate position and the telephoto end, respectively.
Figure 11B:
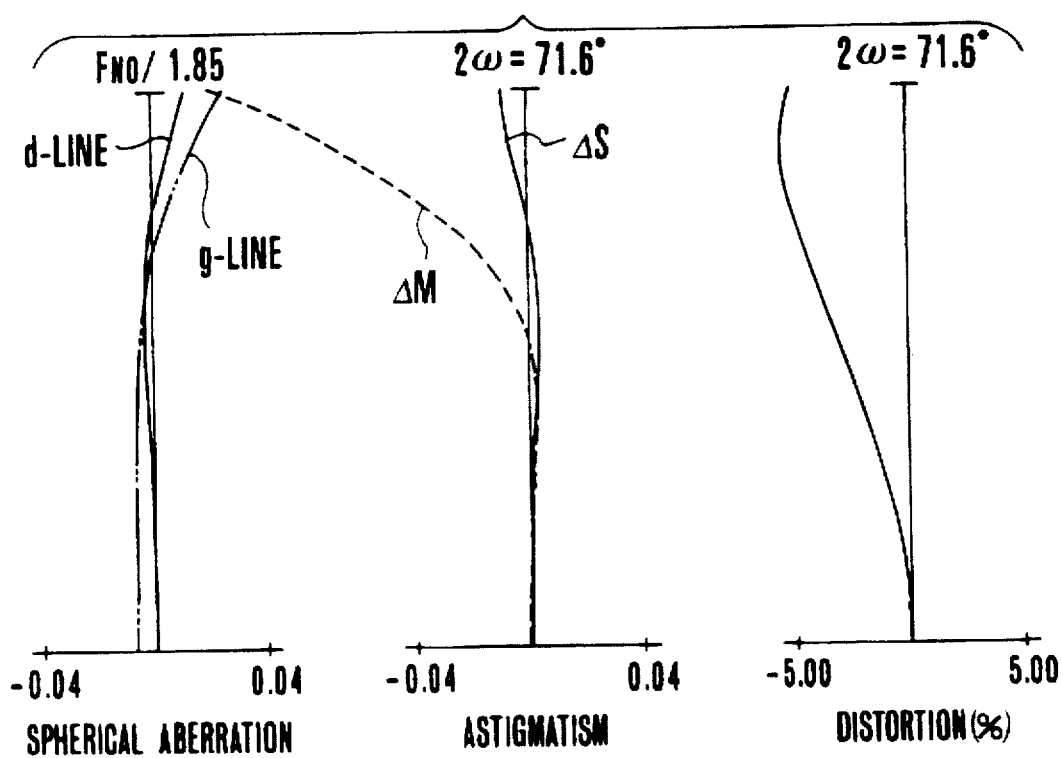
Figure 11C:
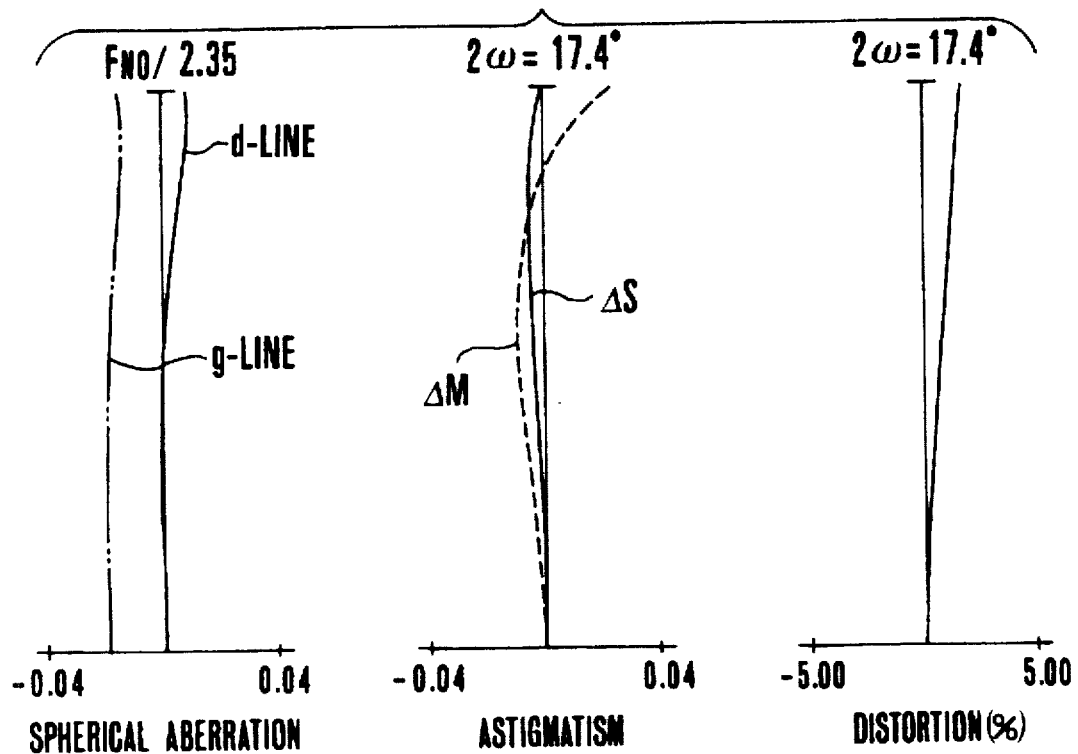
Figure 11D:
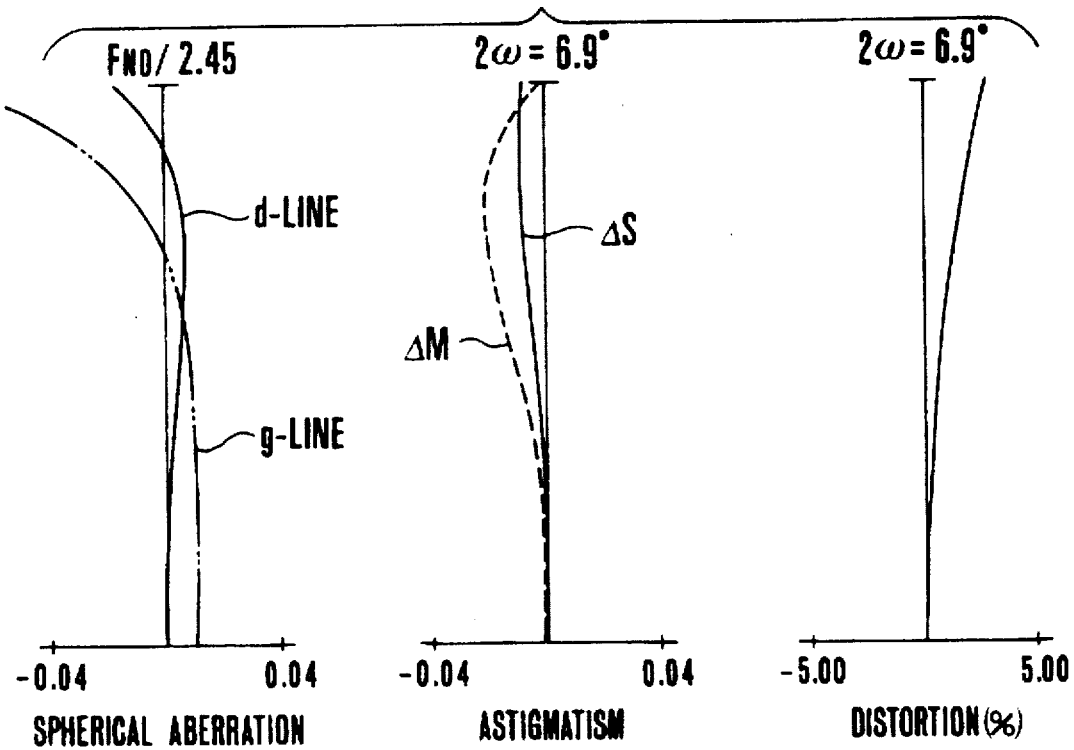
Figure 12A:
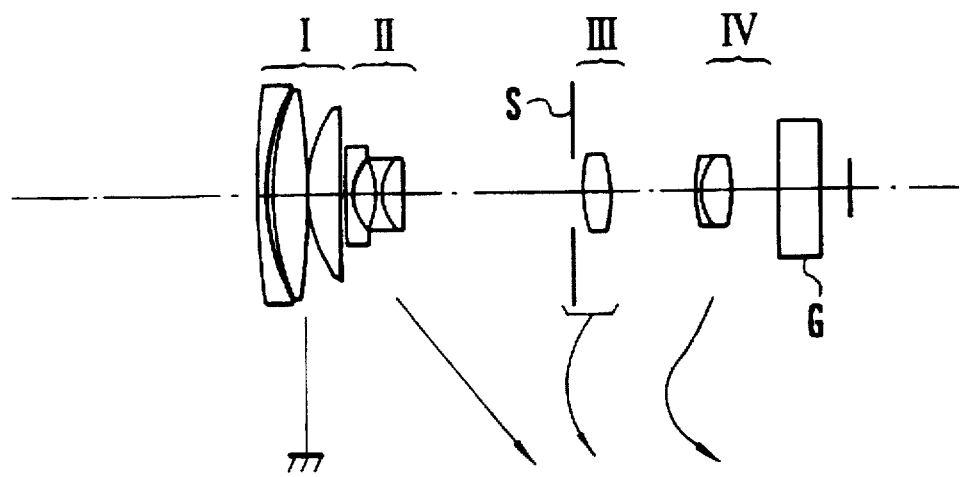
FIGS. 12(A) to 12(D) show a numerical example 12 of a zoom lens of the invention with FIG. 12(A) being a longitudinal section view and FIGS. 12(B), 12(C) and 13(D) graphic representations of the aberrations in the wide-angle end, an intermediate position and the telephoto end, respectively.
Figure 12B:
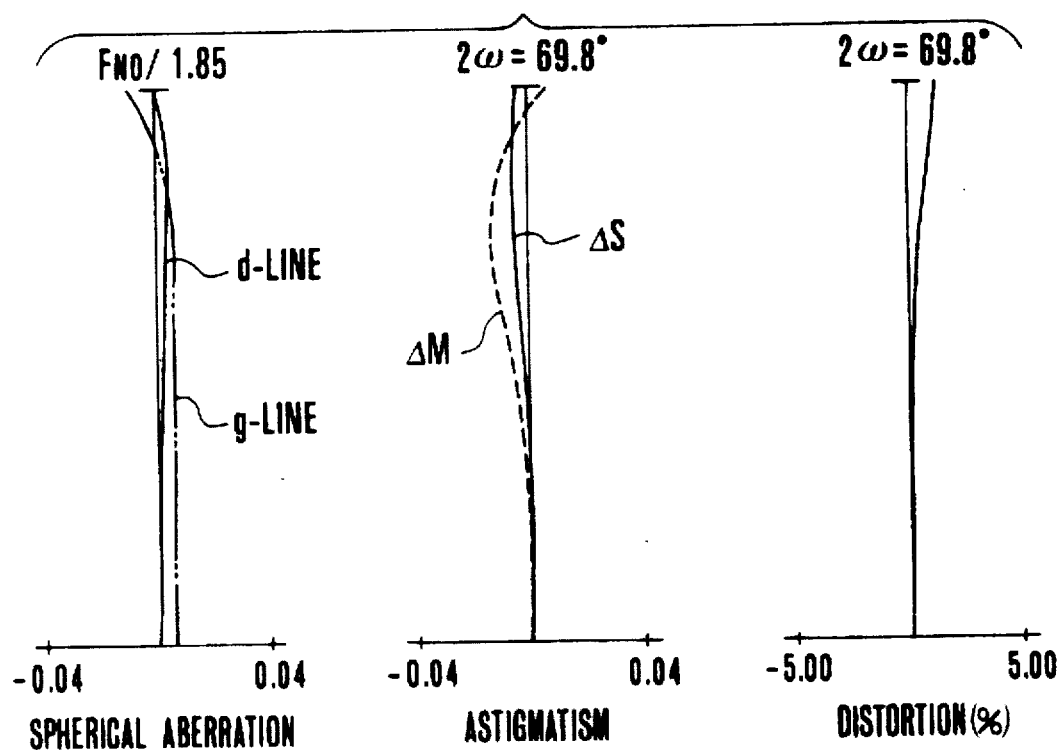
Figure 12C:
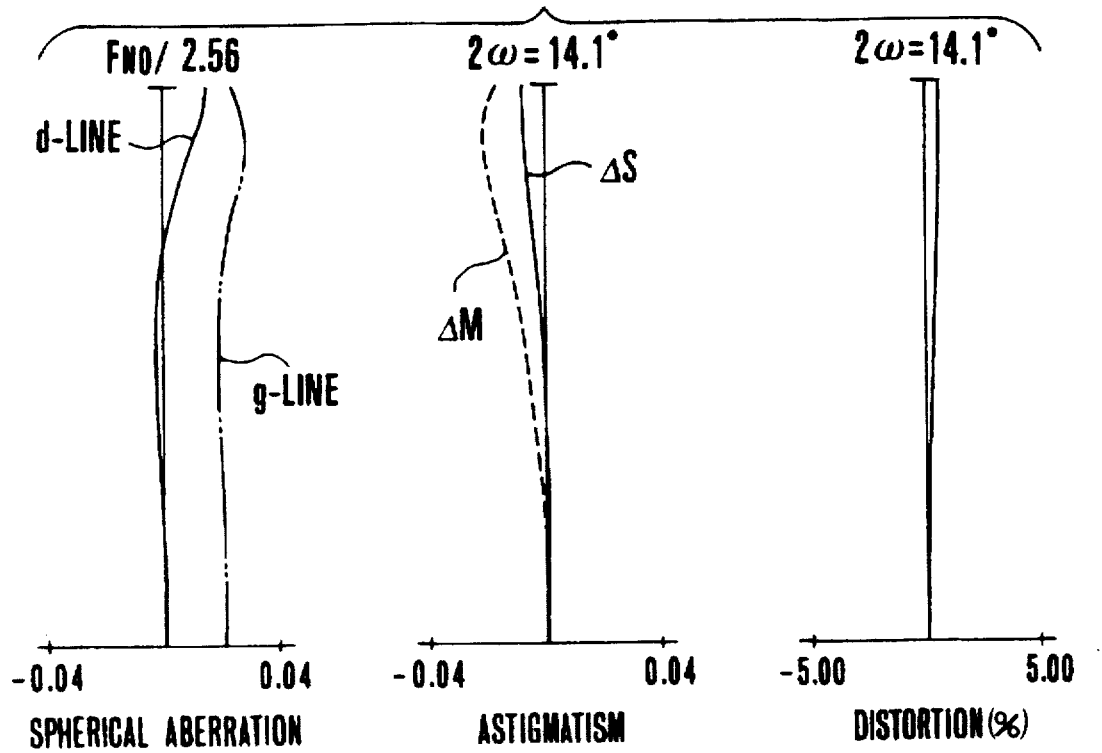
Figure 12D:
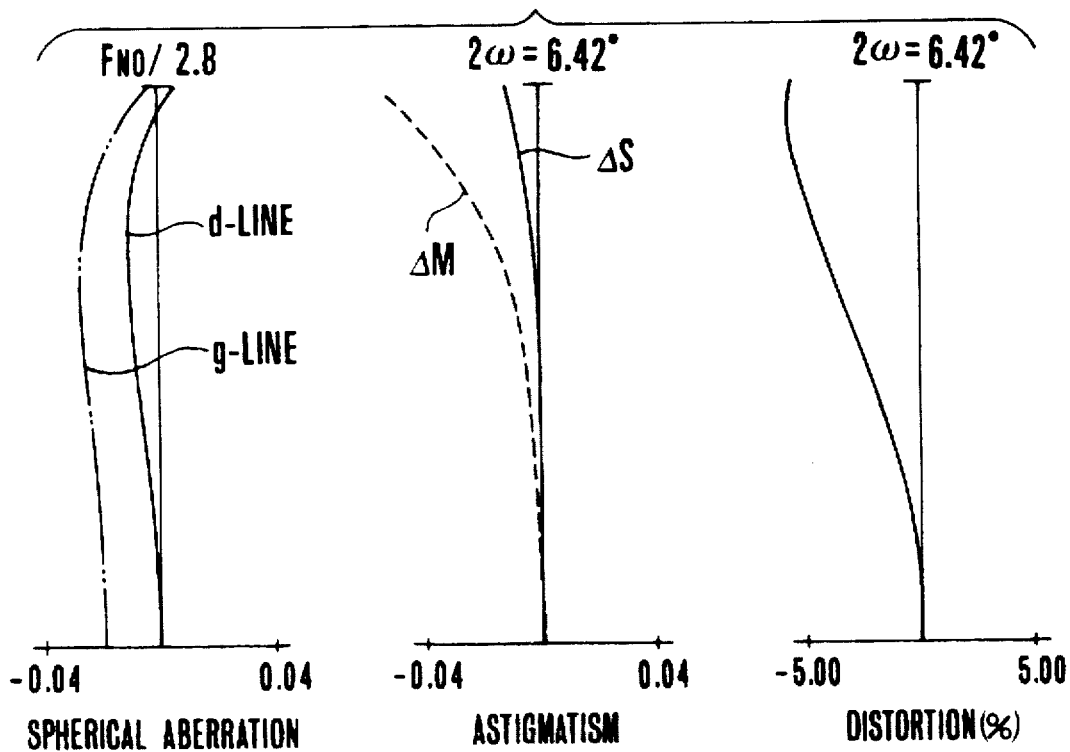
Figure 13A:
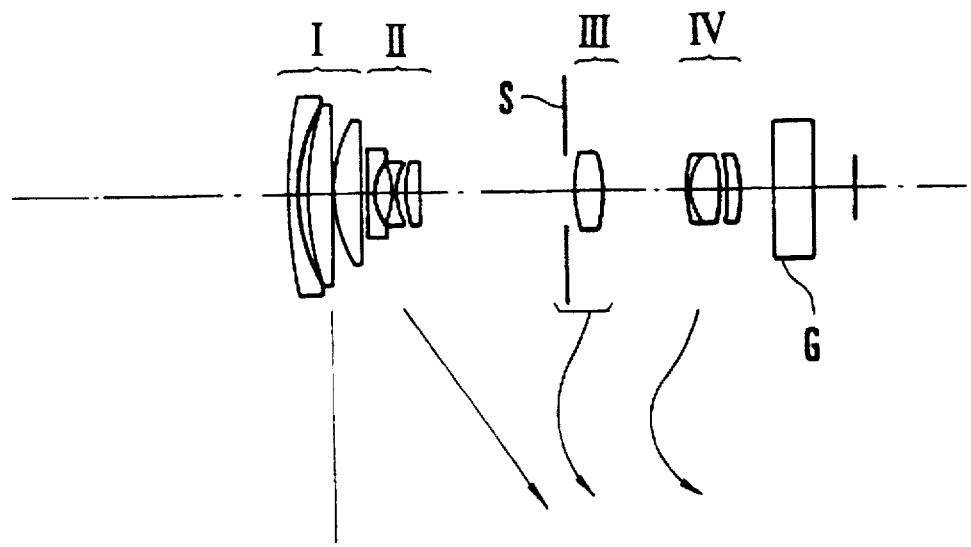
FIGS. 13(A) to 13(D) show a numerical example 13 of a zoom lens of the invention with FIG. 13(A) being a longitudinal section view and FIGS. 13(S), 13(C) and 13(D) graphic representations of the aberrations in the wide-angle end, an intermediate position and the telephoto end, respectively.
Figure 13B:
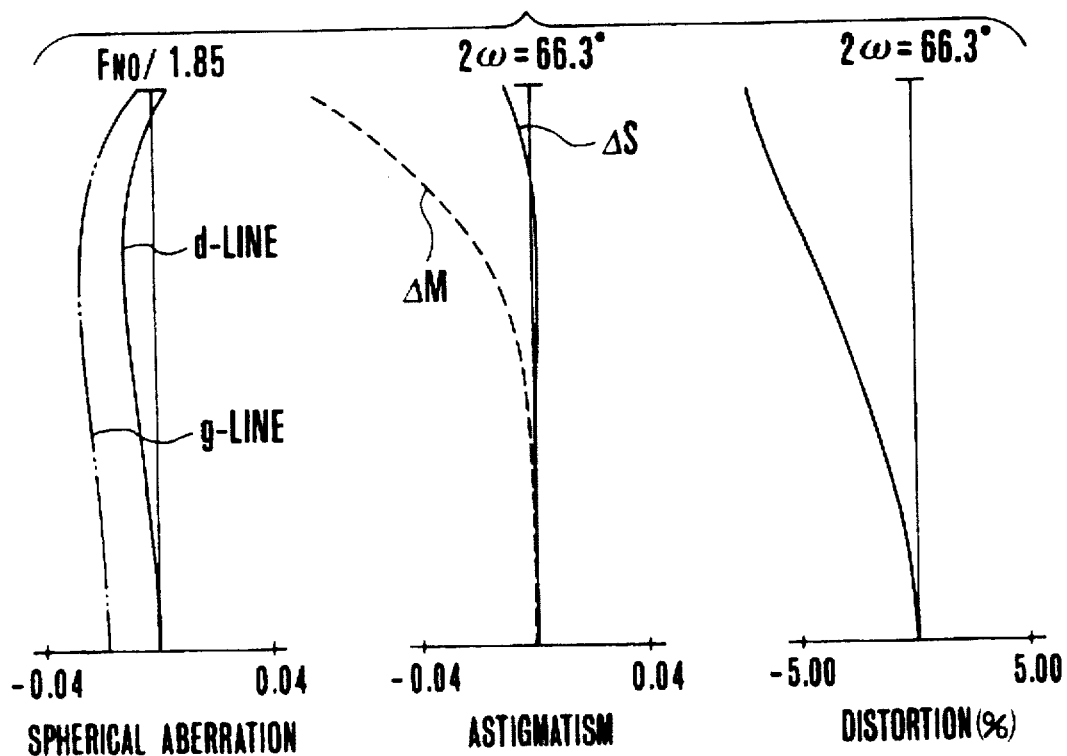
Figure 13C:
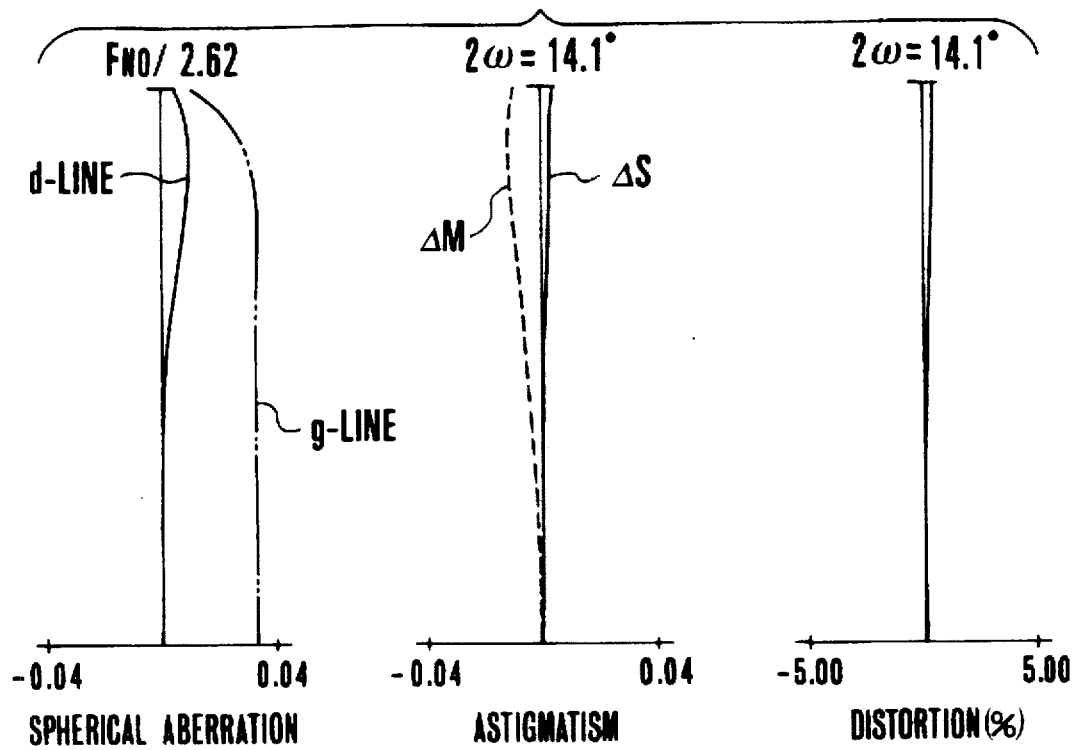
Figure 13D:
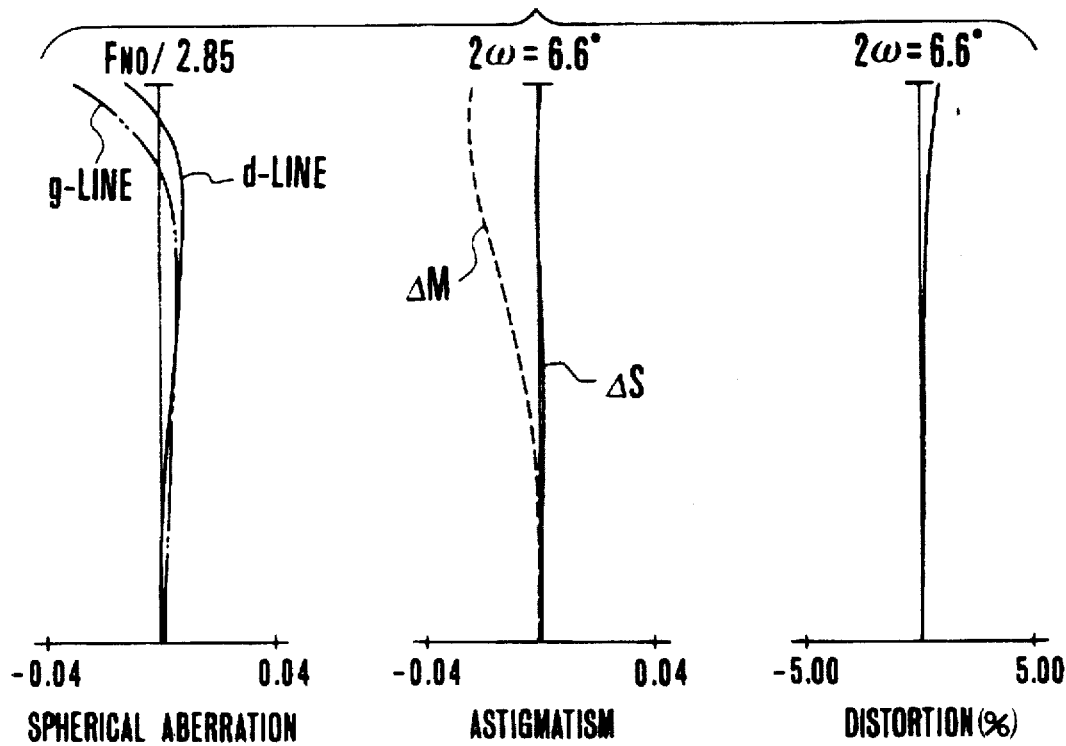
Figure 14A:
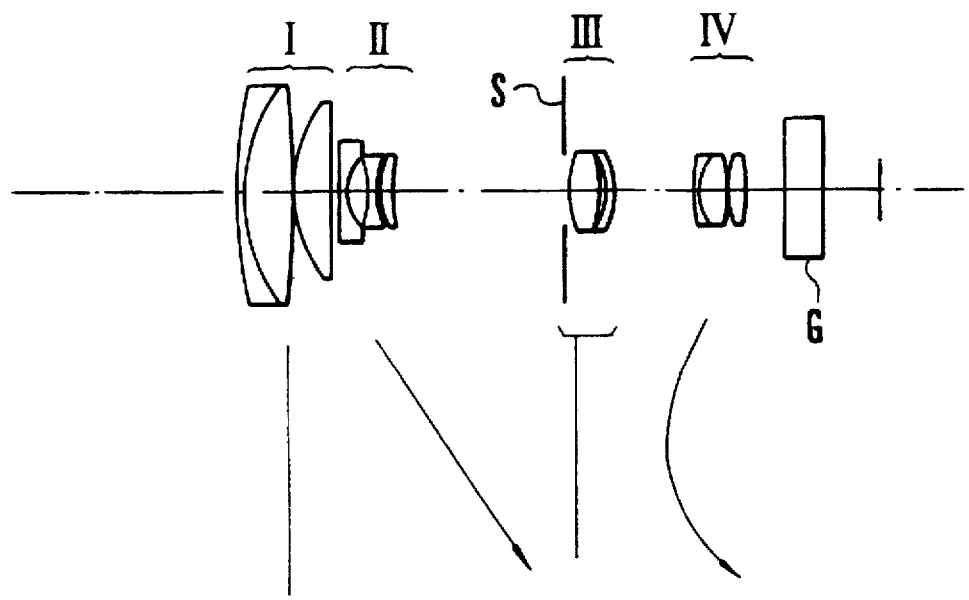
FIGS. 14(A) to 14(D) show a numerical example 14 of a zoom lens of the invention with FIG. 14(A) being a longitudinal section view and FIGS. 14(B), 14(C) and 14(D) graphic representations of the aberrations in the wide-angle end, an intermediate position and the telephoto end, respectively.
Figure 14B:
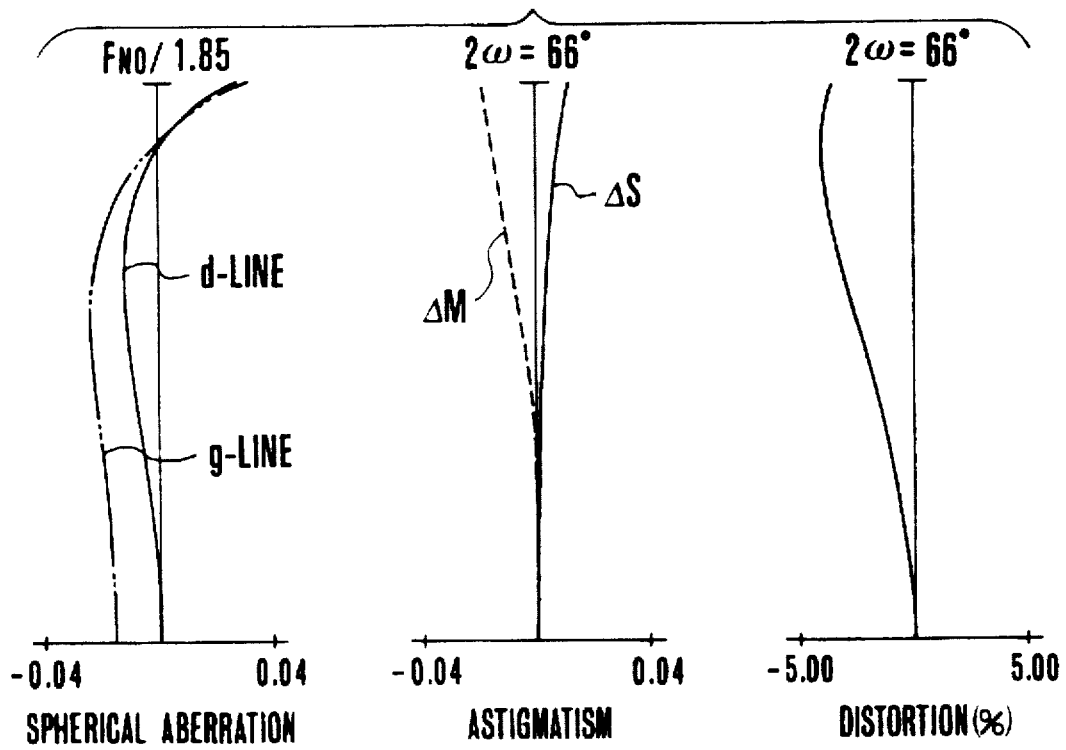
Figure 14C:
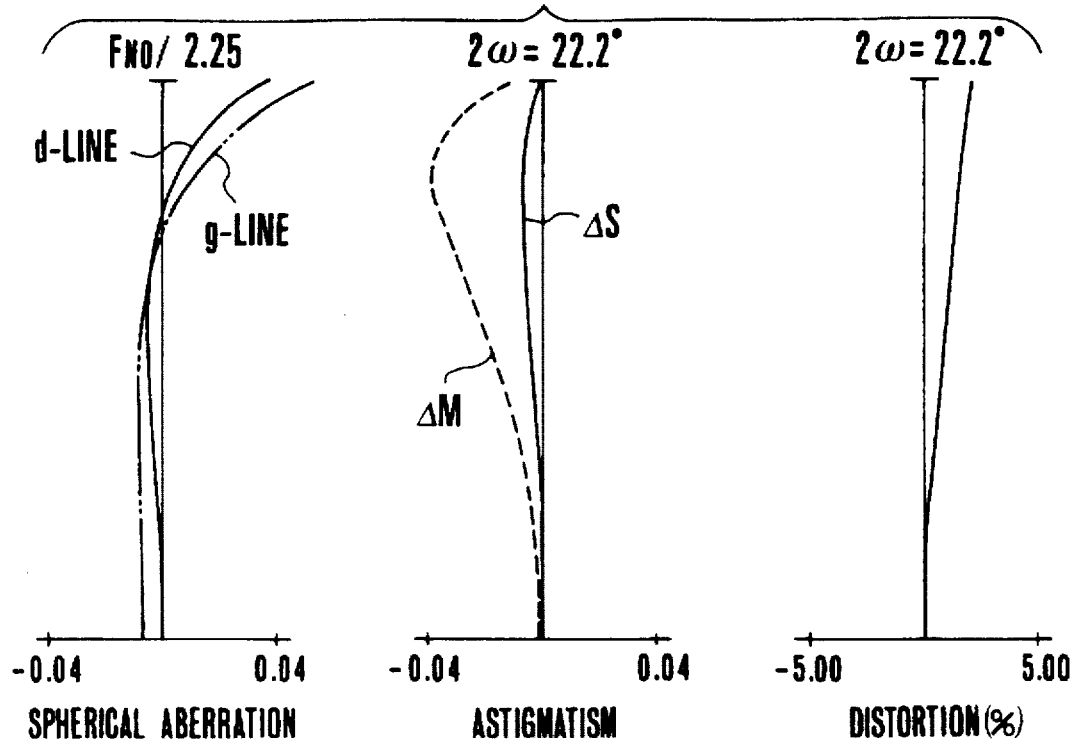
Figure 14D:
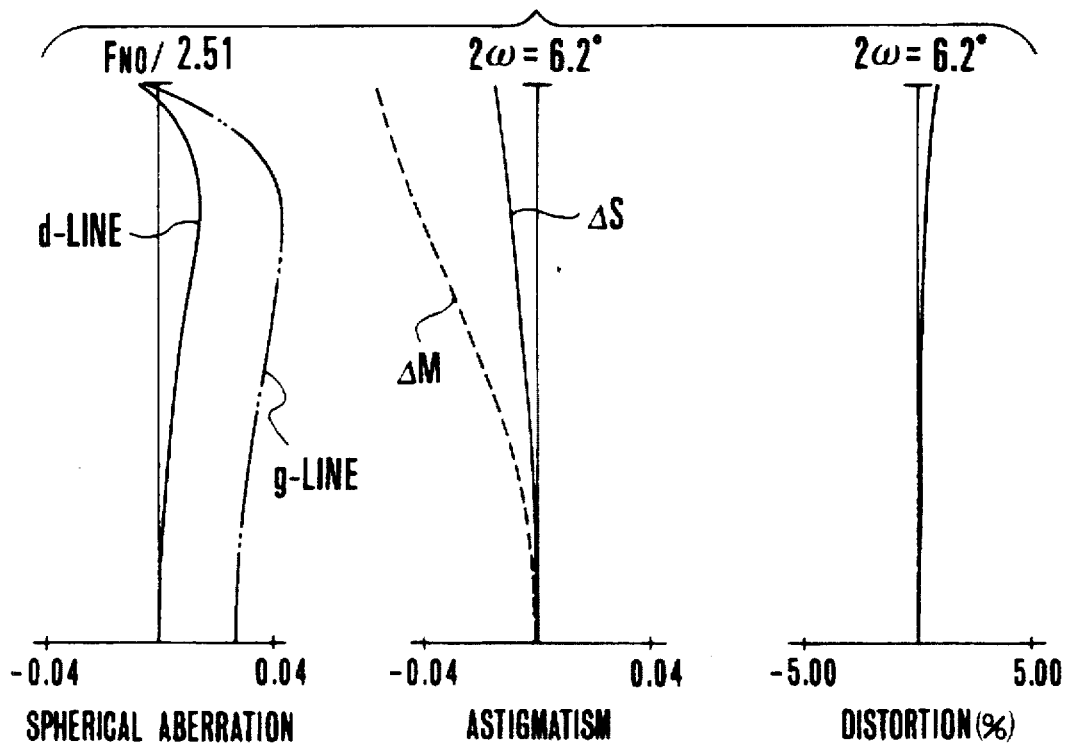
Figure 15A:
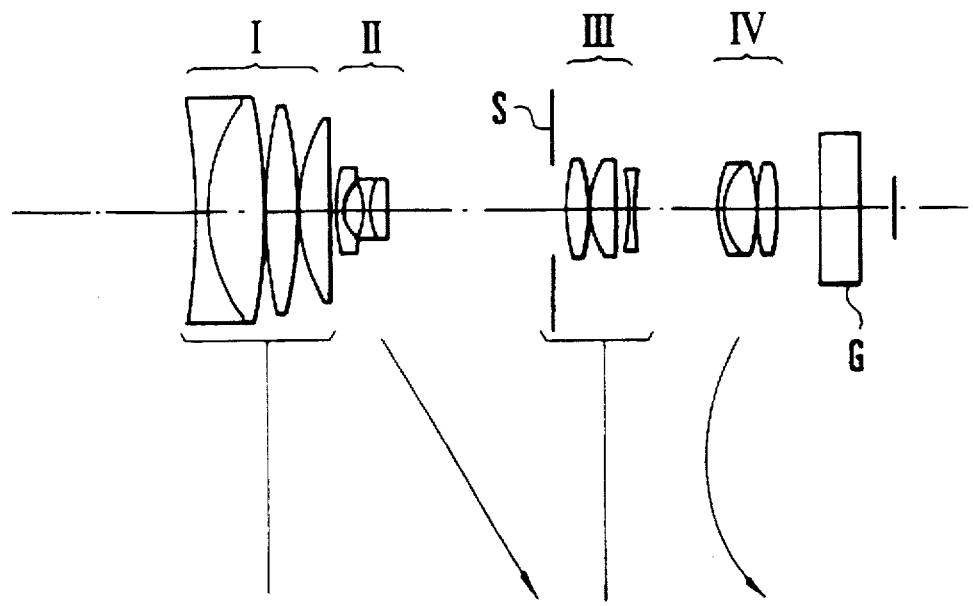
FIGS. 15(A) to 15(D) show a numerical example 15 of a zoom lens of the invention with FIG. 15(A) being a longitudinal section view and FIGS. 15(B), 15(C) and 15(D) graphic representations of the aberrations in the wide-angle end, an intermediate position and the telephoto end, respectively.
Figure 15B:
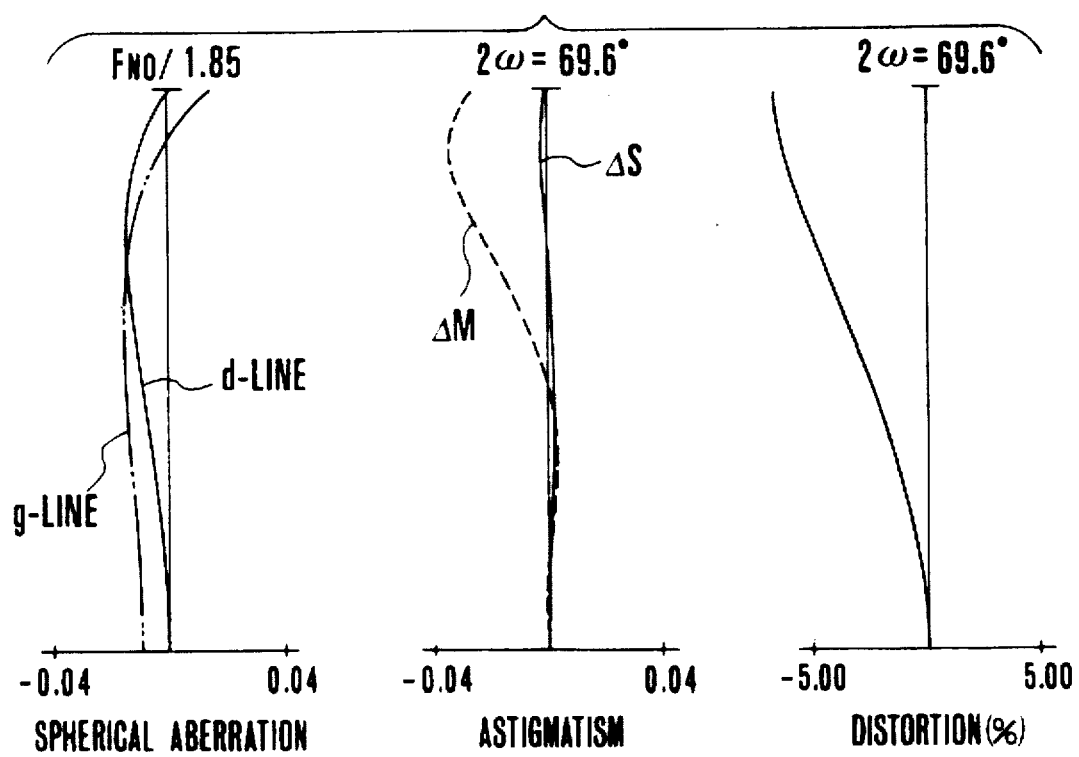
Figure 15C:
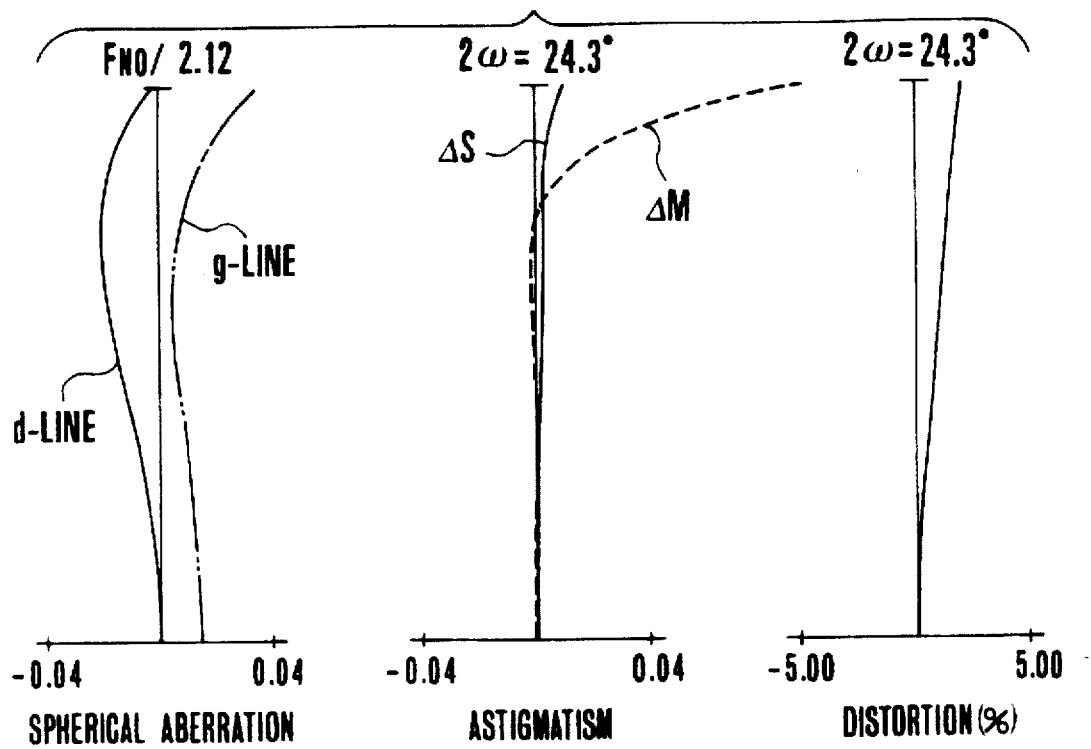
Figure 15D:
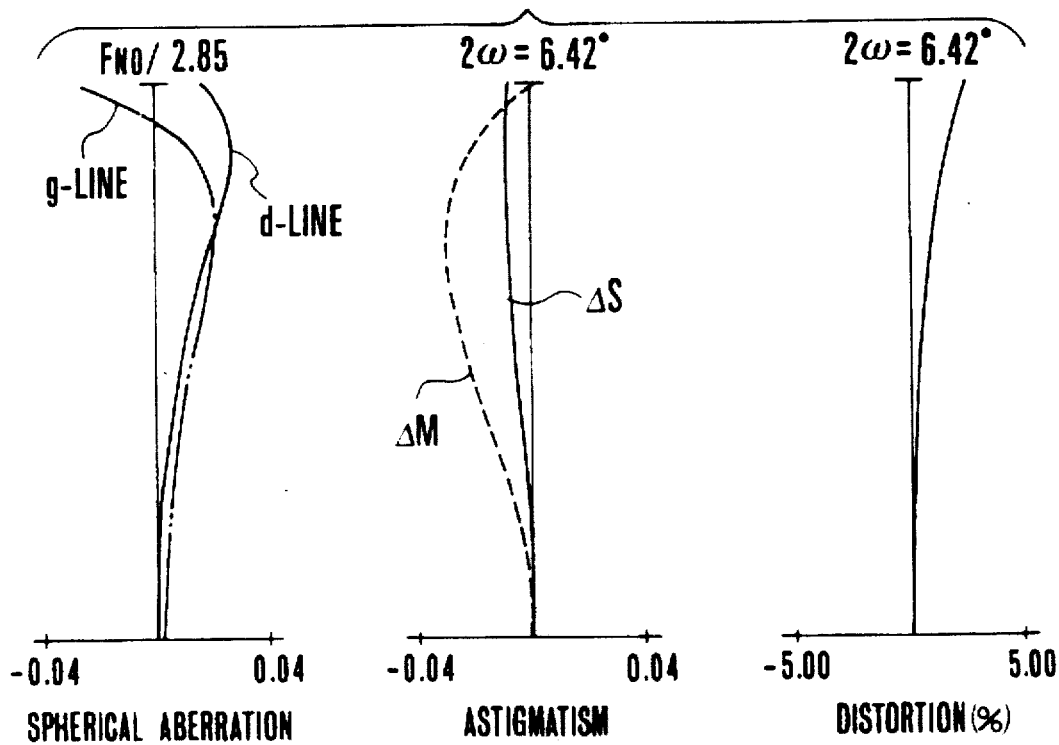
Figure 16A:
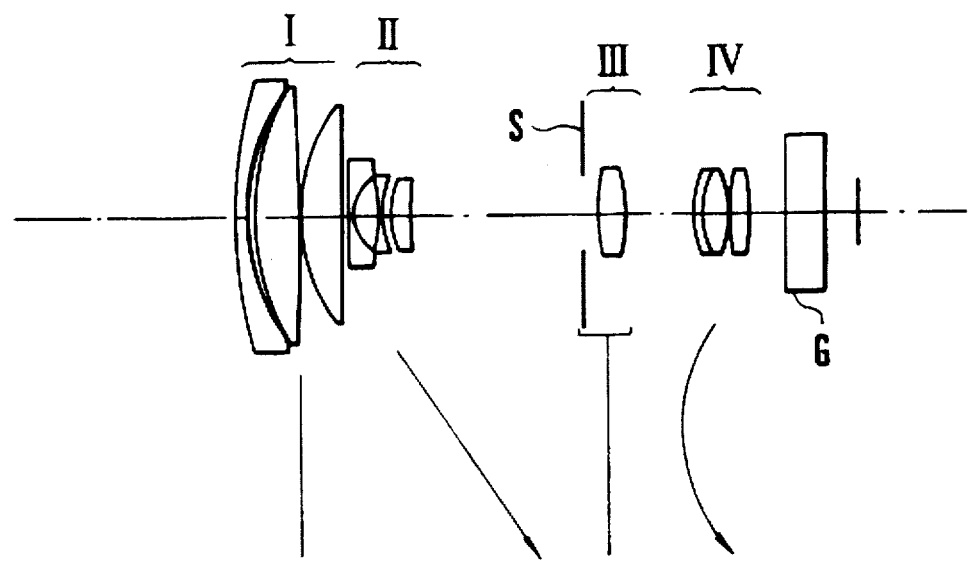
FIGS. 16(A) to 16(D) show a numerical example 16 of a zoom lens of the invention with FIG. 16(A) being a longitudinal section view and FIGS. 16(B), 16(C) and 16(D) graphic representations of the aberrations in the wide-angle end, an intermediate position and the telephoto end, respectively.
Figure 16B:
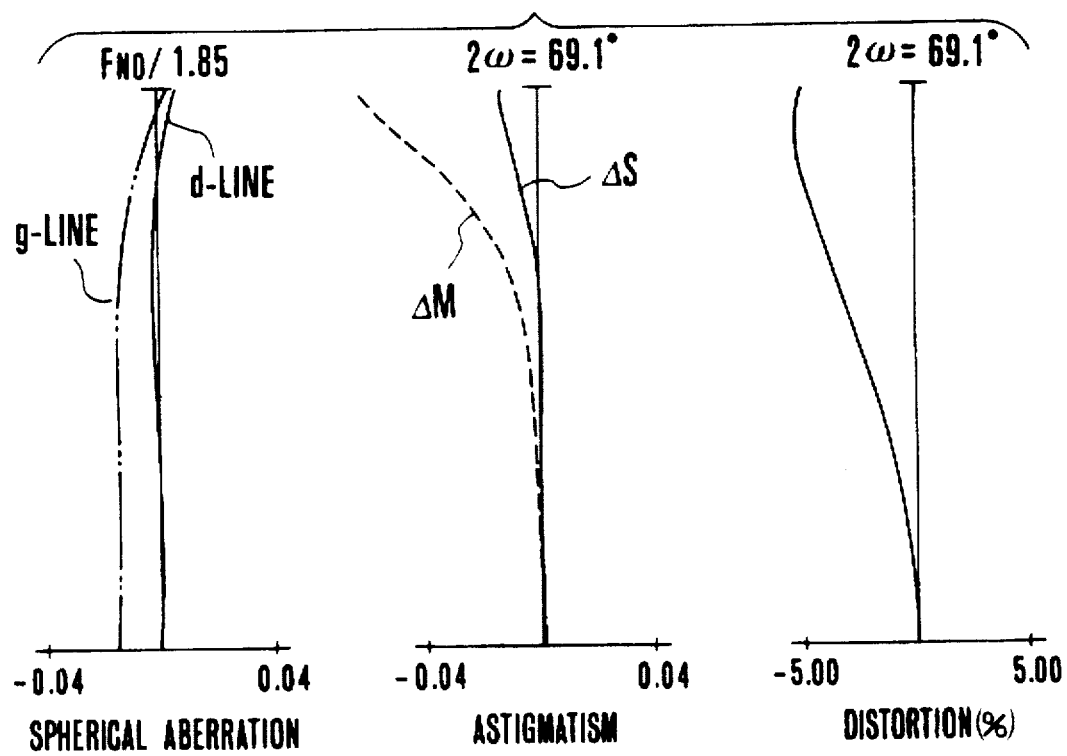
Figure 16C:
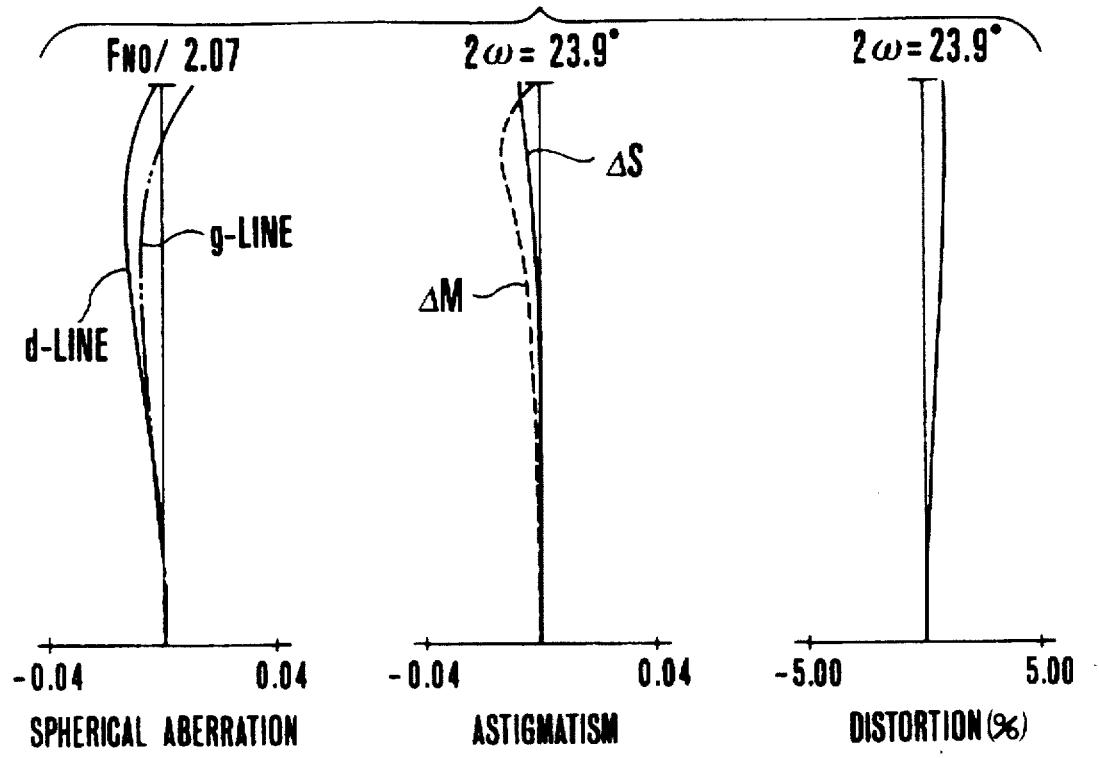
Figure 16D:
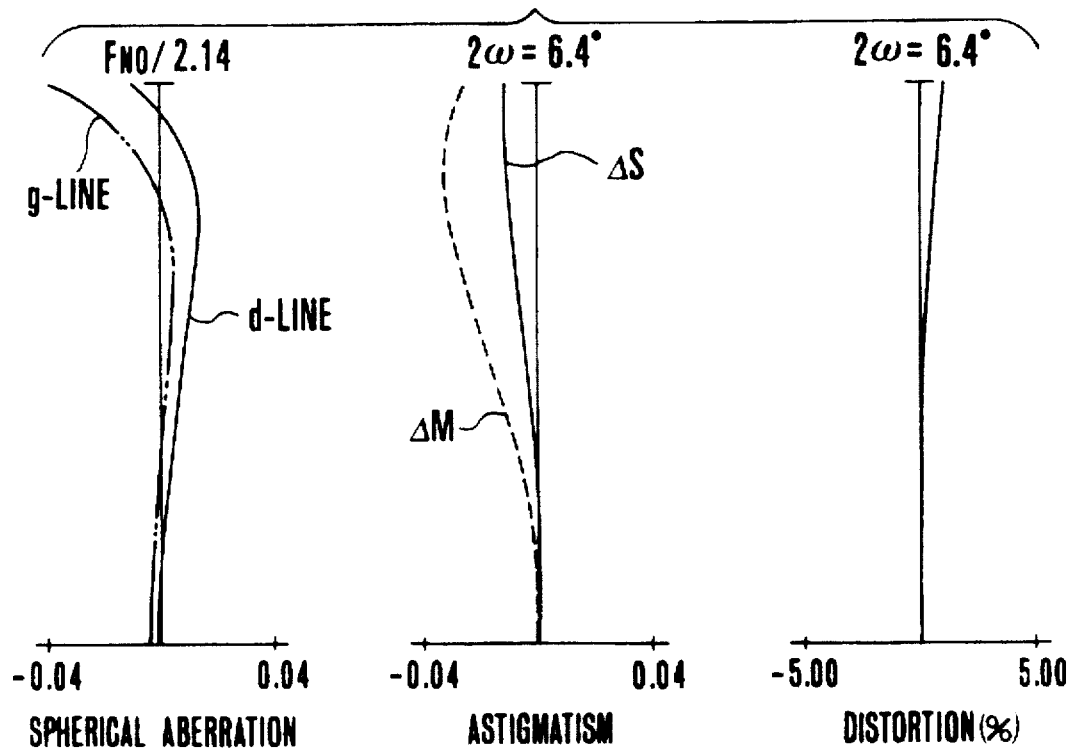
Figure 17A:
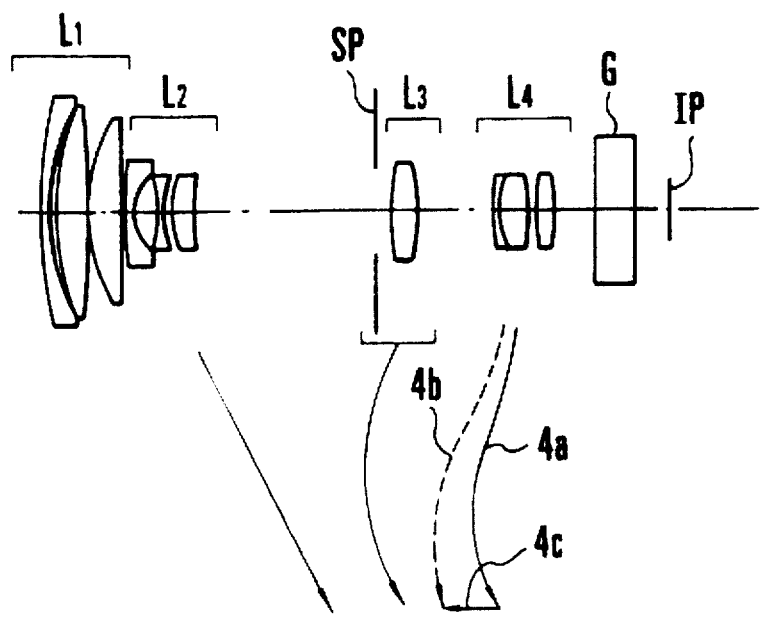
FIGS. 17(A) to 17(D) show a numerical example 17 of a zoom lens of the invention with FIG. 17(A) being a longitudinal section view and FIGS. 17(B), 17(C) and 17(D) graphic representations of the aberrations in the wide-angle end, an intermediate position and the telephoto end, respectively.
Figure 17B:
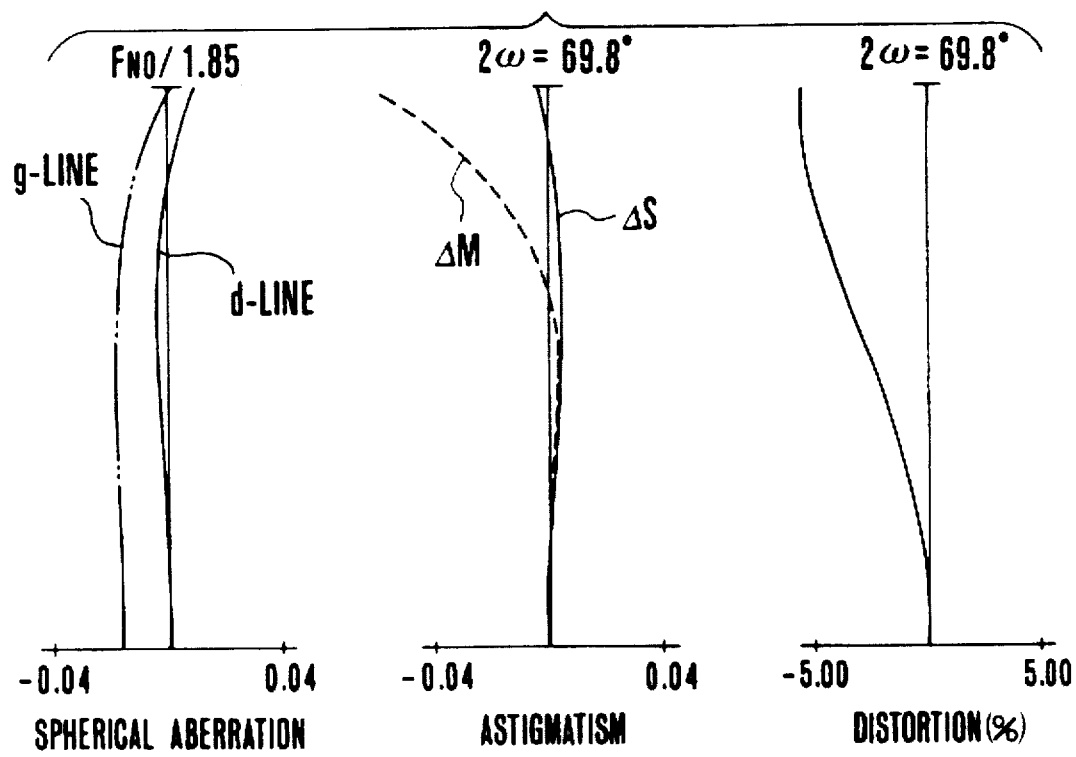
Figure 17C:
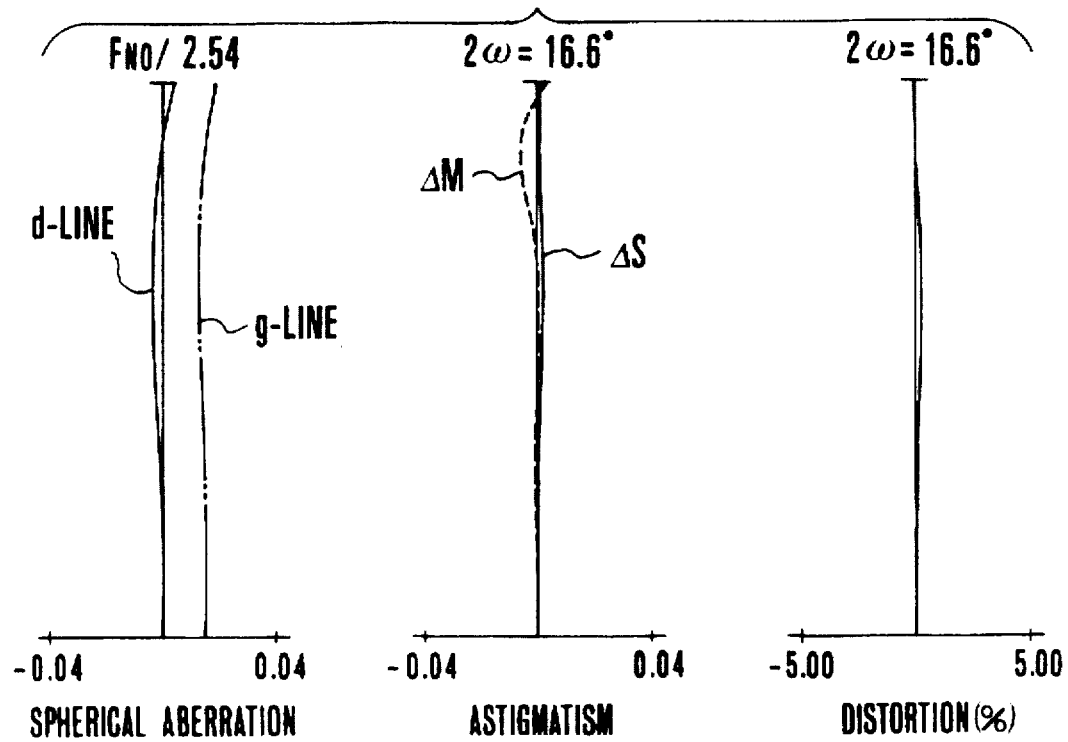
Figure 17D:
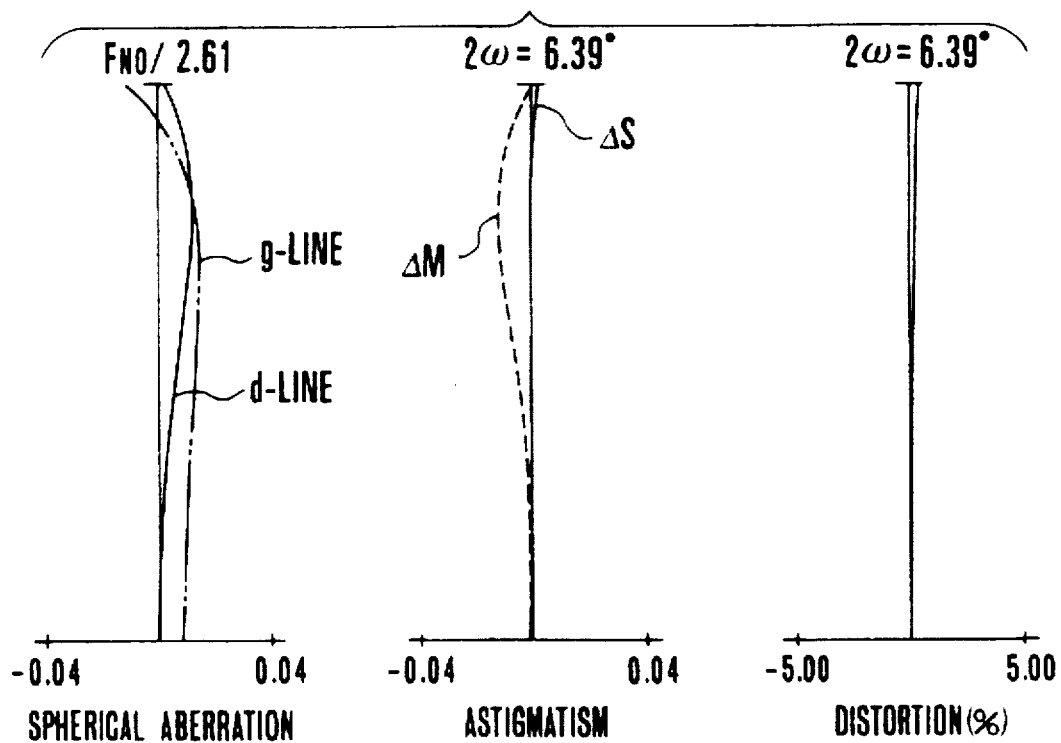
Figure 18A:
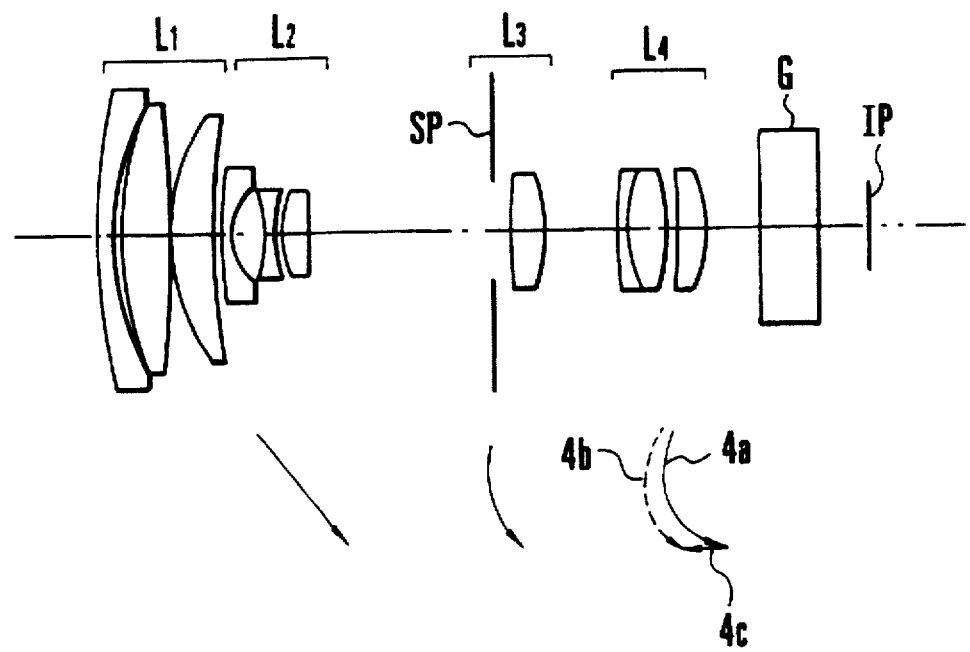
FIGS. 18(A) to 18(D) show a numerical example 18 of a zoom lens of the invention with FIG. 18(A) being a longitudinal section view and FIGS. 18(B), 18(C) and 18(D) graphic representations of the aberrations an the wide-angle end, an intermediate position and the telephoto end, respectively.
Figure 18B:
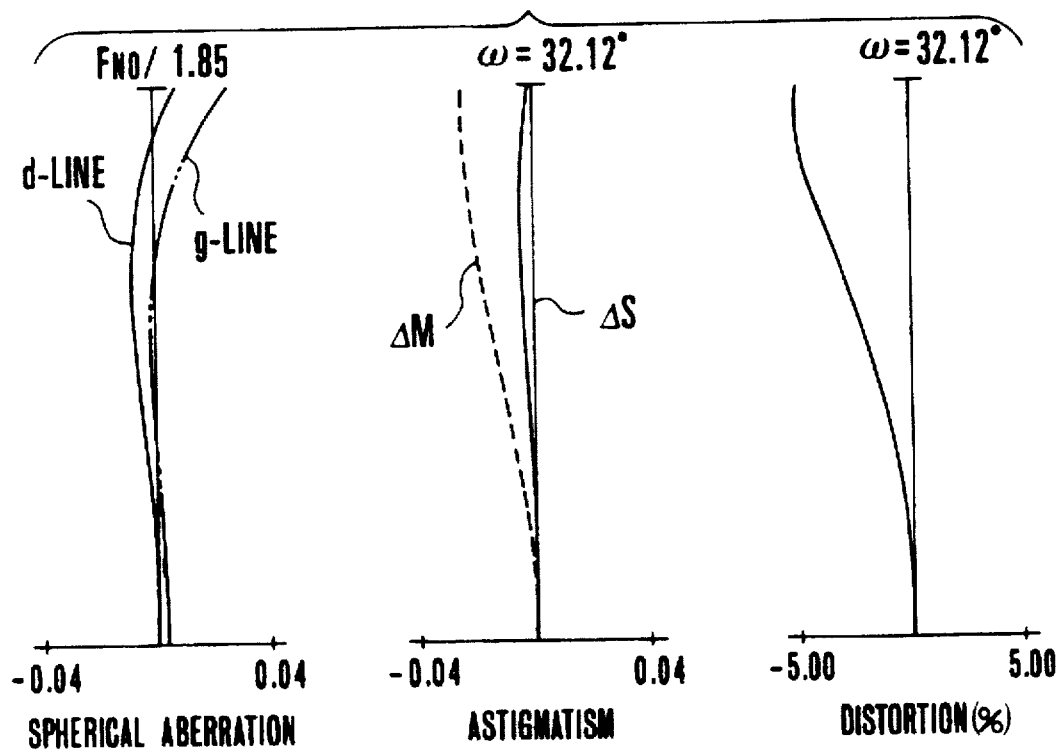
Figure 18C:
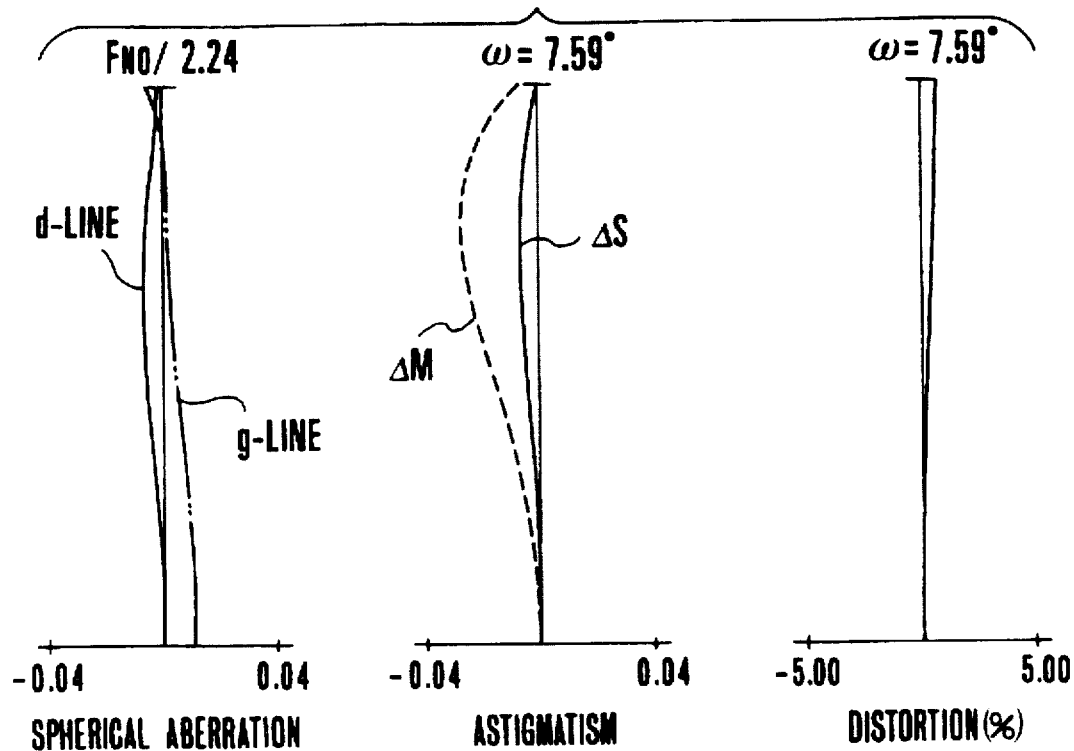
Figure 18D:
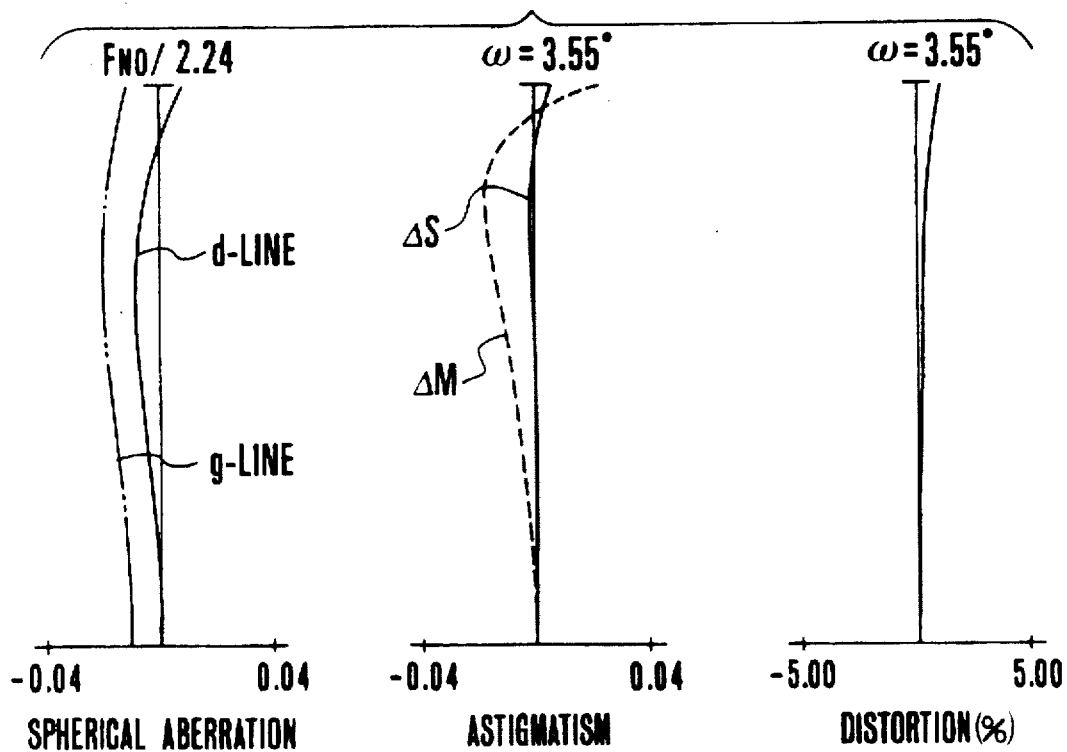
Figure 19A:
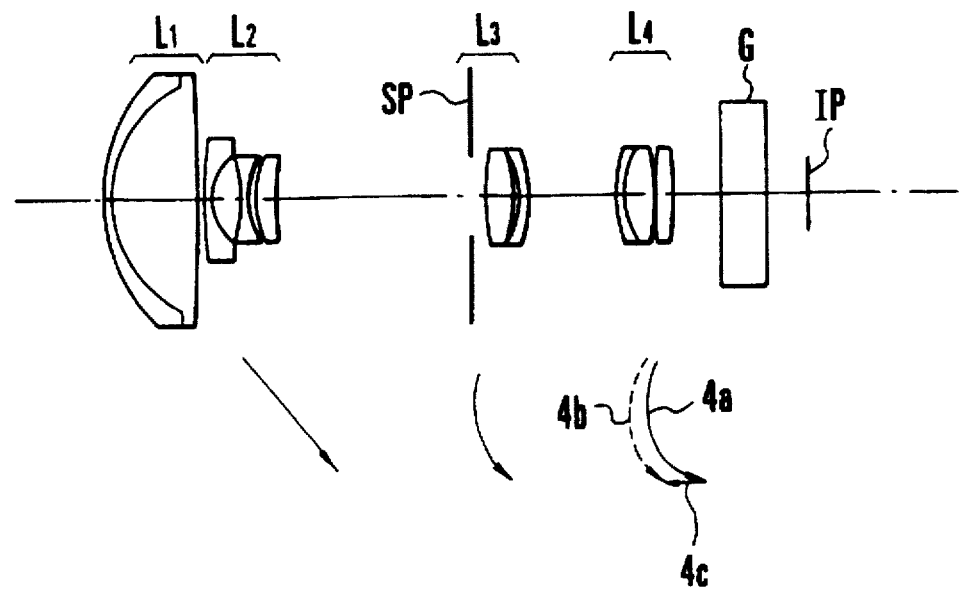
FIGS. 19(A) to 19(D) show a numerical example 19 of a zoom lens of the invention with FIG. 19(A) being a longitudinal section view and FIGS. 19(B), 19(C) and 19(D) graphic representations of the aberrations in the wide-angle end, an intermediate position and the telephoto end, respectively.
Figure 19B:
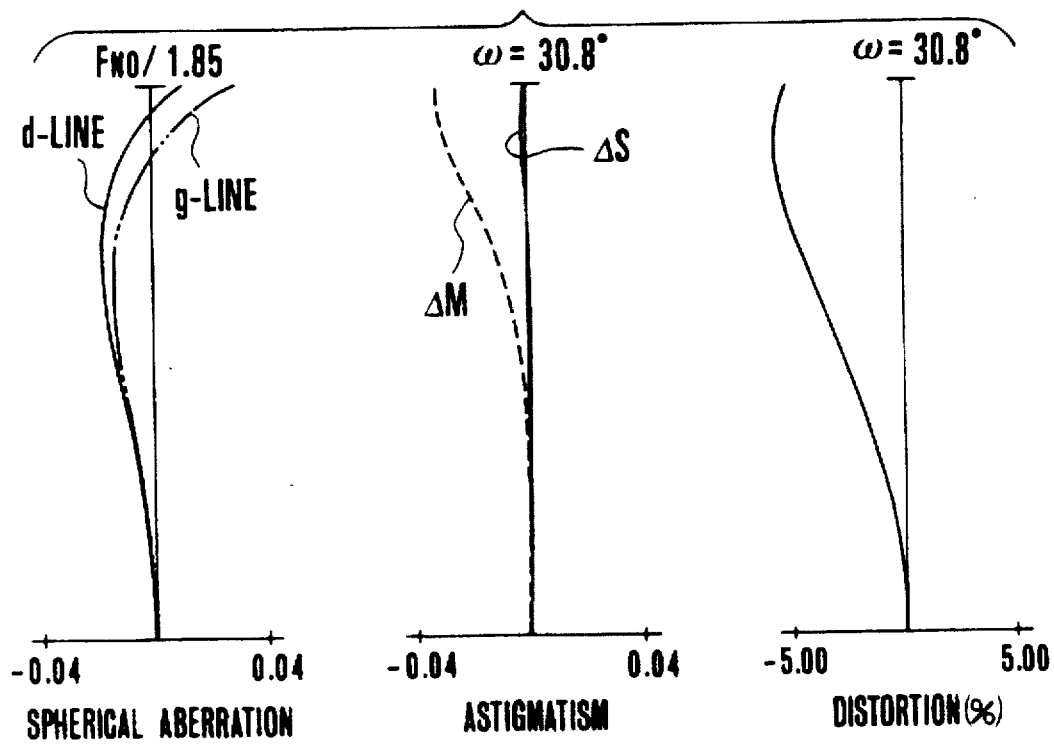
Figure 19C:
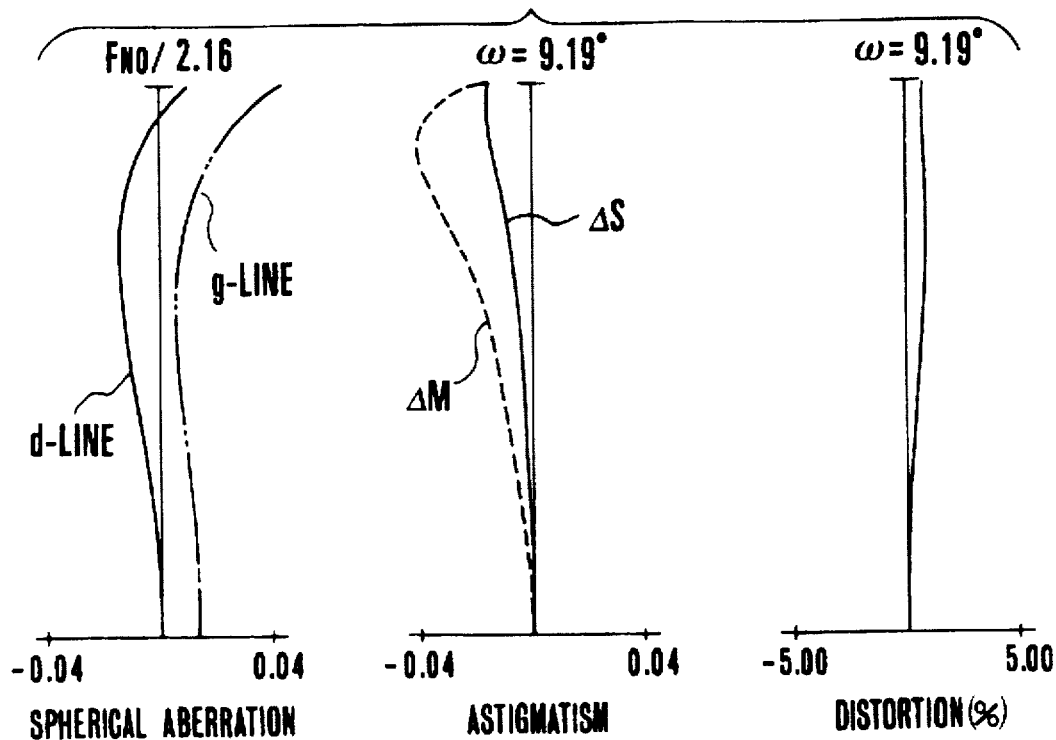
Figure 19D:
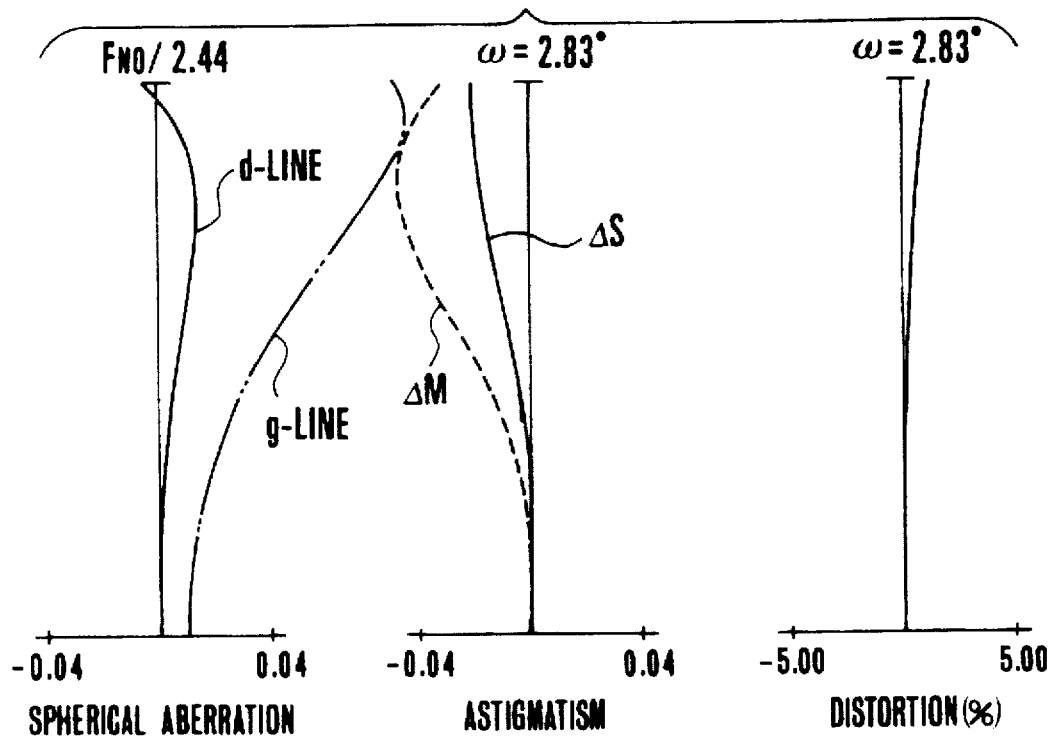
Figure 20A:
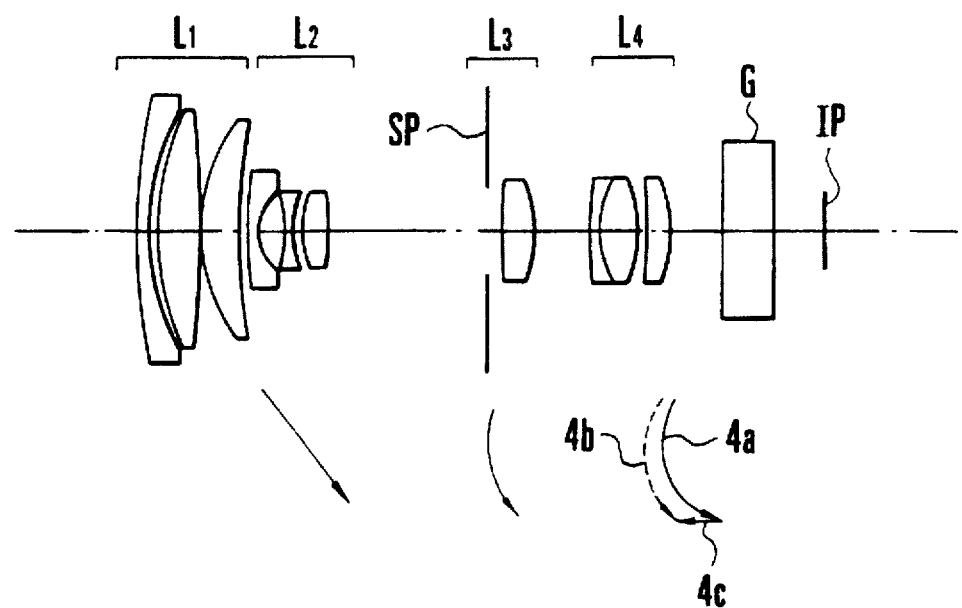
FIGS. 20(A) to 20(D) show a numerical example 20 of a zoom lens of the invention with FIG. 20(A) being a longitudinal section view and FIGS. 20(B), 20(C) and 20(D) graphic representations of the aberrations in the wide-angle end, an intermediate position and the telephoto end, respectively.
Figure 20B:
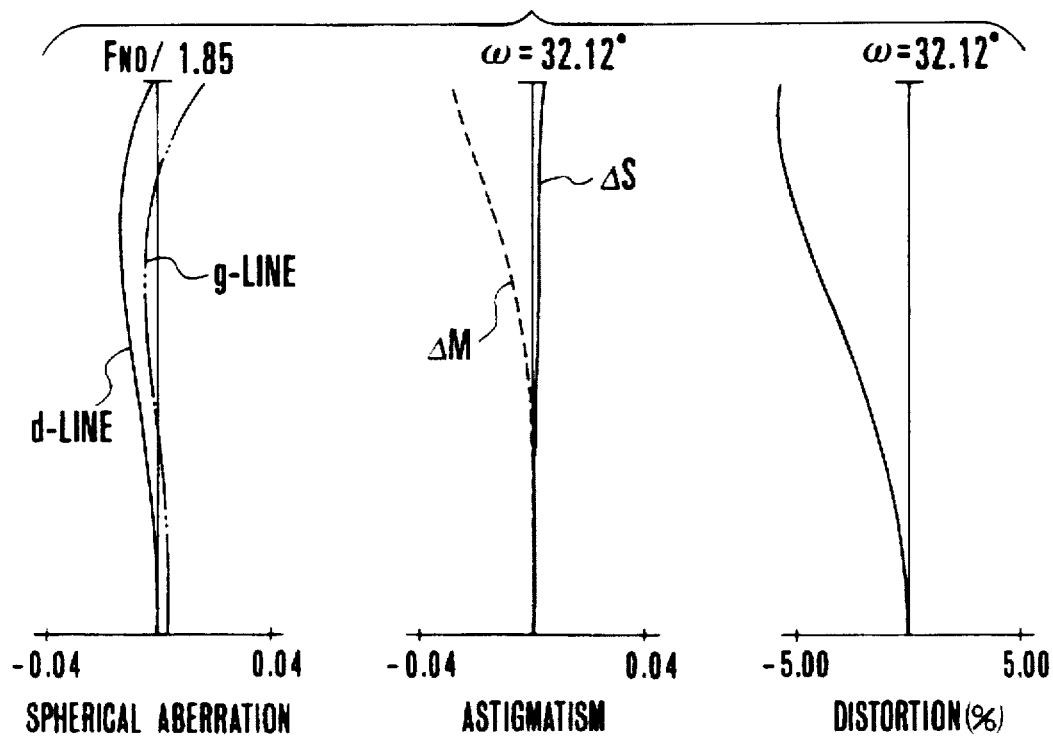
Figure 20C:
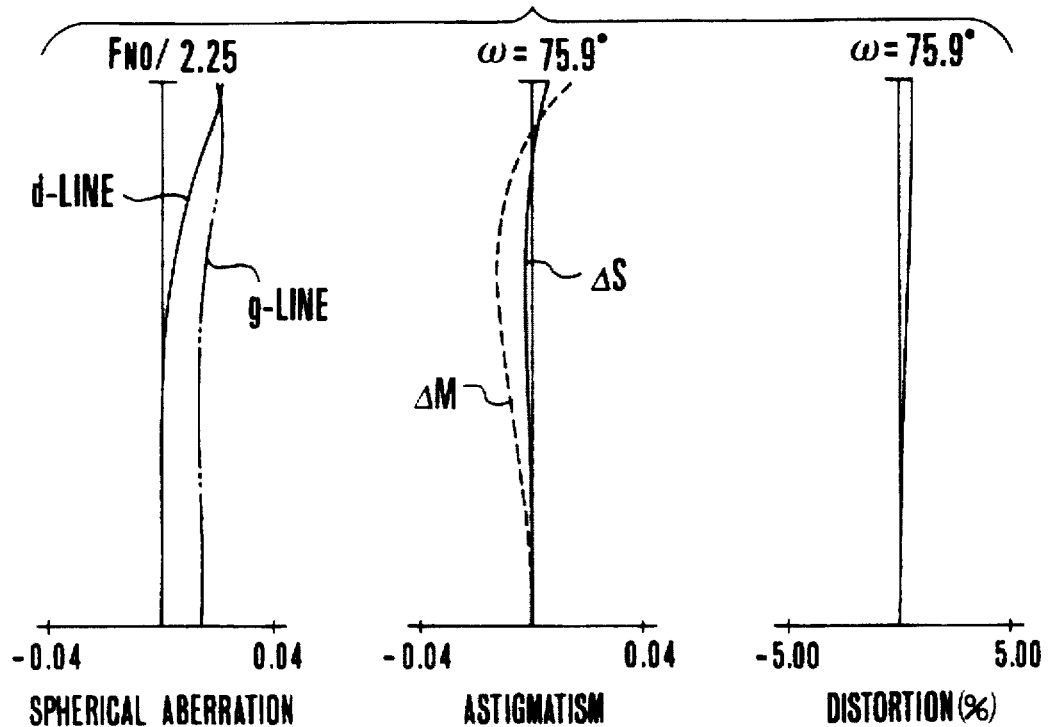
Figure 20D:
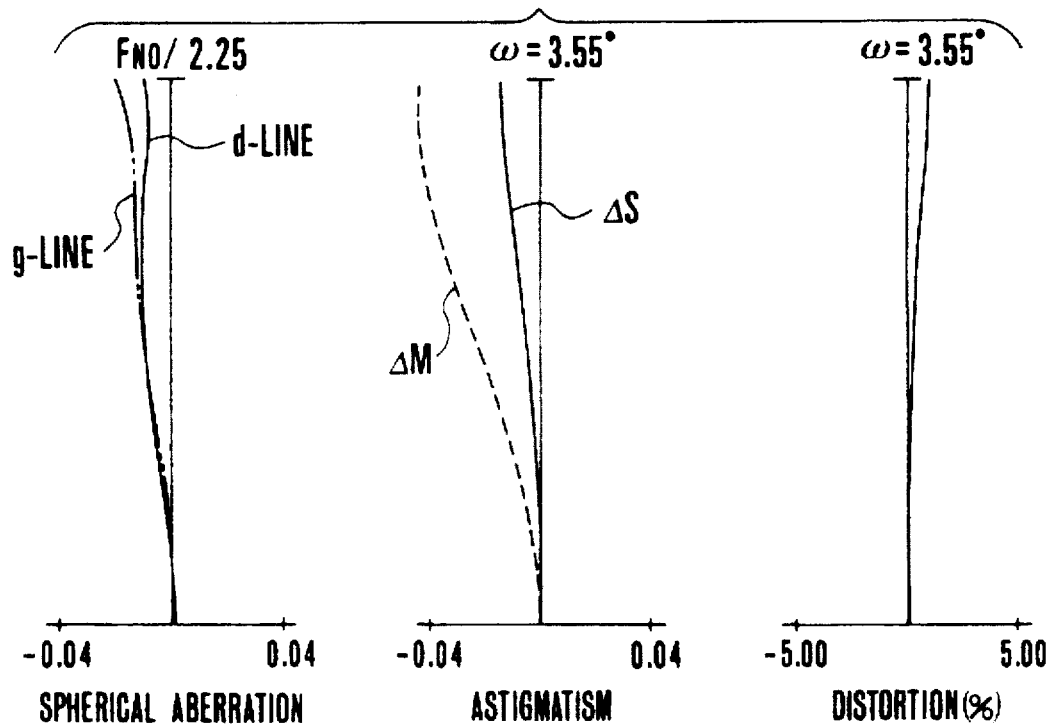
Figure 21A:
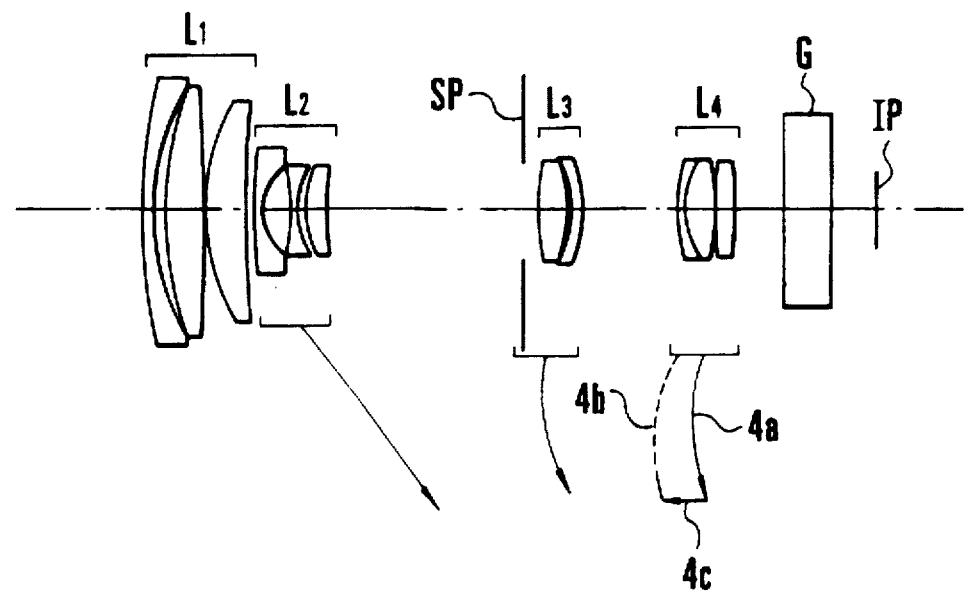
FIGS. 21(A) to 21(D) show a numerical example 21 of a zoom lens of the invention with FIG. 21(A) being a longitudinal section view and FIGS. 21(B), 21(C) and 21(D) graphic representations of the aberrations in the wide-angle end, an intermediate position and the telephoto end, respectively.
Figure 21B:
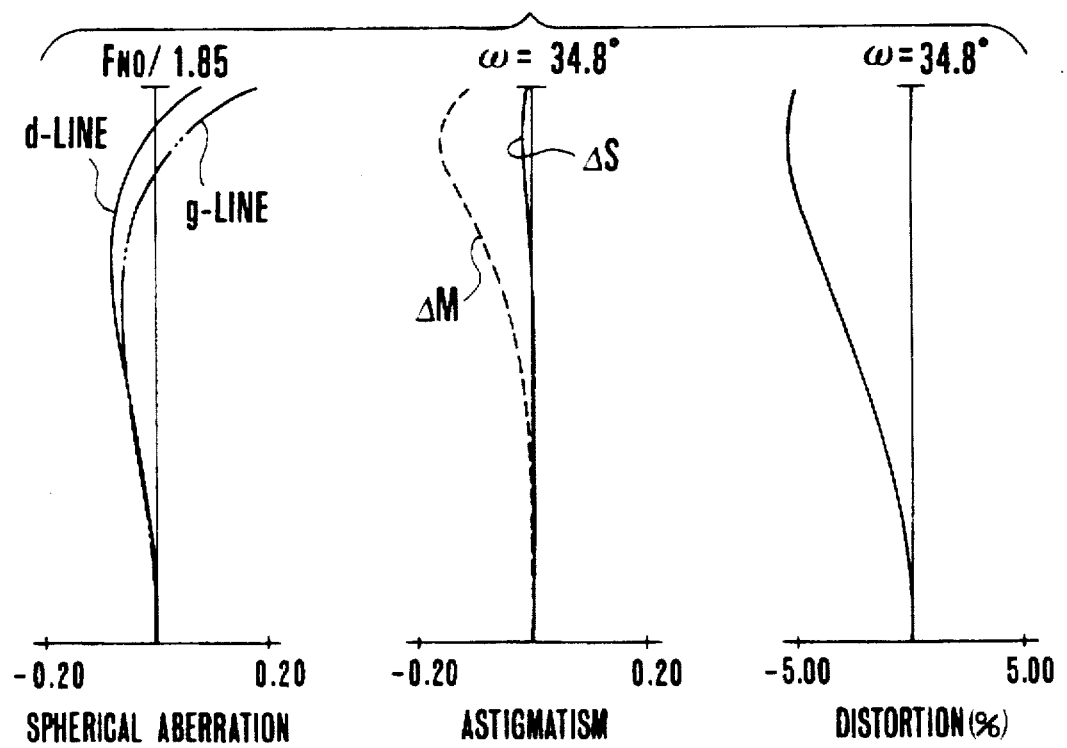
Figure 21C:
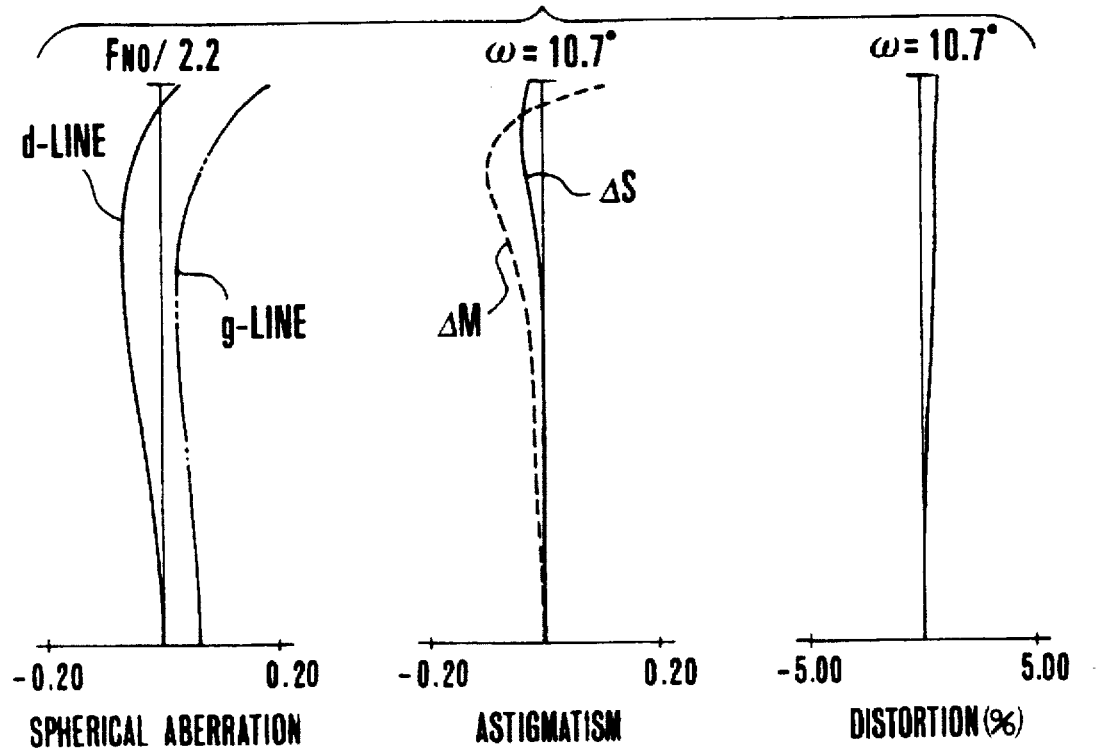
Figure 21D:
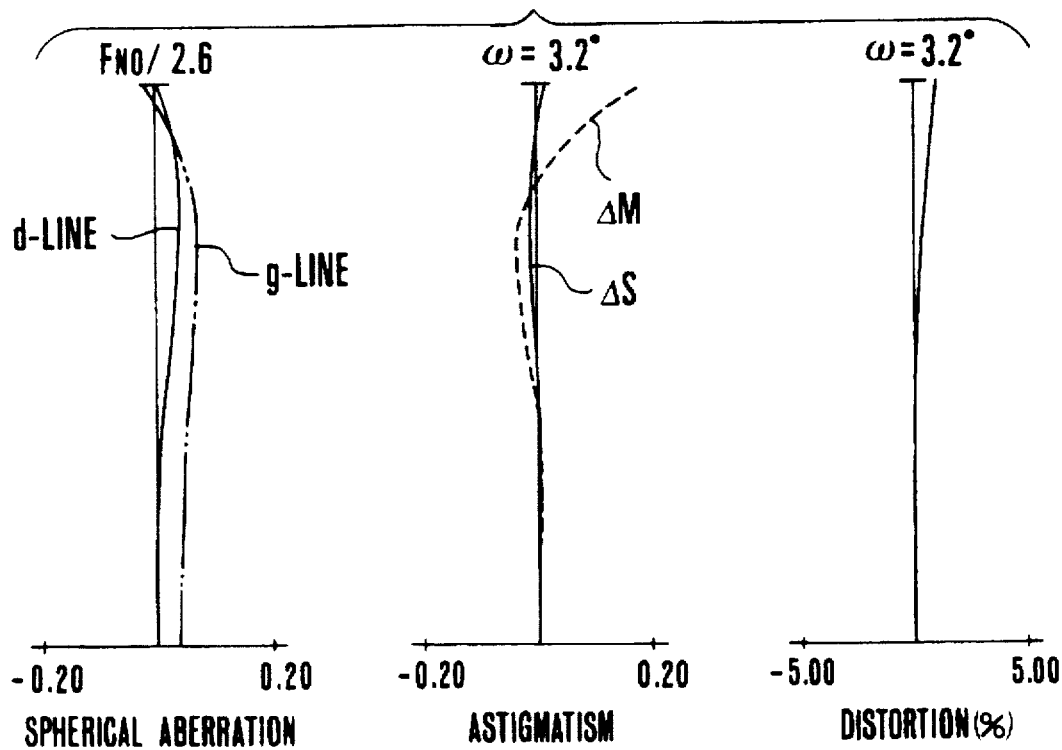
Figure 22A:
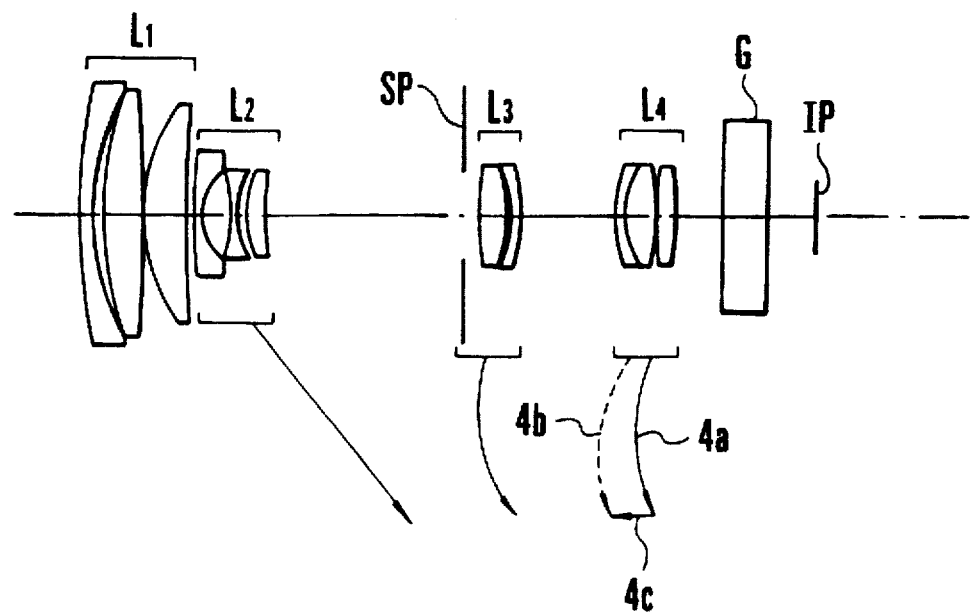
FIGS. 22(A) to 22(D) show a numerical example 22 of a zoom lens of the invention with FIG. 22(A) being a longitudinal section view and FIGS. 22(B), 22(C) and 22(D) graphic representations of the aberrations in the wide-angle end, an intermediate position and the telephoto end, respectively.
Figure 22B:
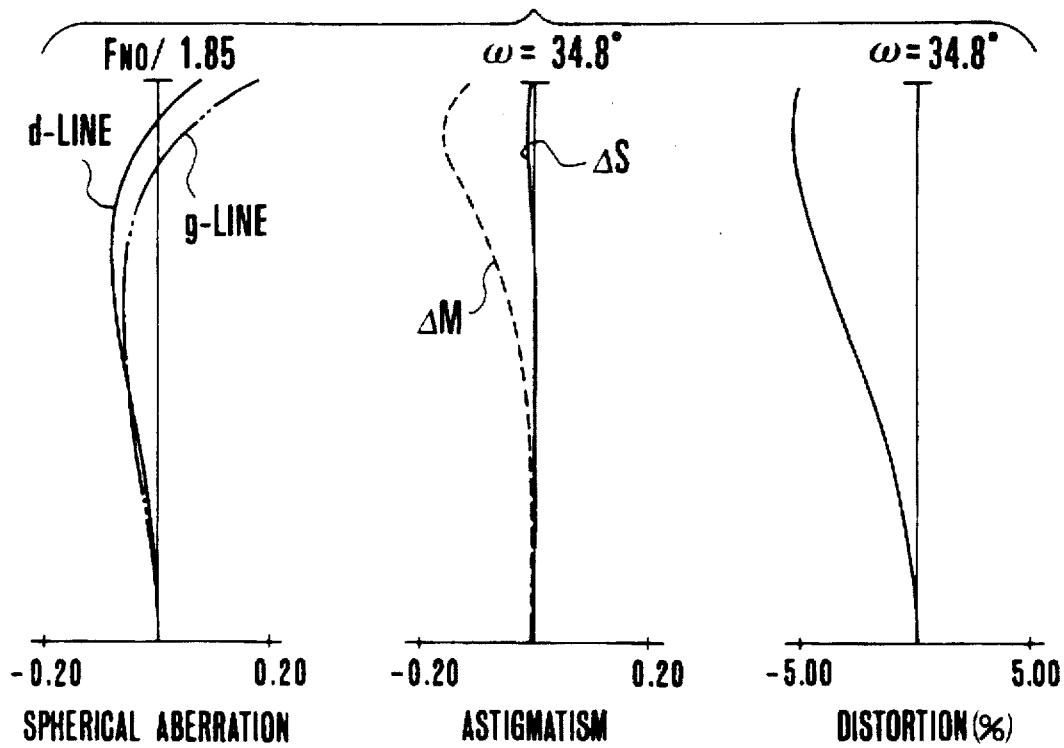
Figure 22C:
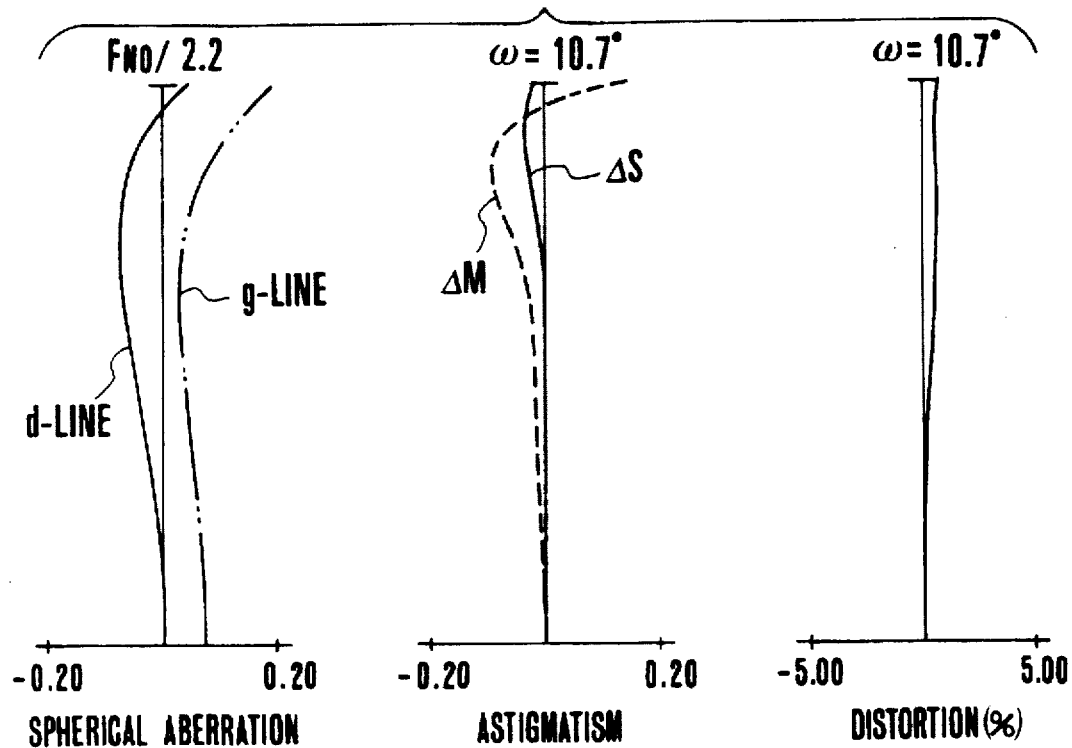
Figure 22D:
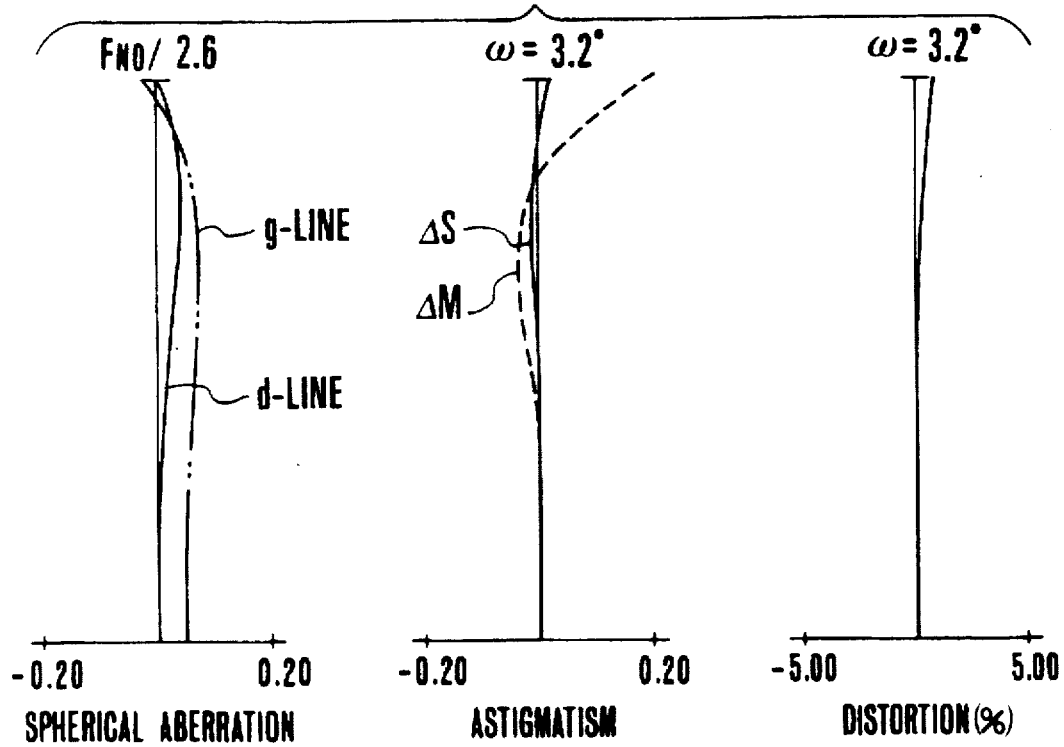
Figure 23A:
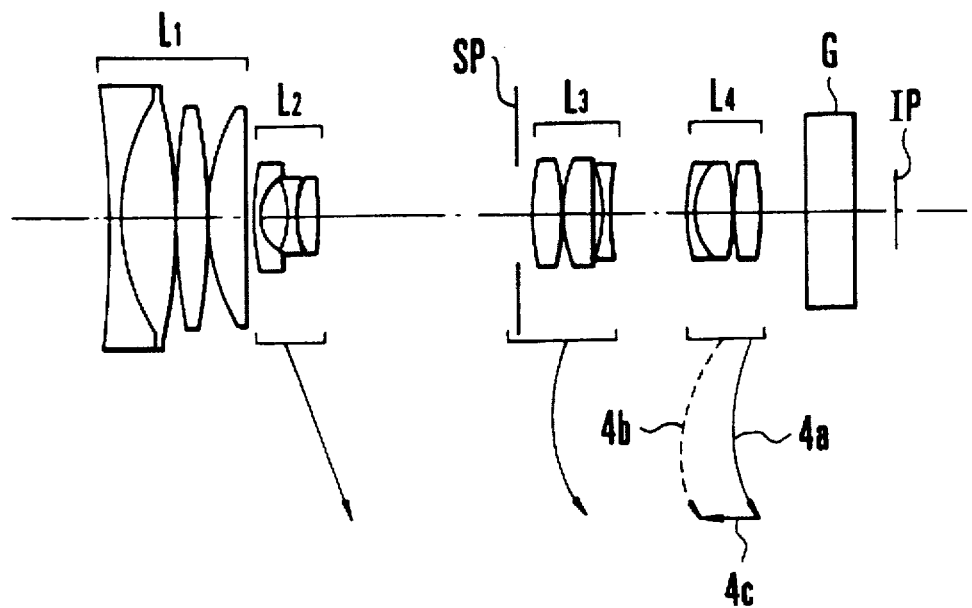
FIGS. 23(A) to 23(D) show a numerical example 23 of a zoom lens of the invention with FIG. 23(A) being a longitudinal section view and FIGS. 23(B), 23(C) and 23(D) graphic representations of the aberrations in the wide-angle end, an intermediate position and the telephoto end, respectively.
Figure 23B:
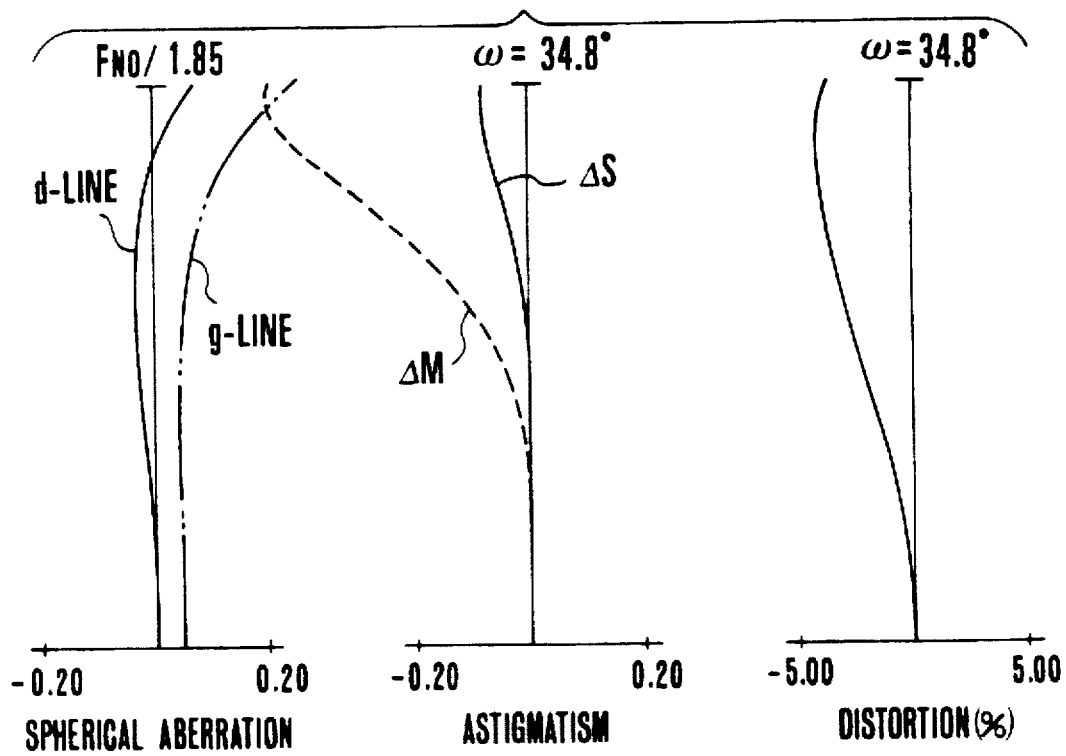
Figure 23C:
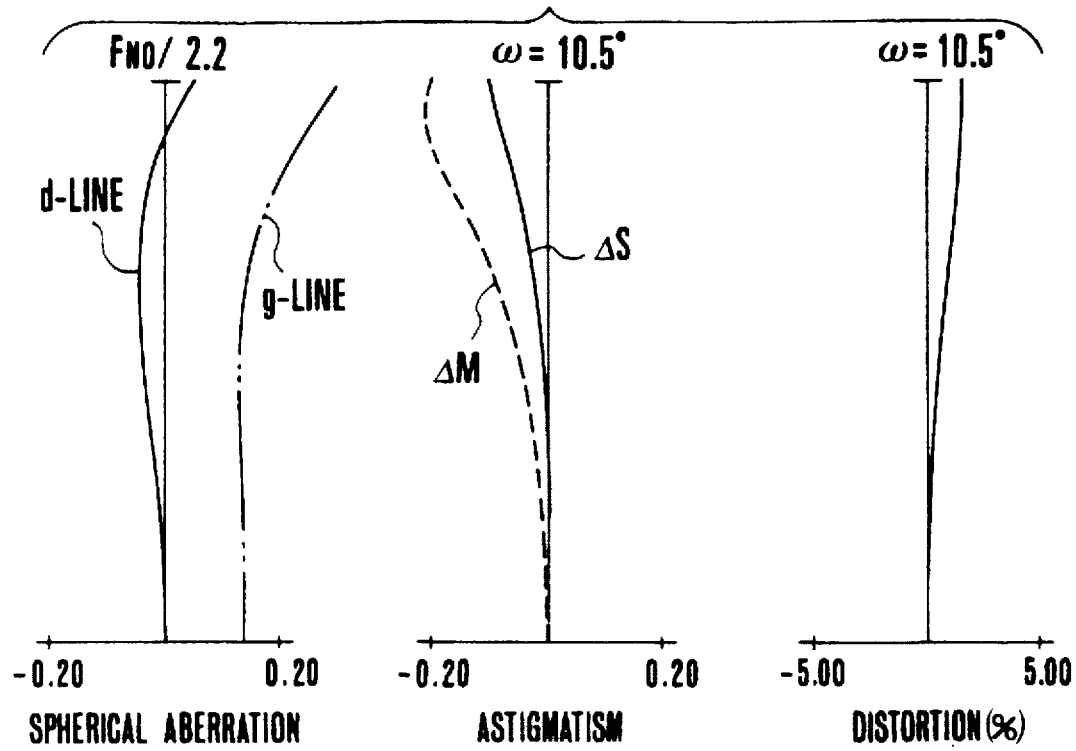
Figure 23D:
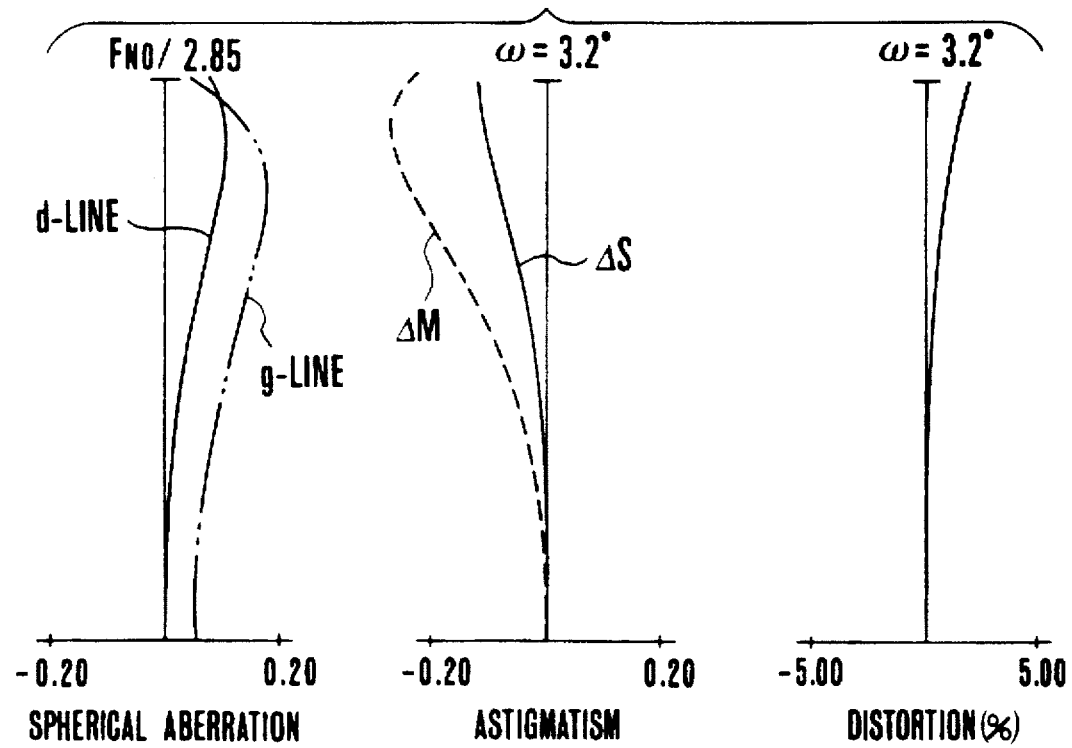
Figure 24A:
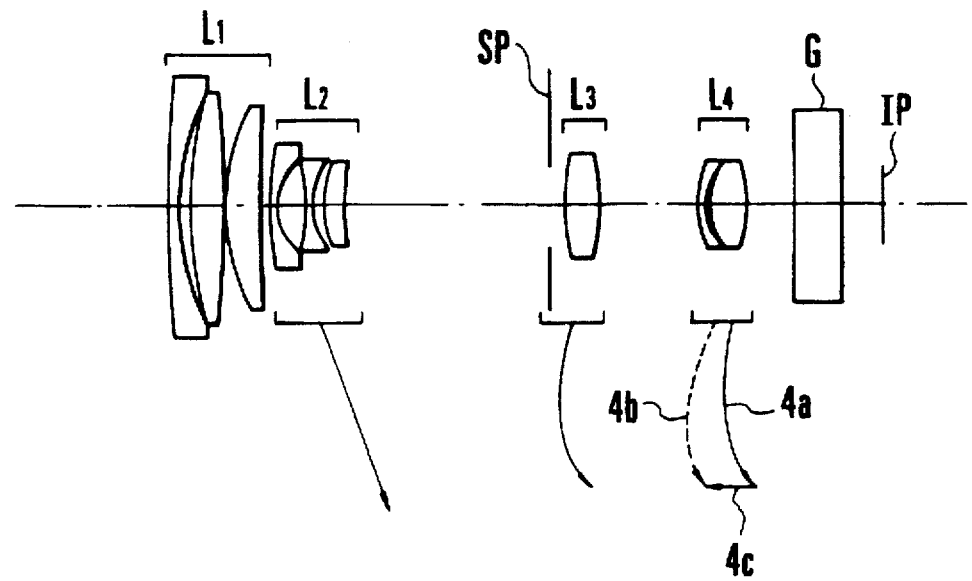
FIGS. 24(A) to 24(D) show a numerical example 24 of a zoom lens of the invention with FIG. 24(A) being a longitudinal section view and FIGS. 24(B), 24(C) and 24(D) graphic representations of the aberrations in the wide-angle end, an intermediate position and the telephoto end, respectively.
Figure 24B:
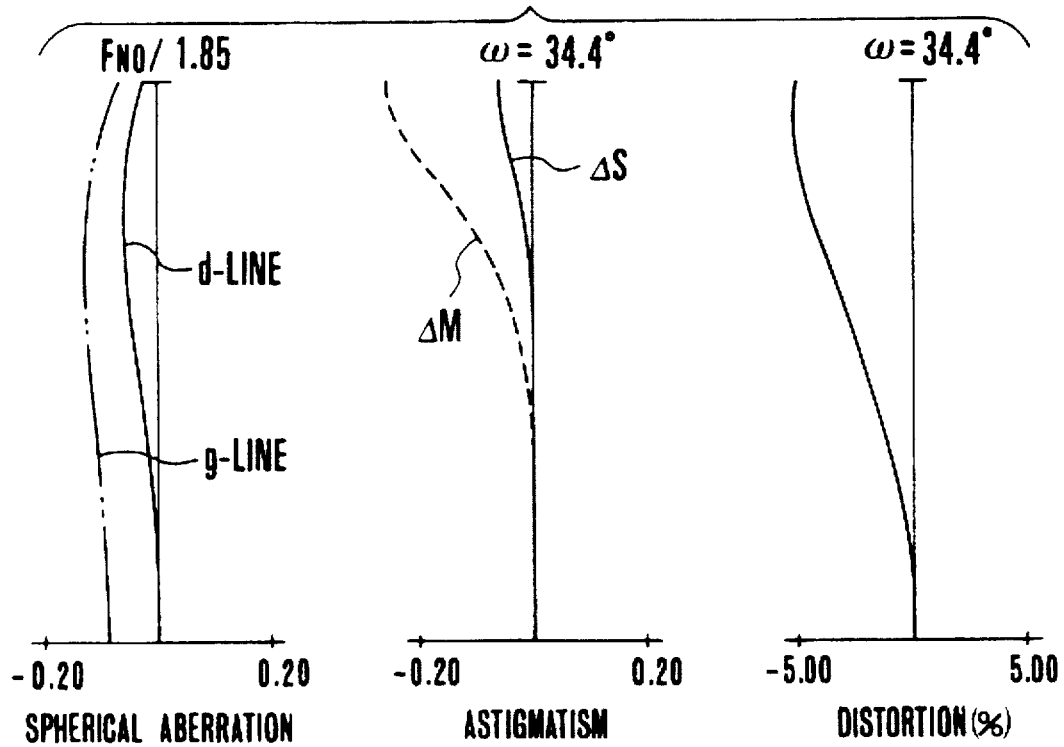
Figure 24C:
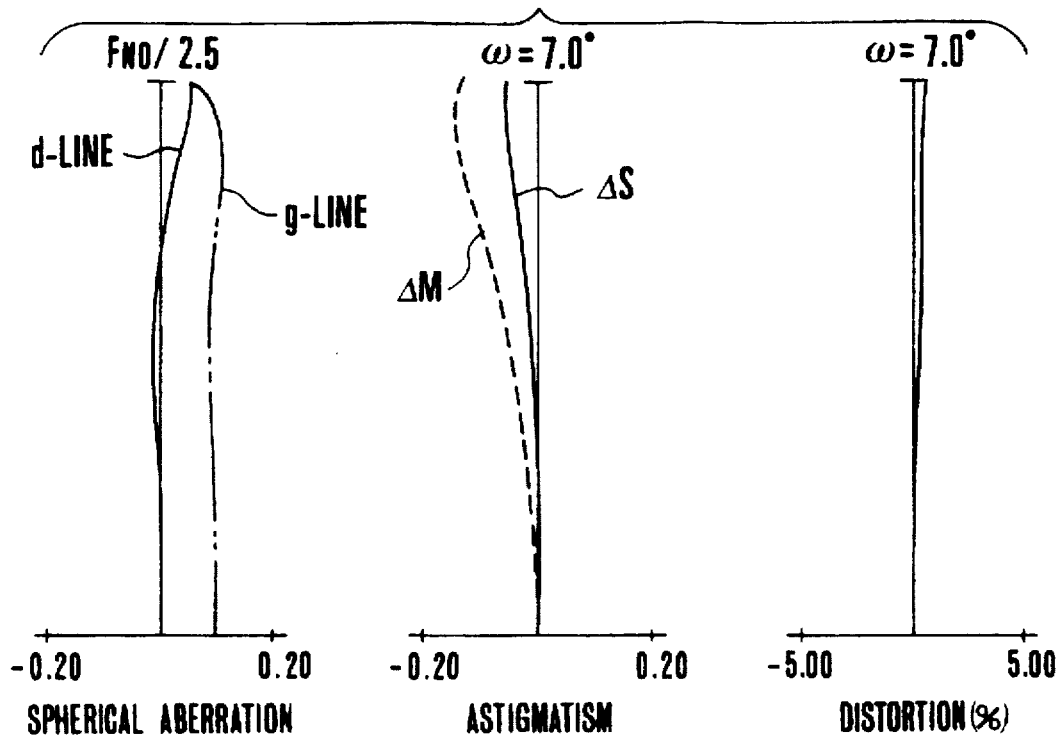
Figure 24D:
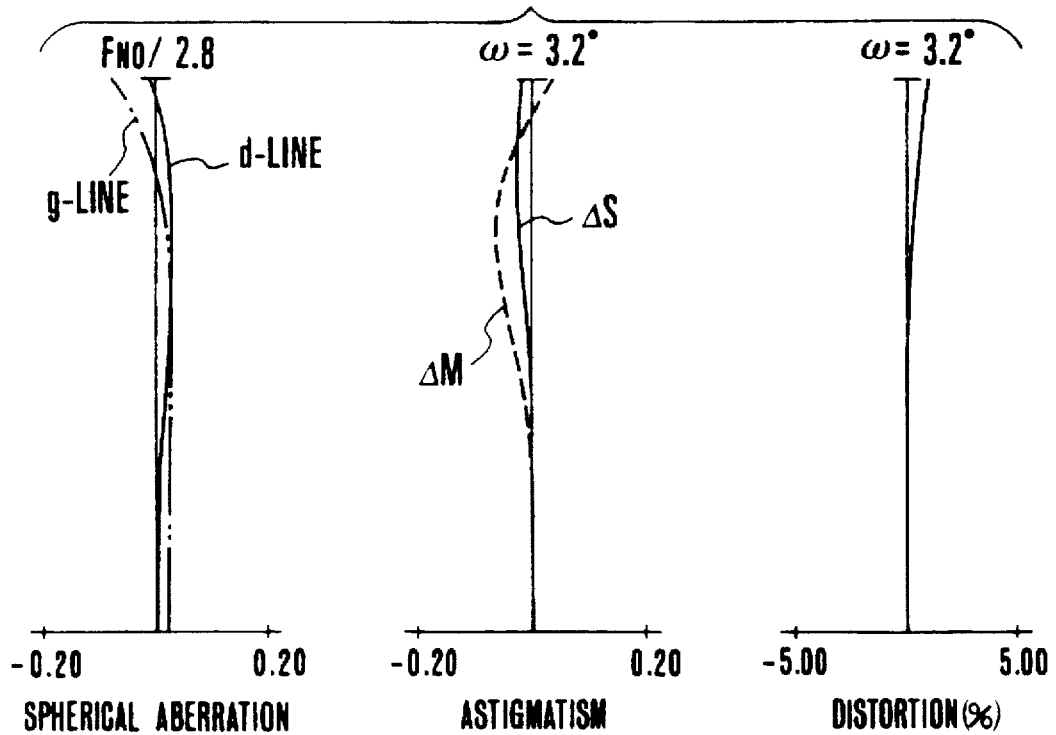
Figure 25A:
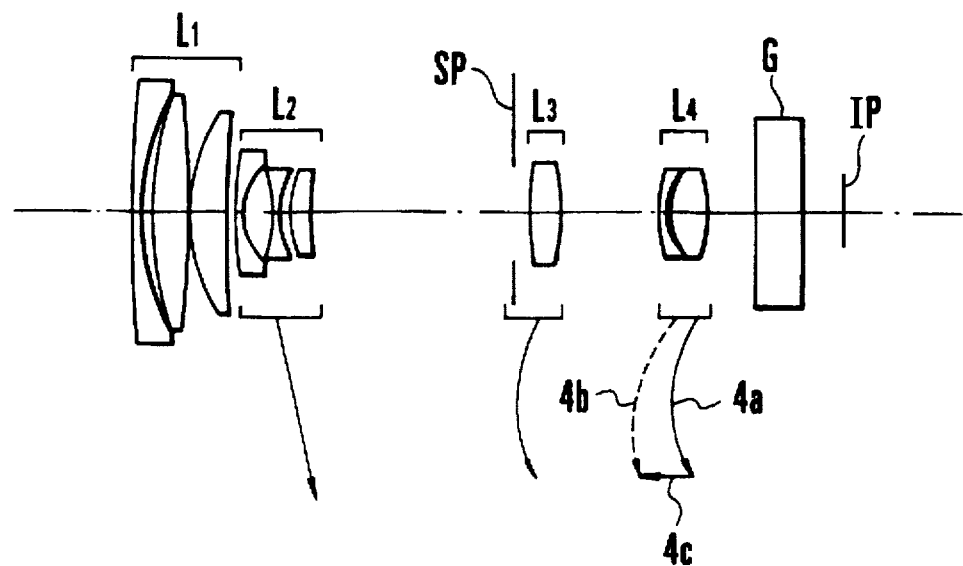
FIGS. 25(A) to 25(D) show a numerical example 25 of a zoom lens of the invention with FIG. 25(A) being a longitudinal section view and FIGS. 25(B), 25(C) and 25(D) graphic representations of the aberrations in the wide-angle end, an intermediate position and the telephoto end, respectively.
Figure 25B:
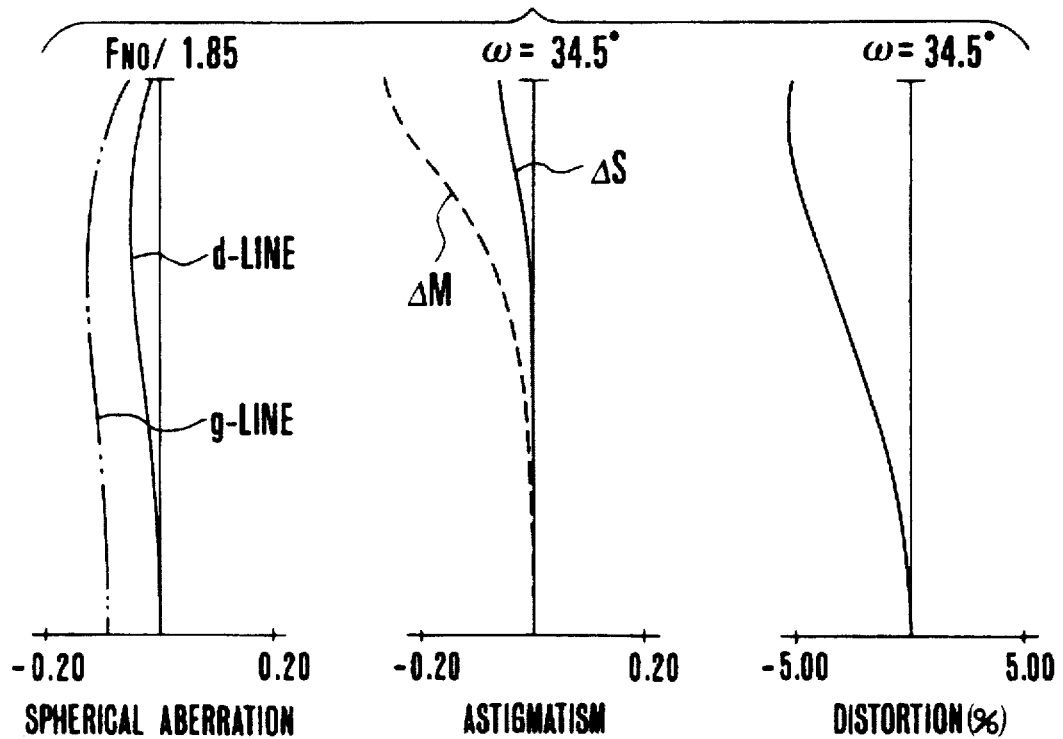
Figure 25C:
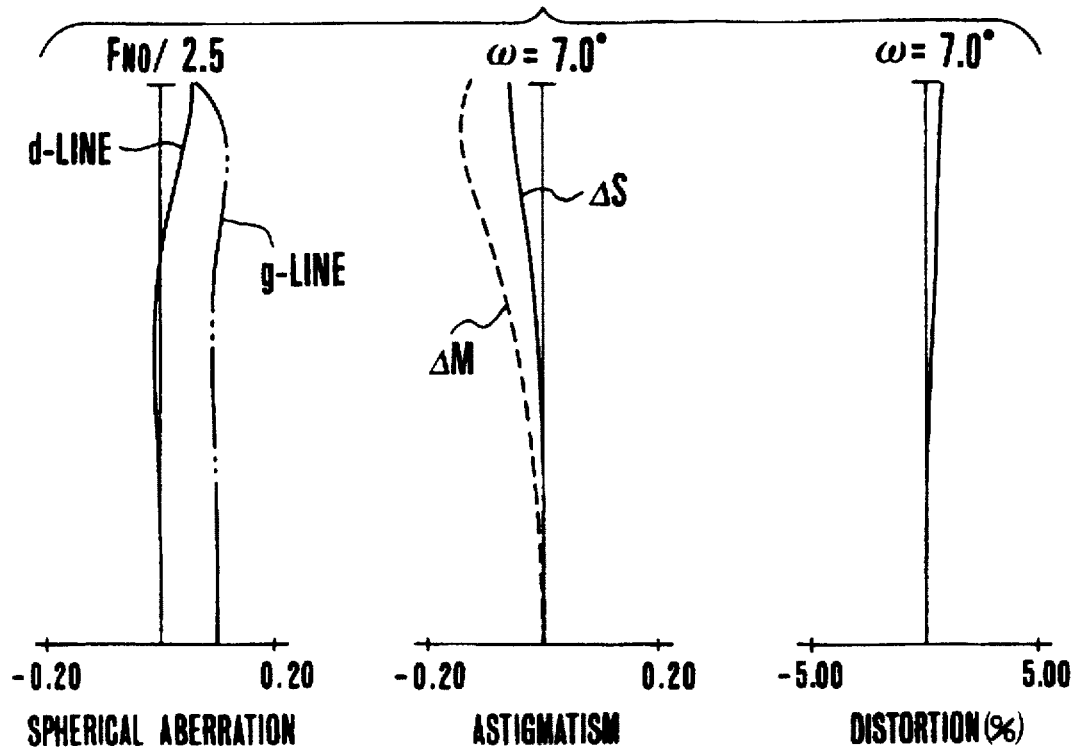
Figure 25D:
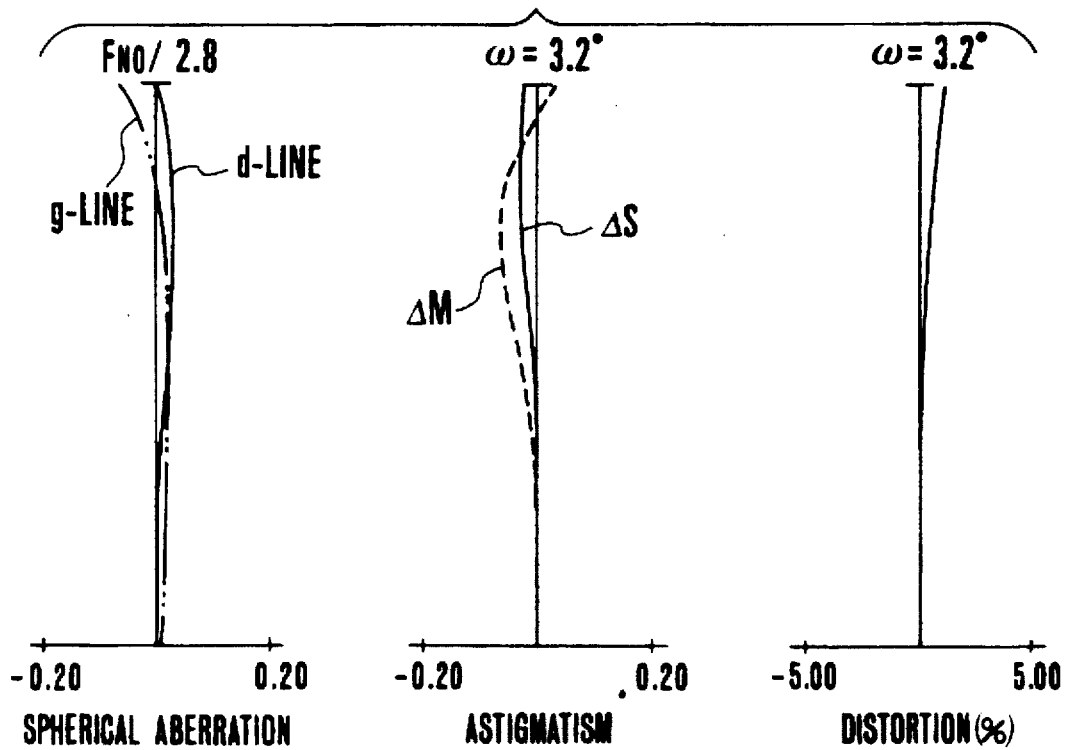
Figure 26A:
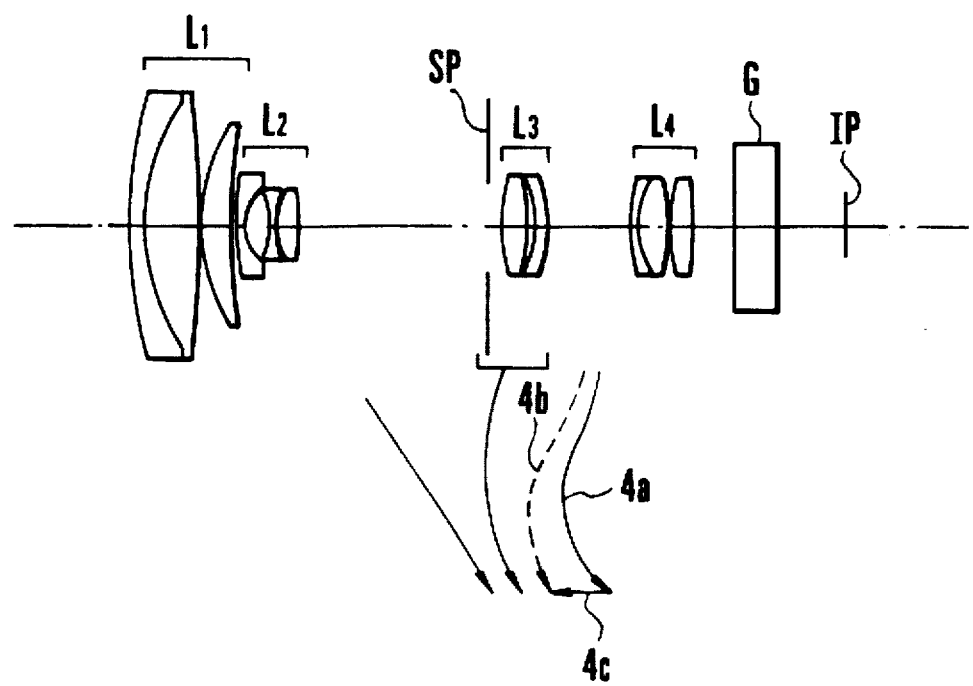
FIGS. 26(A) to 26(D) show a numerical example 26 of a zoom lens of the invention with FIG. 26(A) being a longitudinal section view and FIGS. 26(B), 26(C) and 26(D) graphic representations of the aberrations in the wide-angle end, an intermediate position and the telephoto end, respectively.
Figure 26B:
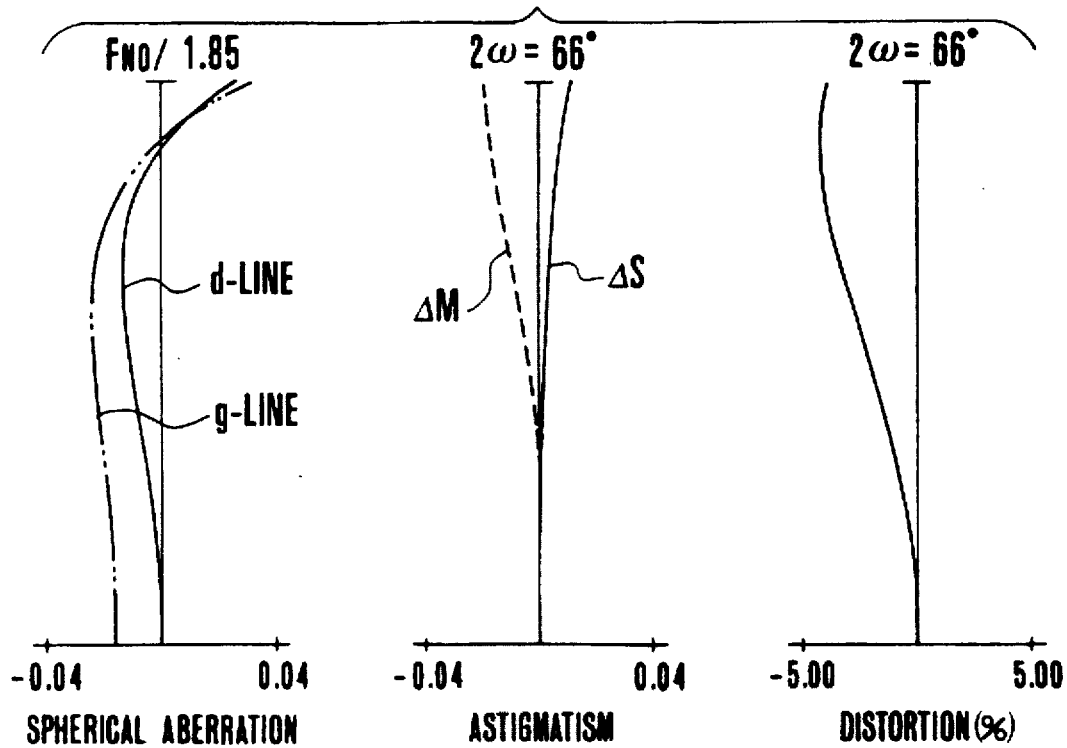
Figure 26C:
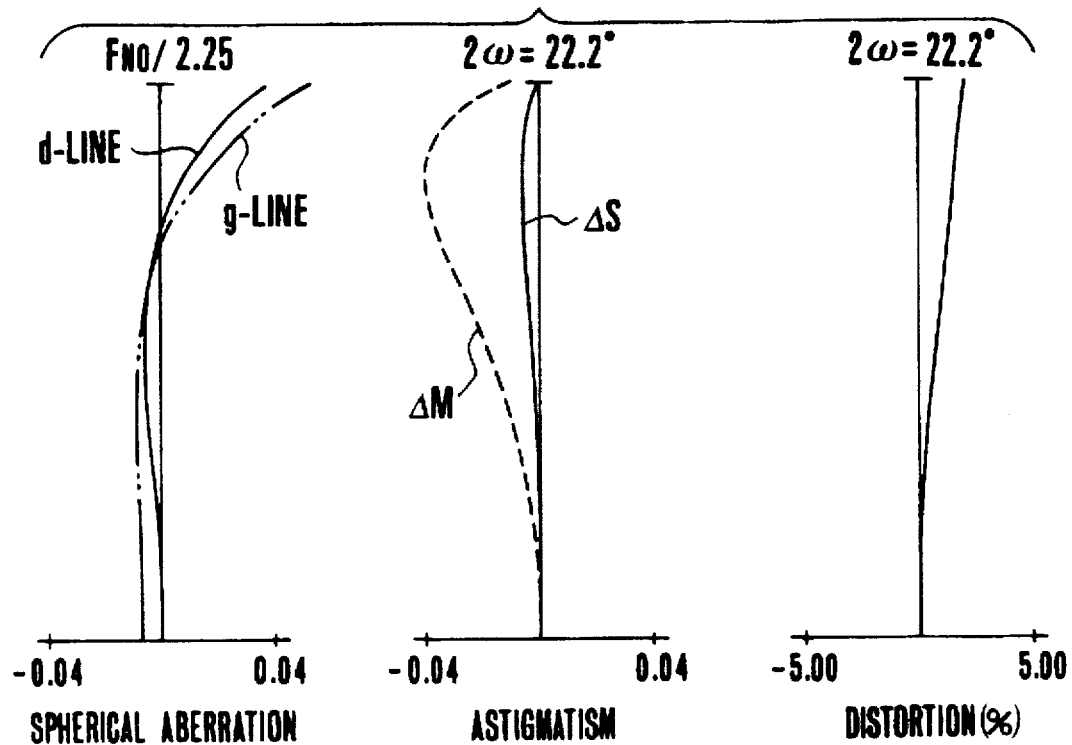
Figure 26D:
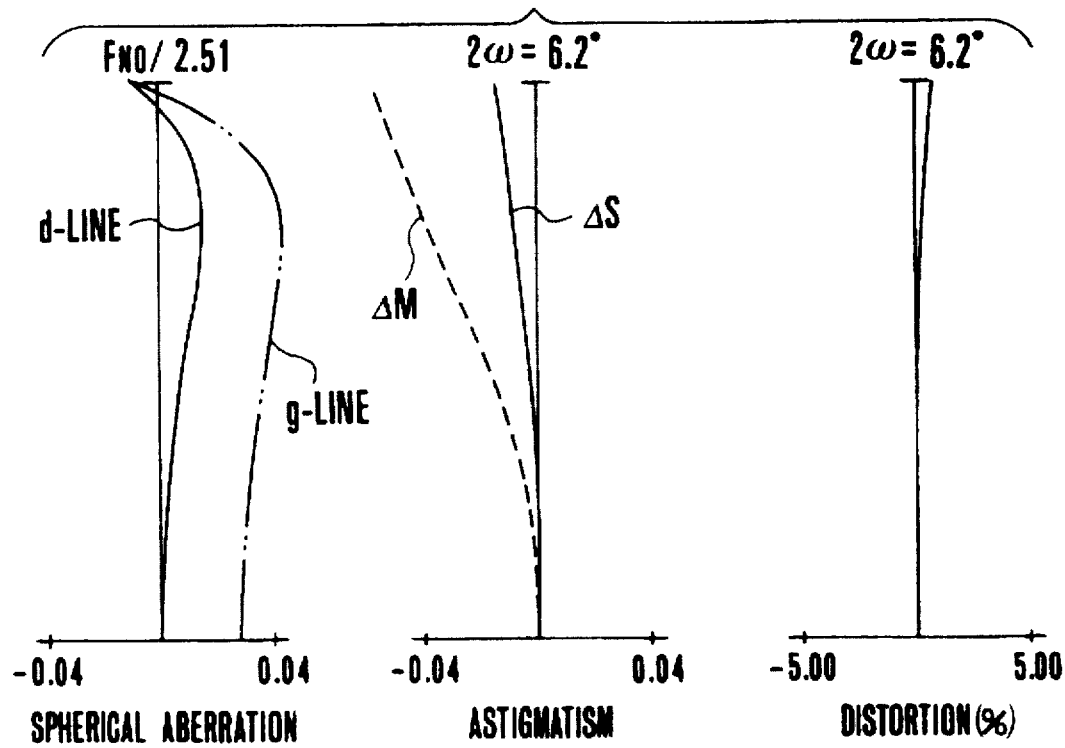
Figure 27A:
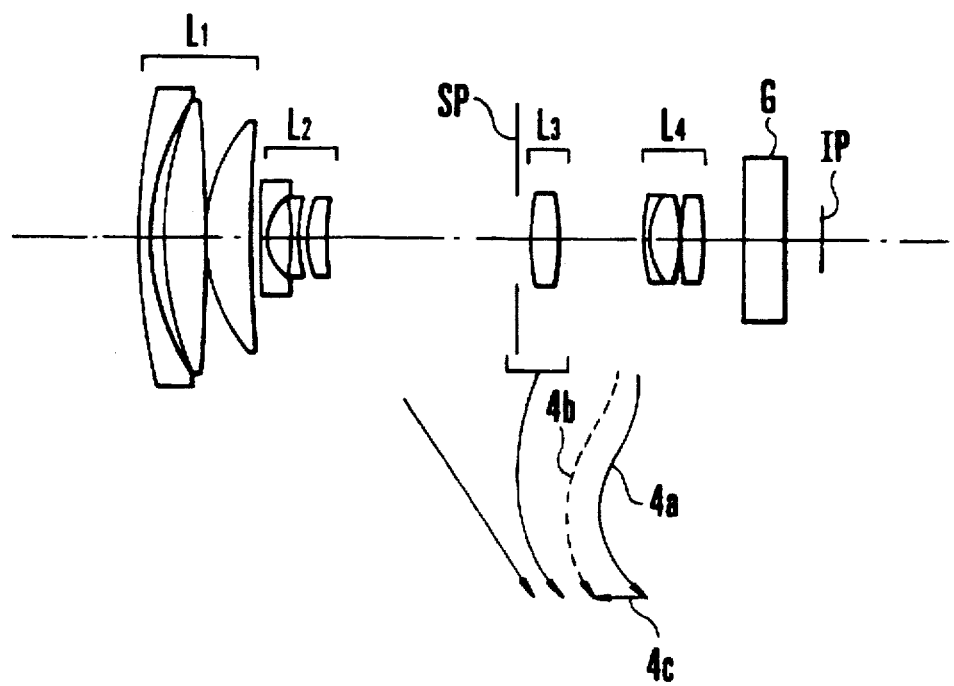
FIGS. 27(A) to 27(D) show a numerical example 27 of a zoom lens of the invention with FIG. 27(A) being a longitudinal section view and FIGS. 27(B), 27(C) and 27(D) graphic representations of the aberrations in the wide-angle end, an intermediate position and the telephoto end, respectively.
Figure 27B:
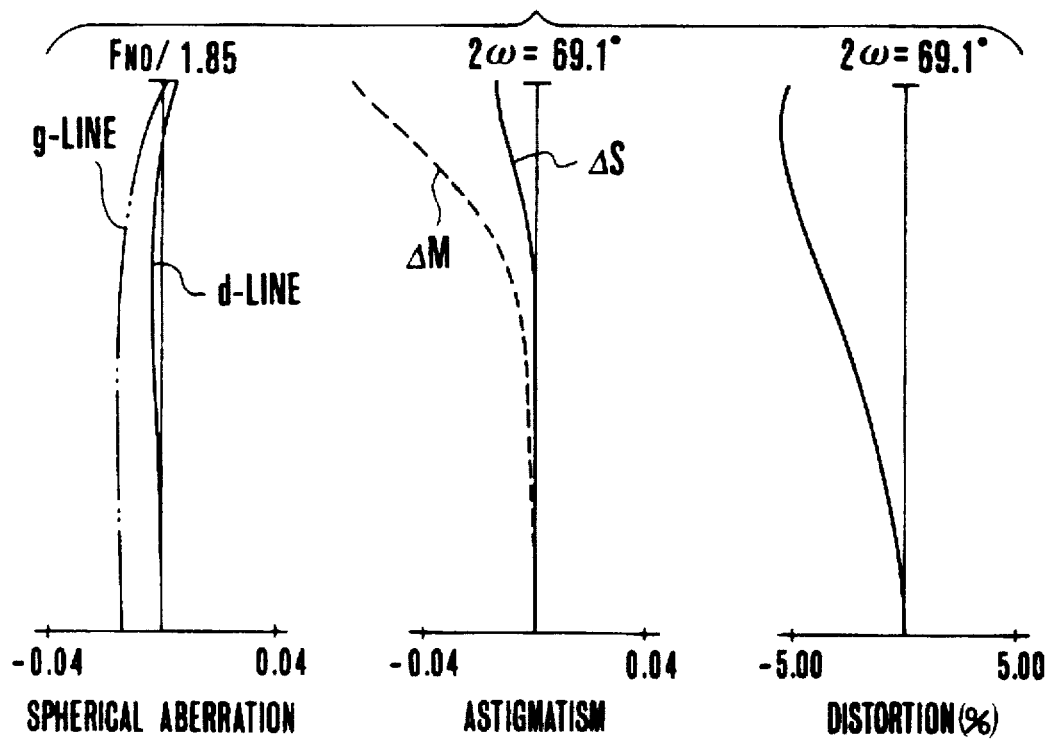
Figure 27C:
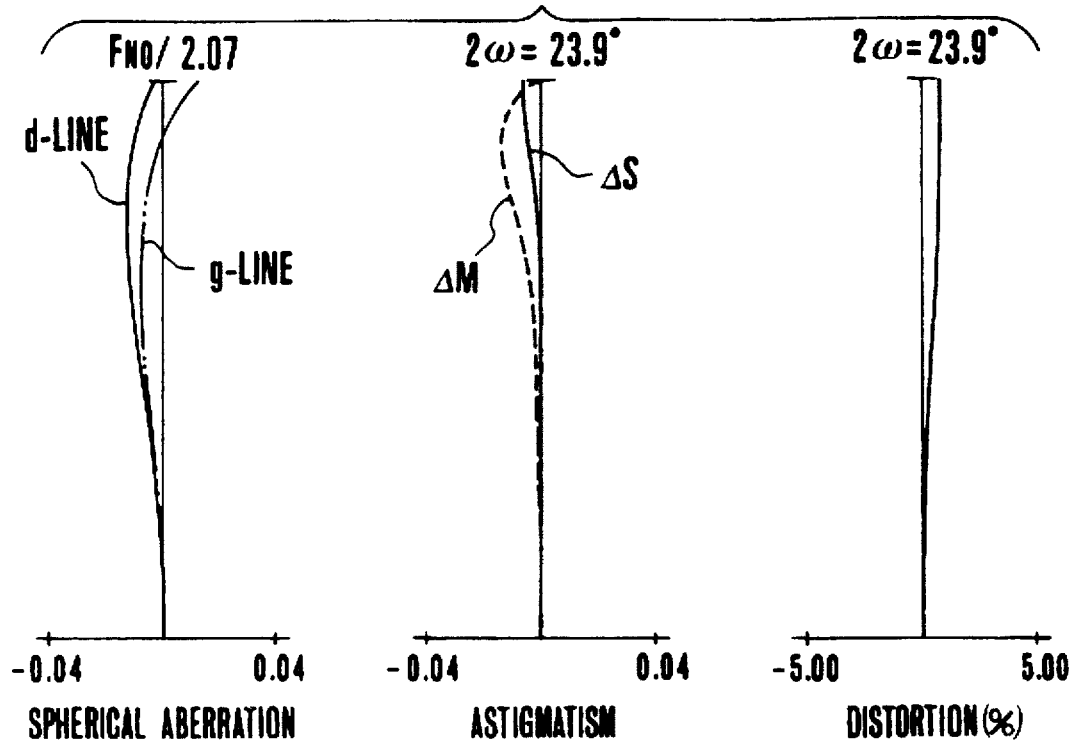
Figure 27D:
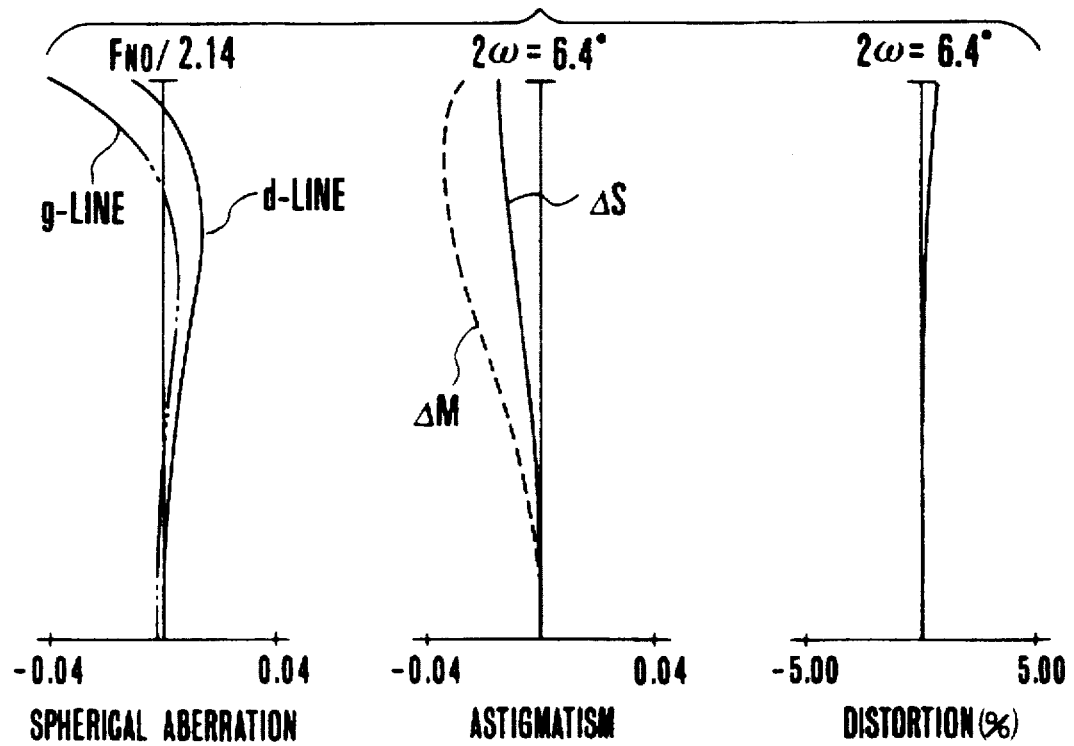
Figure 28A:
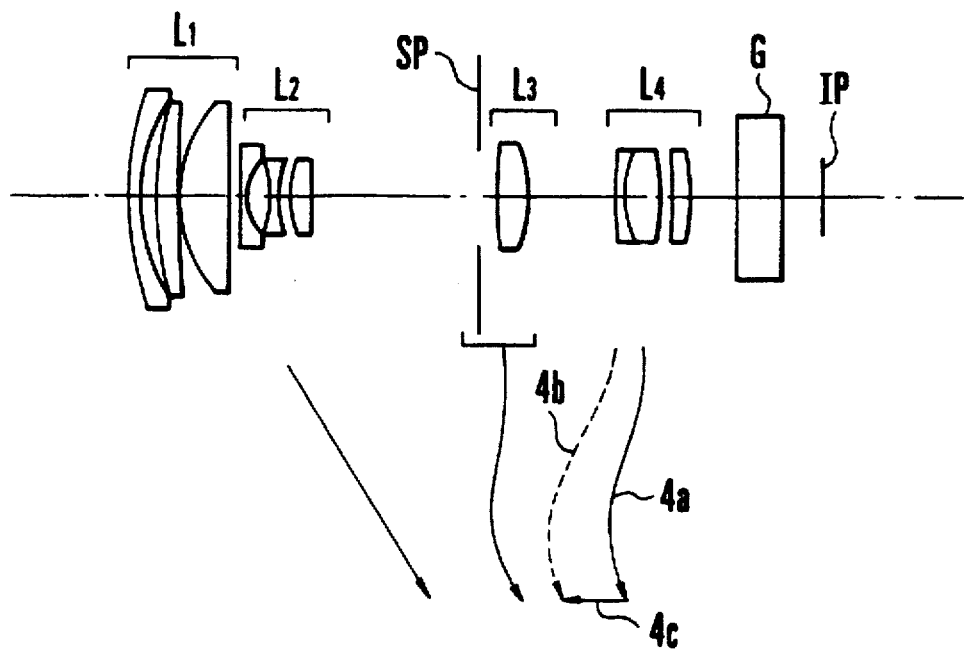
FIGS. 28(A) to 28(D) show a numerical example 28 of a zoom lens of the invention with FIG. 28(A) being a longitudinal section view and FIGS. 28(B), 28(C) and 28(D) graphic representations of the aberrations in the wide-angle end, an intermediate position and the telephoto end, respectively.
Figure 28B:
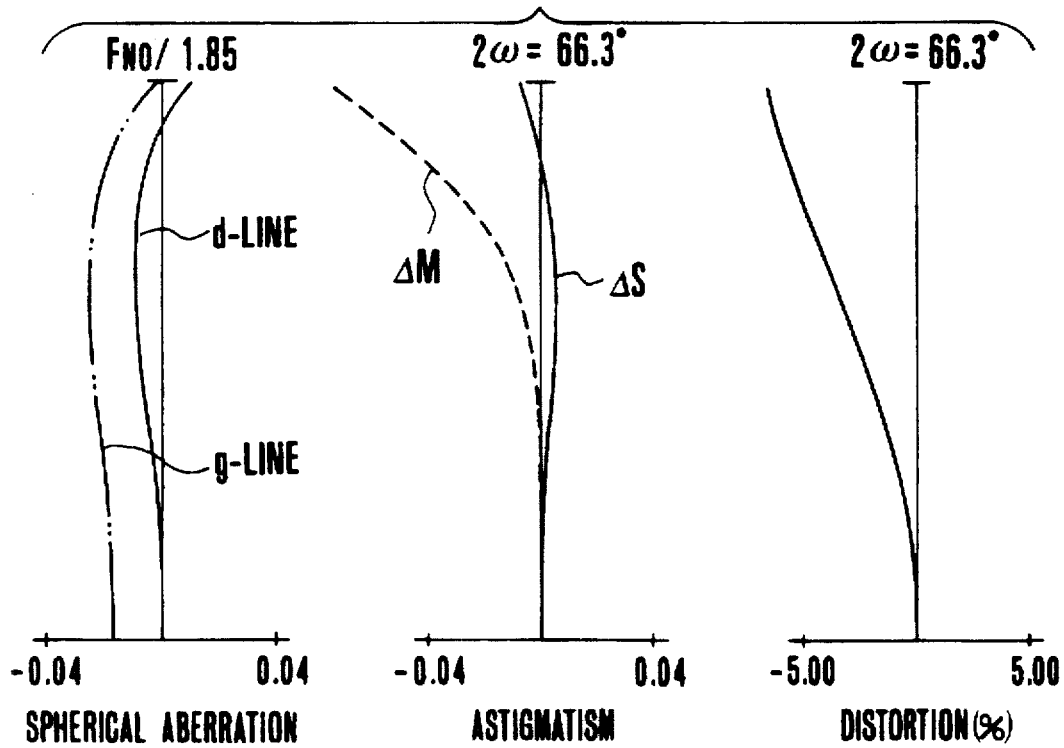
Figure 28C:
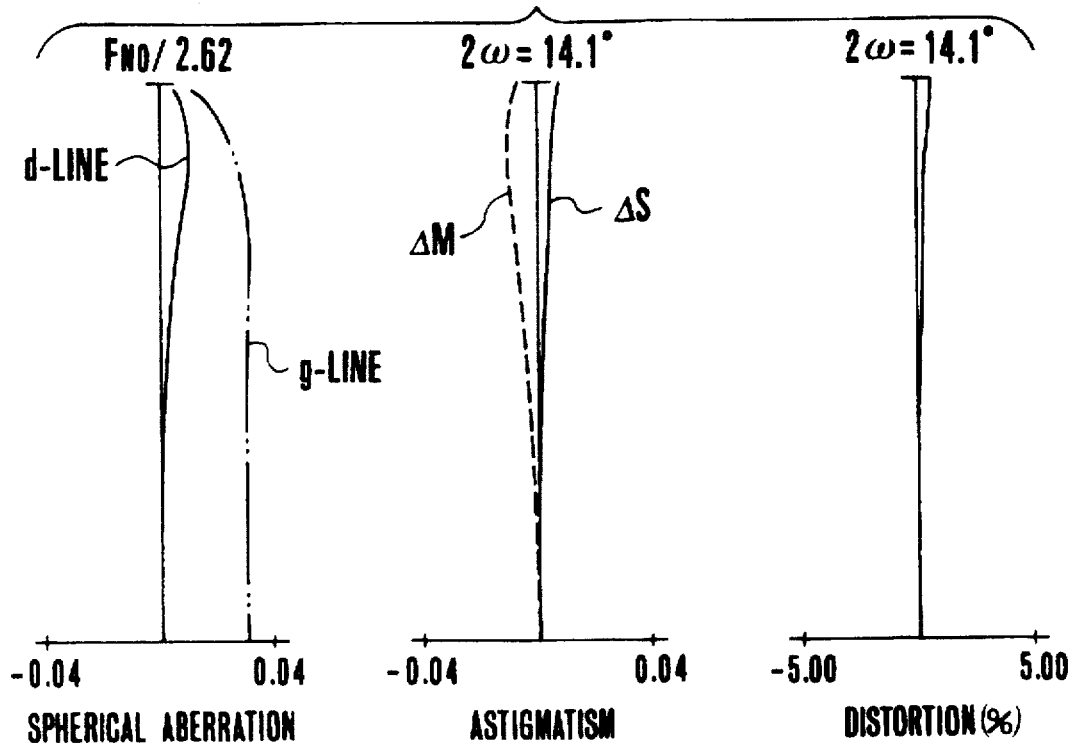
Figure 28D:
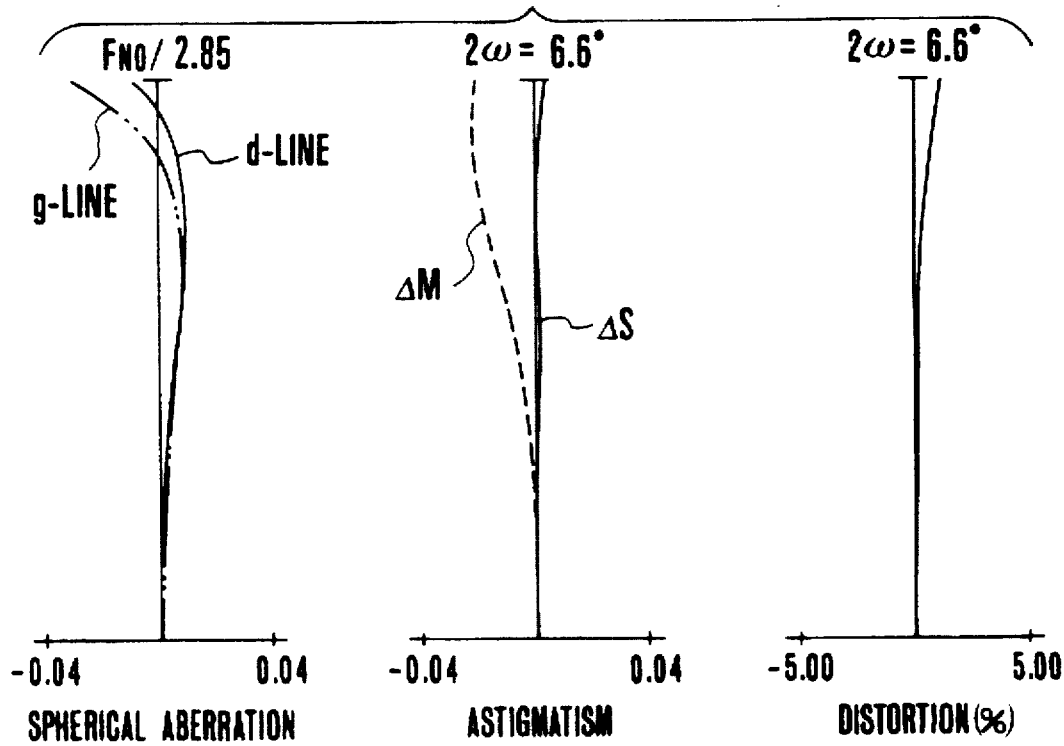

FIGS. 1(A) to 1(D) through FIGS. 28(A) to 28(D) in the longitudinal section view and graphic representations of the aberrations show the numerical examples of embodiments of the invention. Figures having the figure numbers with the suffixes (B), (C) and (D) show the various aberration curves in the wide-angle end, an intermediate position and the telephoto end, respectively.

Particularly in the numerical examples 1 to 13 and 17 to 28, the zoom lens comprises, from front to rear, a first lens unit I having a positive refractive power, a second lens unit II having a negative refractive power, a third lens unit III having a positive refractive power, and a fourth lens unit IV having a positive refractive power. A stop S is fixedly mounted on the front of the third lens unit III. Zooming from the wide-angle end to the telephoto end is performed by moving the second lens unit II, the third lens unit III and the fourth lens unit IV as indicated by the arrows. In the meantime, focusing is performed by moving the fourth lens unit IV. The first lens unit I is made always stationary. Also, in the examples 14 to 16, the third lens unit III, too, is made to remain stationary.

Each of the numerical examples of the zoom lenses of the invention satisfies the following condition:

$$-0.3 < M3max/\phi_1 \leq 0 \quad (1)$$

where M3max is the maximum value of the amount of axial movement of the third lens unit and the stop from the wide-angle end (the forward movement being taken as negative), and $\phi_1$ is the outer diameter of a frontmost lens of the zoom lens. Particularly for the zoom lens having the third lens unit made movable, it is desirable that the third lens unit moves within a range of $$-0.3 \leq M3max/\phi_1 \leq -0.04.$$

In the conventional zoom lens, when zoomed to an intermediate position nearer to the wide-angle end, the off-axial light beam enters the first lens unit at a highest height, because the entrance pupil lies far behind (deep from) the first lens unit. If this position for the highest height of incidence can be brought to near coincidence with the wide-angle end by moving the entrance pupil, that is, the stop, it becomes possible to most effectively reduce the outer diameter of the first lens unit. In this respect, the third lens unit and the stop are made to move in unison, while depicting a locus convex toward the object side. Such a feature is favorable not only to the reduction of the diameter of the front lens element but also to a simplification of the structure of the operating mechanism.

On this occasion, the first lens unit remains stationary during zooming. This is valid also for simplifying the structure of the operating mechanism.

Again, a premise is set forth that the focusing provision is made in the aforesaid fourth lens unit. By the way, what is commonly known in the focusing art is to axially move the first lens unit, or the so-called front focus type. The use of this type calls for a great increase of the diameter of the front lens element so that the corner illumination is high enough when shooting an object at the minimum distance on the wide-angle side. For this reason, with the use of this focus type, the compact form which constitutes one of the objects of the invention becomes difficult to accomplish. So, it is necessary to let the fourth lens unit partake the focusing function.

In particular, the formulated feature, or the inequalities (1) set forth the specific movement of the third lens unit and the stop for the purpose of advantageously reducing the outer diameter of the first lens unit.

When the upper limit of the inequalities (1) is exceeded, the above-mentioned position for the highest height of incidence of the off-axial light beam on the first lens unit falls near the wide-angle end in an intermediate region of the zooming range. This does not permit the diameter of the front lens element to be reduced as desired, leaving it bulky. When the lower limit is exceeded, as this means a large range of movement of the third lens unit, the total length of the entire system is increased objectionably.

By setting forth such a rule of design, the outer diameter of the first lens unit can be made minimum most efficiently. As a result, an improvement of the compact form of the zoom lens is achieved.

The term "front lens diameter $\phi_1$" used here corresponds to the optical effective diameter of the first lens element. In actual practice, it means the trim diameter of a lens. So, the front lens diameter $\phi_1$ is assumed to be 0 to 6% larger than the optical effective diameter of the first lens element.

Another rule of design for the minimization of the front lens diameter is that the aforesaid stop be arranged at the frontmost place in the third lens unit. By this arrangement, the entrance pupil takes a possible shallowest position from the first lens unit, thereby giving an advantage of minimizing the outer diameter of the first lens unit most effectively.

Within such a framework, for both the type in which the third lens unit is movable and the type in which the third lens unit remains stationary, a great increase of the maximum image angle must be achieved. To this end, it is preferred to further satisfy the following condition:

$$0.145 < Fw/\phi_1 < 0.19 \quad (2)$$

where Fw is the shortest focal length of the entire system.

In general, as the focal length Fw in the wide-angle end shortens, the front lens diameter $\phi_1$ increases. Conversely as the focal length Fw in the wide-angle end elongates, the front lens diameter $\phi_1$ becomes smaller, although this is valid depending on the speed for the telephoto end of the zoom lens. On this account, the inequalities of condition (2) give a good balance between the front lens diameter and the shortest focal length, so that a compact wide-angle zoom lens is realized. If whichever of the upper and lower limits of this condition is violated, it becomes impossible to provide a zoom lens of the desired compact form and wider image angle. In more detail, the violation of the upper limit results in a zoom lens having a shifted range toward the telephoto side. The violation of the lower limit leads to a large-sized zoom lens. In particular, with regard to the zoom lens whose third lens unit is made movable, it is recommended to adopt an altered range: $0.1<Fw/\phi_1<0.23$. Again, this value of the lower limit may be altered to 0.14.

Also, with regard to the station in which the off-axial light beam is incident on the first lens unit at the highest height, in order that this occurs in the neighborhood of the wide-angle end, it is preferred that, in terms of the entire zooming range, the appropriate movement of the third lens unit and the stop lies within the following range:

$$0.05<(Fm-Fw)/(Ft-Fw)<0.3 \quad (3)$$

where Fw and Ft are the shortest and longest focal lengths of the entire system, respectively, and Fm is a value which the focal length of the entire system takes when the third lens unit and the stop arrive at the front terminal end of the range of movement thereof (or that value of the focal length which gives M3max).

When this condition (3) is violated, no matter whichever the upper or lower limit may be the case, the station at which the highest height of incidence of the off-axial beam on the first lens unit occurs can no longer be brought into the neighborhood of the wide-angle end. So, there is no possibility of finding any suitable movement for the third lens unit and the stop. That is, an objectionable increase of the bulk and size of the entire system results.

To fulfill the requirements of minimizing the diameter of the front lens element and of the total length of the optics at once, there is a need of making a good compromise between the movements of the second and third lens units.

Up to the above-defined station for the focal length Fm, the second and third lens units move in the confronting directions to each other. At this station, mechanical interference must be avoided. Again, as the second lens unit that plays a main role in varying the focal length moves, its amount is translated directly to the zoom ratio. Therefore, its correlation with the total length must be taken to be appropriate. For this purpose, it is preferred to satisfy the following condition:

$$-0.4<M3max/M2<-0.04 \quad (4)$$

where M2 is the amount of movement of the second lens unit during zooming from the wide-angle end to the telephoto end.

When the upper limit of the inequality (4) is exceeded, as this means that the total movement of the second lens unit is too large, it results in some cases that the total length increases objectionably, which in turn causes the front lens diameter to increase. In other cases, the absolute value of M3max becomes so small that the height of incidence of the off-axial beam on the first lens unit is not highest in the neighborhood of the wide-angle end. This results in an objectionable increase of the front lens diameter. When the lower limit is exceeded, as this means that the total movement of the second lens unit is too small, the desired zoom ratio cannot be obtained. Also, as the absolute value of M3max becomes large, the size of the entire system increases largely, and the possibility of occurrence of mechanical interference between the second and third lens units increases.

For a wider image angle in the wide-angle end, if the interval el between the principal points of the positive first and negative second lens units in the wide-angle end is short, the focal lengths of the entire system can be further shortened, thus making it possible to promote the wide angle feature. However, an appreciable air space is required between the first and second lens units, lest they collide with each other. For this reason, it is preferred either that the first lens unit has its rear principal point set near to the second lens unit, or that the second lens unit has its front principal point set near to the first lens unit. Particularly in the first lens unit, this also affects the size of the front lens diameter. It is, therefore, preferred to satisfy the following condition:

$$-0.1<H_1'/F_1<0.1 \quad (5)$$

where $H_1'$ is the distance from the vertex of the rearmost surface in the first lens unit to the rear principal point of the first lens unit (with minus sign on the object side, or plus sign on the image side), and $F_1$ is the focal length of the first lens unit.

This condition is necessary for shortening the principal point interval of the first and second lens units. When the lower limit is exceeded, as this means that the principal point of the first lens unit goes too far toward the object side, it becomes impossible to shorten the principal point interval el. Hence, the desired wide angle cannot be achieved. When the upper limit is exceeded, as this means that the separation between the first and second lens units widens, the diameter of the front lens element increases objectionably.

Further, for minimization of the size of the entire system, it is preferred to satisfy the following condition:

$$2.5<Bfw/Fw<4.0 \quad (6)$$

where Bfw is the back focal distance when in the wide-angle end with an object at infinity (as measured without a glass block, filter or the like denoted by "G" in the numerical examples).

These inequalities (6) are necessary fpr advantageously reducing the size of the entire system. When the lower limit is exceeded, not only the filter or like block becomes very difficult to insert, but also the exit pupil becomes rather short. So, the imaging system for the image sensor unfavorably deviates from the telecentric one. When the upper limit is exceeded, an objectionable increase of the size results. If desired, the value of the lower limit may be altered to 2.7 with an even better result.

Also, to minimize the front lens diameter, it is preferable to satisfy the following condition:

$$5.7<F_1/Fw<9.0 \quad (7)$$

These inequalities (7) are concerned with an object point for the second lens unit, in other words, the magnifying power. To limit the size of the entire system to a minimum, it is recommended that the second lens unit, during zooming, passes across unity of magnification. If so, the fourth lens unit is caused to move back and forth when zooming from one end to the other. This makes it possible to get a high zooming range with a highest space efficiency. In more detail, when the upper limit of these inequalities (7) is exceeded, as this means that the object point for the second lens unit is too far, the magnifying power of the second lens unit is lowered, making it difficult to effectively reduce the size. Further, the separation between the first and second lens units becomes wider, thereby increasing the difficulty of achieving the minimization of the size. When the lower limit is exceeded, as this means that the magnifying power of the second lens unit is too large, it becomes difficult to achieve the increase of the zooming range. Hence, the objects of the invention cannot be accomplished.

Meanwhile, during zooming from the wide-angle end, the fourth lens unit moves a distance with an object at infinity. Letting the possible maximum value of this distance be denoted by M4max, it is preferred to satisfy the following condition:

$$M4max/M3max>1.2 \quad (8)$$

This inequality (8) has an aim to shorten the total length with the limitation of the front lens diameter to a minimum, giving a proper range for choice of the relation in which the stop or the third lens unit moves relative to the fourth lens unit that functions mainly to compensate for the image shift. When this condition is satisfied, the bulk and size of the entire system can be reduced. The exceed of the lower limit of the inequality (8), as this means that the third lens unit moves at too fast a speed, results in an objectionable increase of the front lens diameter and the total length. In a desired case, it is recommended to suppress the range of the inequality (8) by setting forth an upper limit of 5.0 or thereabout.

Again, letting the values the focal length of the entire system takes when it gives M3max and M4max be denoted by Fm and Fn, respectively, another contribution to a minimization of the size is obtained by satisfying the following condition:

$$Fm<Fn \quad (9)$$

By the way, as described in connection with the inequalities (5), for the maximum image angle to increase, the way of shortening the principal point interval e1 of the first and second lens units in the wide-angle end is one of the important points. For this purpose, it is preferred to construct the first lens unit in the following form:

The first lens unit comprises, from front to rear, a negative meniscus lens L11 having a convex surface facing the object side, an air space, a positive lens L12 having a convex surface facing the object side, and a positive lens L13 having a convex surface facing the object side, wherein the air lens defined by the lenses L11 and L12 has a negative refractive power.

Again, the first lens unit may otherwise comprise, from front to rear, a bi-concave lens L11, a positive lens L12 cemented to the bi-concave lens L11, and at least one positive lens.

By using such a form, the rear principal point of the first lens unit is put near the second lens unit. This permits the principal point interval e1 of the first and second lens units in the wide-angle end to be made short, giving an advantage of increasing the maximum image angle.

Also, even in the second lens unit, to shorten the principal point interval e1 in the wide-angle end, it is desired to put its front principal point forward, so that the maximum image angle is increased.

As an actual example, the second lens unit comprises, from front to rear, a negative meniscus lens L21 having a convex surface facing the object side, and a negative lens L21 of bi-concave form, an air space, and a positive lens L23. By this air space, the front principal point of the second lens unit is put near the first lens unit, making it easy for the principal point interval e1 to take short on the wide-angle side. This is advantageous for increasing the maximum image angle.

Turning now back, it has been mentioned beforehand that as zooming goes past stations in which the stop or the third lens unit and the fourth lens units reach their respective possible frontmost positions, wherein letting the values the focal length of the entire system takes when the third and fourth lens units get to their respective stations be denoted by fa and fb, respectively, the satisfaction of the following condition:

$$fa<fb \quad (9a)$$

is desirable to the minimization of the front lens diameter and the minimization of the size of the entire system. With the help of this feature, the entrance pupil moves forward, during zooming to the wide-angle end or an intermediate position near thereto. By the way, zooming is performed by moving the second and third lens units in differential relation to each other. Assuming that the amount of movement $M_2$ of the second lens unit varies as a linear function of a parameter "x", then the function for the amount of movement $M_3$ of the third lens unit and the stop is given by the following expression:

$$M_2=ax \quad (0 \leq x \leq 1)(a>0) \quad (A)$$

$$M_3=bx+cx^2+\ldots \quad (0 \leq x \leq 1)(b<0) \quad (B)$$

where $M_3$, if of negative sign, shows forward movement, or if of positive sign, shows rearward movement, and x=0 for the wide-angle end, and x=1 for the telephoto end.

As is seen from the equation (A), the value of "a" represents the total zooming movement of the second lens unit. In the equation (B), when considered only up to the term of $x^2$, a case of "b=−c" means that the stop and the third lens unit do complete reciprocation during zooming throughout. In view of the minimization of the bulk and size, the more completely the stop and the third lens unit reciprocate, the more desirable, the result is, because the more efficiently the space is used.

On this account, $$0.7c<|b|<1.2c \quad (10)$$

is set forth. The violation of these inequalities (10) over either limit is unsuitable to the minimization of the bulk and size.

Another factor to the minimization of the size of the entire system is the correlation of the movements of the second and third lens units. Even if, as the third lens unit moves, its reciprocation is made as completely as possible, the use of an inappropriate separation between the second and third lens units will either result in mechanical interference in an intermediate zooming position, or, in too wide a case, give cause for increasing the diameter of the front lens element. So, the following condition is particularly set forth:

$$0.9<D_{2W}/M_2<1.3 \quad (11)$$

where $D_{2W}$ is the separation between the second lens unit and the stop in the wide-angle end, and $M_2$ is the total zooming movement of the second lens unit.

In a zoom lens having the third lens unit and the stop both stationary relative to the image plane as in the prior art, $D_{2W}/M_2$ of the inequalities (11) has a value of "1" or greater, because, if "1" or less, the second and third lens units interfere with each other in the telephoto end. According to the present invention, $D_{2W}/M_2<1$ occurs when $|b|<c$ in the equations (A) and (B), while $D_{2W}/M_2>1$ occurs when $|b|>c$. When the upper limit of these inequalities (11) is exceeded, the distance from the first lens unit to the stop becomes so long that the diameter of the front lens element and the size of the entire system increase objectionably. When the lower limit is exceeded, the second and third lens unit or stop collide with each other at a time during zooming or in the telephoto end.

In the conventional zoom lens, the height of incidence of the off-axial beam on the first lens unit becomes highest in an intermediate zooming position near to the wide-angle end, because of the peculiar arrangement of the entrance pupil described before. If this position in which the highest height of the incidence occurs can be brought in the neighborhood of the wide-angle end by making the stop to move somehow, it becomes possible for the first lens unit to get a smallest diameter. For this reason, it is recommended that the equations (A) and (B) are related by:

$$0.3a<|b|<1.2a \qquad (11a)$$

More desirably, $$0.75a<|b|<1.1a \qquad (11b)$$

is set forth. When this condition is satisfied, the height of incidence on the first lens unit becomes highest in the wide-angle end. The combination of the inequalities (10) with the inequalities (11a) or (11b) is advantageous for minimizing the bulk and size.

In the equation (B), if limitation is laid on no more terms than the second one, the equation (B) can otherwise be expressed by:

$$M_3=c(x+b/2c)^2-b^2/4c \qquad (C)$$

According to this equation (C), when the zooming movement parameter is $$x=-b/2c,$$

the movement of the stop and third lens unit is largest, being $$M_3=-b^2/4c \quad (<0).$$

In this event, the value of the focal length of the entire system, needless to say, coincides with "fa" in the inequality (9a).

According to the invention, therefore, the maximum zooming movement $M_{4max}$ (<0) of the fourth lens unit has to lie within the following range:

$$M_{4max} \leq |-b^4/4c| \qquad (12)$$

In this case, the zooming movement parameter ranges as follows:

$$1 \geq x > |-b_2/4c| \qquad (13)$$

In particular, to achieve an increase of the maximum image angle especially to $2\omega \geq 60°$ with the limitation of the outer diameter of the first lens unit to a minimum, the principal point of the first lens unit is brought toward the second lens unit so as to shorten the principal point interval el between the first and second lens units in the wide-angle end. With regard to this aim, the rules of lens design described above work.

The invention is further described in connection with other features than those described above.

In the zoom type according to the invention, if the shortest focal length is decreased (the maximum image angle is widened), while maintaining the entire system in compact form, the focal length f1 of the first lens unit tends to increase, and the focal length f2 of the second lens unit tends to decrease in absolute sense.

Meanwhile, the decrease of the shortest focal length also calls for an increase of the diameter $\phi 1$ of the front lens element. To reduce this front lens diameter in combination with the decrease of the shortest focal length, one relies also on increasing the focal length f1 of the first lens unit and decreasing the focal length f2 of the second lens unit in absolute sense, provided that the distortion in the wide-angle end is allowed to increase in the negative direction. In such a way, some contribution to a minimization of the bulk and size can be made.

However, if the absolute value of the focal length f2 of the second lens unit becomes small, a small amount of zooming movement M2 of the second lens unit suffices for obtaining the desired zoom ratio, but a change of the position of the image plane relative to the position error of the second lens unit (the sensitivity of positioning of the second lens unit relative to the position of the image plane) becomes too high, giving rise to a problem in control. Conversely when the absolute value of the focal length f2 is large, the amount of zooming movement M2 of the second lens unit becomes large. So, it is difficult to reduce the front lens diameter and the size of the entire system.

According to the invention, therefore, letting the focal lengths of the first and second lens units be denoted by f1 and f2 respectively, $$-5.8<f_1/f_2<-4 \qquad (14)$$

is set forth. When this condition is satisfied, the desired increase of the maximum image angle is achieved along with the minimization of the front lens diameter and the minimization of the size of the entire system in such a manner that the distortion in the wide-angle end is suppressed to a small value.

Particularly when improvement of the distortion, minimization of the front lens diameter and increasing of the maximum image angle are carried out in good balance, it is more preferable that the factor of the condition (14) falls within the following range:

$$-5.5<f_1/f_2<-4.5 \qquad (15)$$

Another feature of the invention is that, denoting the zooming movements of the second and third lens units by M2 and M3, respectively and putting $$M2=a \cdot x \quad (a>0, \ 0 \leq x \leq 1)$$

$$M3=b1 \cdot x+b2 \cdot x^2+b3 \cdot x^3+ \ldots +bi \cdot x^i$$

$$(0 \leq x \leq 1)$$

as $i=1, 2, 3, 4, \ldots n$, letting the total sum of those of the values of bi which are positive by Bp, and the total sum of those of the values of bi which are negative by Bn, $$0.7Bp<|Bn|<1.2Bp \qquad (16)$$

is set forth. When this condition is satisfied, a possibility of minimizing the front lens diameter and of shortening the total length of the entire system is produced.

It is to be noted here that in the equations described above, x is the parameter of movement, wherein x=0 represents the wide-angle end, and x=1 represents the telephoto end, so that "a" becomes the total zooming movement of the second lens unit. Also, in the inequalities (16), when Bp=−Bn, the stop and the third lens unit reciprocate completely during zooming throughout.

In the present embodiment, by satisfying the condition (16), the zoom ratio is increased, the shortest focal length is shortened (the maximum image angle is widened) and the front lens diameter is reduced.

As described before, in the conventional zoom lens, the height of incidence of the off-axial beam on the first lens unit increases to the maximum at the intermediate zooming position near to the wide-angle end, because the entrance pupil lies deep from the first lens unit. If the position for the maximum height of incidence can be set to the neighborhood of the wide-angle end by moving the entrance pupil or the stop, then it becomes possible to most efficiently reduce the outer diameter of the first lens unit. For this purpose, it is recommended to satisfy $$0.3a < lb1 < 1.2a.$$

In particular, if $$0.75a < lb1 < 1.1a.$$

is satisfied, the height of incidence on the first lens unit becomes highest in the wide-angle end, giving rise to an advantage of minimizing the diameter of the front lens element. Especially, Bn=b1 is advantageous.

Furthermore, features of the invention are described below.

In the zoom type according to the invention, in general, to achieve a high range of variation of the magnification, the second lens unit is made from components whose refractive powers are negative and have large values. For this reason, the Petzval sum is negative and large. To compensate for this, the refractive index of the material of the negative lenses in the second lens group must be made high. So, the negative lenses are apt to be made from high refractive index glass.

Of the commonly available glasses, however, the higher the refractive index, the smaller the Abbe number tends to be. The glass of high refractive index used in the negative lenses is, therefore, low in dispersion, causing the longitudinal and lateral chromatic aberrations to be undercorrected. Hence, it becomes difficult to achieve a much desired increase of the zooming range, while still maintaining high optical performance.

For this reason, as the second lens unit includes two negative lenses, with regard to the Abbe number "ν" of the negative lens of higher refractive index, the invention sets forth a condition: 35<ν, thereby correcting the chromatic aberrations in good balance.

Again, in the zoom type according to the invention, the movement M of the second lens unit has an influence on the size of the entire lens system and the diameter of the front lens element. Nonetheless, the movement M of the second lens unit is comprised of the amount of zooming movement M2 and the amount of room Ma for adjusting the second lens unit, as expressed by $$M = M2 + Ma$$

$$Ma = k \cdot M2 \text{ (where } k = 0-0.1\text{)}$$

For this reason, in a case where, even if the movement M2 is reduced in design, the adjusting room Ma has to be taken large, the entire system gets longer and the front lens diameter, too, gets larger.

For this reason, with regard to the movement M of the second lens unit, the invention sets forth the following condition:

$$2.0 < M/f_2 < 4.5 \qquad (17)$$

When this condition is satisfied, the size of the entire lens system is minimized in such a manner that the desired zoom ratio is obtained.

Here, when the upper limit of the inequalities of condition (17) is exceeded, as this means that the movement of the second lens unit is too long in relation to its refractive power, it is unfavorable to the minimization of the size of the entire system. When the lower limit is exceeded, as this means that the magnifying power of the second lens unit is too high, the position sensitivity of the second lens unit relative to the image plane becomes high, which in turn causes the manufacturing tolerances to be objectionably severe.

In the zoom type according to the invention, the effective diameter of the first lens unit is determined depending generally on the image angle of the wide-angle side. Nevertheless, if an increase of the relative aperture is desired, the F-number of the telephoto end gives a large influence to it. To increase the maximum image angle and the relative aperture at once, therefore, the front lens diameter must be prevented from becoming huge. In this respect, a necessity arises in that the axial thickness $D_1$ of the first lens unit be made appropriate. So, the invention sets forth the following condition:

$$0.3 < D_1/f_1 < 1.0 \qquad (18)$$

When this condition is satisfied, the increase of the maximum image angle and the increase of the aperture ratio are achieved, while still maintaining a shortening of the front lens diameter to be achieved.

When the lower limit of the inequalities of condition (18) is exceeded, as this means that the axial thickness $D_1$ is too small, the certain diameter of the front lens element as determined by the increased image angle and increased aperture ratio is not ensured, because the positive lens has an insufficient edge thickness. Thus, it becomes impossible to accurately support the front lens element in the mount. When the upper limit is exceeded, as this means that the axial thickness $D_1$ is too large, the weight of the front lens element increases in contradiction to the compact form with the light weight.

Also, the invention takes into account the fact that if the amount of movement of the stop and the third lens is rather long, the variation with zooming of spherical aberration gets larger particularly in an intermediate region of the zooming range. So, the spherical aberration tends to be overcorrected. To remove this, it is preferable to introduce an aspheric surface to the neighborhood of the stop in the third lens unit. The aspheric surface is preferably formed to such a shape that toward the marginal zone, the positive refractive power gets progressively weaker, or the negative refractive power gets progressively stronger.

Further, according to the invention, a zoom lens comprises, from front to rear, a first lens unit of positive refractive power, a second lens unit of negative refractive power, a third lens unit of positive refractive power having a stop, and a fourth lens unit of positive refractive power, wherein when zooming from the wide-angle end to the telephoto end, the second lens unit moves toward the image side, while simultaneously moving the stop and the third lens unit in unison in such a way as to form a locus convex toward the object side and the fourth lens unit also in such a way as to form a locus convex toward the object side, and when focusing, the fourth lens unit is moved, and wherein the second lens unit includes at least one negative lens, at least one positive lens and at least one aspheric surface, the zoom lens being characterized by satisfying the following condition:

$$0.8 < |\beta t|/\sqrt{Z} < 1.5 \qquad (19)$$

where $\beta t$ is the lateral magnification of the second lens unit in the telephoto end with an object at infinity, and Z is the zoom ratio.

According to the invention, another zoom lens comprises, from front to rear, a first lens unit of positive refractive power, a second lens unit of negative refractive power, a third lens unit of positive refractive power having a stop, and a fourth lens unit of positive refractive power, wherein when zooming from the wide-angle end to the telephoto end, the second lens unit is moved toward the image side, while simultaneously moving the stop and the third lens unit in unison in such a way as to form a locus convex toward the object side and the fourth lens unit also in such a way as to form a locus convex toward the object side, and when focusing, the fourth lens unit is moved, and wherein the first lens unit includes at least one negative lens, at least one positive lens and at least one aspheric surface, the zoom lens being characterized by satisfying the following condition:

$$0.8 < |\beta t|/\sqrt{Z} < 1.5 \qquad (20)$$

wherein $\beta t$ is the lateral magnification of the second lens unit in the telephoto end with an object at infinity, and Z is the zoom ratio.

Further, according to the invention, a zoom lens of the rear focus type comprises, from front to rear, a first lens unit of positive refractive power, a second lens unit of negative refractive power, a third lens unit of positive refractive power having a stop, and a fourth lens unit of positive refractive power, wherein when zooming from the wide-angle end to the telephoto end, the second lens unit is moved toward the image side, while simultaneously moving the stop and the third lens unit in unison in such a way as to form a locus convex toward the object side and the fourth lens unit in such a way as to form a locus convex toward the object side, and when focusing, the fourth lens unit is moved, the zoom lens being characterized by satisfying the following condition:

$$0.3 < L3,4/Fw < 2.7 \qquad (21)$$

where L3,4 is the separation between the third and fourth lens units in the wide-angle end with an object at infinity, and Fw is the shortest focal length of the entire system.

Another zoom lens of the rear focus type comprises, from front to rear, a first lens unit of positive refractive power, a second lens unit of negative refractive power, a third lens unit of positive refractive power having a stop, and a fourth lens unit of positive refractive power, wherein when zooming from the wide-angle end to the telephoto end, the second lens unit is moved toward the image side, while simultaneously moving the stop and the third lens unit in unison in such a way as to form a locus convex toward the object side and the fourth lens unit in such a way as to form a locus convex toward the object side, and when focusing, the fourth lens unit is moved, the zoom lens being characterized by using at least one aspheric surface in the fourth lens unit.

When the separation between the third and fourth lens units is short beyond the range of the inequalities (21), it results either that with an object at the minimum object distance, the fourth lens unit that is the focusing part moves forward and collides with the third lens unit, or that good correction of aberrations is not maintained. When the separation between the third and fourth lens unit is long beyond the range of the inequalities (21), it becomes difficult to achieve the minimization of the size of the entire system.

Again, the image angle in the wide-angle end must be made wider. In this respect, the principal point interval el of the positive first and negative second lens units is taken shorter. (The combined focal length of the first and second lens units decreases.) In turn, this enables the focal length of the entire system to be made even shorter. Thus, it becomes possible to achieve the increase of the maximum image angle. It is to be noted here that the first and second lens units, when in nearest setting, must be separated by an appreciable air spacing, lest they collide with each other. For this purpose, the first lens unit is designed so that its rear principal point falls as near to the second lens unit as possible, or the second lens unit is designed so that its front principal point falls as near to the first lens unit as possible.

The zoom lens according to the invention is provided with at least one aspheric surface in the fourth lens unit. In this case, the number of constituent lens elements of the fourth lens unit is reduced to provide a possibility of minimizing the size of the entire system in such a manner that all the aberrations are well corrected. Particularly, the spherical aberration, field curvature and distortion are well corrected by this aspheric surface.

Further features of the invention are described below.

To reduce the variation with focusing of all aberrations, particularly, spherical aberration and astigmatism, for the purpose of obtaining high optical performance throughout the entire range of object distances, the invention sets forth the following condition:

$$-0.10 < F_7/F_{1,3} < 0.47 \qquad (22)$$

where $F_T$ is the longest focal length of the entire system, and $F_{1,3}$ is the overall focal length of the first through third lens units in the telephoto end.

The inequalities of condition (22) are concerned with the parallelism (afocal degree) of the axial beam emerging from the third lens unit. When the upper limit of the condition (22) is exceeded, as this means that the convergence of the axial light beam is too strong, large astigmatism is produced when focusing on an object at the minimum distance, and under-correction of the meridional image surface results.

When the divergence of the axial beam is stronger than the lower limit, the height of incidence on the fourth lens unit increases to increase the spherical aberration objectionably.

To further improve the aberrations mentioned above, it is also recommended to provide at least one aspheric surface in either or both of the third and fourth lens units.

In the rear focus type zoom lens of the form which is characteristic of the invention, attention must be paid to the second lens unit, to reduce the variation with zooming of all aberrations, particularly, distortion. For this purpose, it is preferred that the second lens unit of negative refractive power comprises, from front to rear, a first lens having a concave surface of strong refracting power facing the image side, a second lens of hi-concave form, and a positive third lens having a convex surface facing the object side, totaling three single lenses with air spacings therebetween.

The prior known zoom lenses whose image angle in the wide-angle end is as wide as 70° with as high a zoom ratio as 12, have generally distortion of about −10% in the wide-angle end, or of about +5% in the telephoto end.

According to the invention, on the other hand, by specifying the form and the construction and arrangement of the constituent lenses of the second lens unit as described above, the distortion is well corrected to about −6% in the wide-angle end, or to about +3% in the telephoto end.

The use of such a second lens unit also makes it possible to put the front principal point of the second lens unit in a more forward position. Therefore, the principal point interval of the first and second lens units can be shortened and the first lens unit can be brought nearer to the stop.

By this arrangement, the height from the optical axis of incidence of the off-axial beam on the first lens unit is lowered. Therefore, the diameter of the first lens unit can be reduced, contributing to a shortening of the total length of the entire lens system and a compact form with light weight.

According to the invention, the negative second and positive third lenses in the second lens unit take the form of single lenses and also serve as an air lens acting on correction of the aberrations. Thus, the spherical aberration, coma and longitudinal chromatic aberrations are well corrected.

Passing through the aforesaid second lens unit, the on-axial light ray, after having emerged from the negative second lens, enters the positive third lens at a higher height from the optical axis than when they are cemented together as is the common practice in the prior art. Therefore, the effect for correcting aberrations by the positive third lens gets much stronger. In turn, the curvature of the front surface of the positive third lens, the curvature of the rear surface of the negative first lens, and the curvature of each of both surfaces of the negative second lens can be so much loosened. By this, the thickness of the positive third lens is thinned, contributing to a compact form.

With the use of the zoom type according to the invention, to further reduce the size and increase the zoom ratio, the refractive power of the second lens unit must be strengthened. For this purpose, the curvature of each of the lenses constituting the second lens unit is made smaller. In turn, however, a disadvantage creeps in that large aberrations of higher orders are produced and the variation with zooming of aberrations is increased.

To avoid this, according to the invention, the average value $N_{2,N}$ of the refractive indices of the materials of the two negative lenses, namely, the first and second lenses, in the second lens unit is made to be not less than 1.60.

Again, the spacing between the negative second and positive third lenses in the second lens unit is made to work as an air lens on correction of the aberrations. For this purpose, letting this air spacing be denoted by $D_{2,4}$ and the focal length of the second lens unit by $f_2$, the invention sets forth:

$$0.03 < |D_{2,4}/f_2| < 0.21 \quad (23)$$

When this condition is satisfied, the longitudinal chromatic aberration and coma are mainly corrected well.

Here, when the lower limit of the inequalities of condition (23) is exceeded, particularly, inward coma increases largely. When the upper limit is exceeded, large outward coma is produced and the longitudinal chromatic aberrations tends to be under-corrected. So, this should be avoided.

In the invention, the radius of curvature $R_{2,2}$ of the rear surface of the negative first lens in the second lens unit and the radius of curvature $R_{2,3}$ of the front surface of the negative second lens in the second lens unit may be made larger than were heretofore possible. To do good correction of aberrations, it is then recommended to satisfy the following condition:

$$1.13 < (1/R_{2,3} - 1/R_{2,2}) f_2 < 1.98 \quad (24)$$

When the lower limit of the condition (24) is exceeded, the distortion tends to become barrel type in the wide-angle end. When the upper limit is exceeded, the distortion tends to become pincushion type in the telephoto end.

Particularly, for field curvature to be corrected well, the negative first and negative second lenses in the second lens unit are made from materials whose refractive indices $N_{2,1}$ and $N_{2,2}$, respectively, differ little from each other. According to the invention, therefore, it is recommended that the difference lies, for example, in the following range:

$$|N_{2,1} - N_{2,2}| < 0.22 \quad (25)$$

Besides, in the invention, in aberration correction, it is preferable to apply at least one aspheric surface to the third or fourth lens unit.

The rules of design so far described suffice for making it possible to provide a zoom lens of the rear focus type which has its front lens diameter minimized, its image angle widened (to $2\omega > 65°$) in such a manner that the zoom ratio is held high (at 10 or higher), the operating and other mechanisms are simplified in structure, the size is minimized and the weight is reduced, while still permitting good stability of performance to be maintained throughout the entire zooming range and throughout the entire focusing range.

Examples of specific zoom lenses of the invention are described below. In the numerical data for these examples, ri is the radius of curvature of the i-th lens surface when counted from the object side, di is the i-th lens thickness or air separation when counted from the object side, and ni and vi are respectively the refractive index and Abbe number of the i-th lens element when counted from the object side.

The shape of an aspheric surface is expressed in coordinates with an X-axis in the axial direction and a Y-axis in the direction perpendicular to the optical axis, the direction in which light advances being taken as positive and the intersection of the vertex of the lens with the X-axis at the original point, by the following equation:

$$X = (1/r)Y^2/(1 + \sqrt{1 - (1+k)(Y/r)^2}) + A_2 Y^4 + A_3 Y^6 + A_4 Y^8 + A_5 Y^{10}$$

where r is the radius of the osculating sphere, and k, $A_2$, $A_3$, $A_4$ and $A_5$ are the aspheric coefficients.

Again, the notation of, for example, "D-03" means "$10^{-3}$".

Again, G (r23, r24, etc.) in the numerical data stands for a glass block such as an optical filter or face plate.

It is to be noted that the movement parameters a, b and c satisfy the above-mentioned equations (A) and (B) based on which the second and third lens units move. This is valid on the assumption that the second lens unit moves linearly. However, its locus may otherwise be curved, provided these lens units move in the same differential relation.

|  | Numerical Examples | | | |
| --- | --- | --- | --- | --- |
|  | 1 | 2 | 3 | 4 |
| Fw/φ₁ | 0.1556271 | 0.1558305 | 0.1582069 | 0.1643214 |
| Fw/Effective diameter (reference) | 0.1594097 | 0.1607343 | 0.163274 | 0.1697786 |
| M3max/φ₁ | −0.059661 | −0.063051 | −0.193793 | −0.165 |
| M3max/ Effective | −0.061111 | −0.065035 | −0.2 | −0.1708 |

-continued

| | | | | |
|---|---|---|---|---|
| diameter (reference) | | | | |
| (Fm − Fw)/ (Ft − Fw) | 0.1181606 | 0.1281211 | 0.1776075 | 0.1812418 |
| M3max/M2 | −0.08381 | −0.088571 | −0.239149 | −0.22 |
| $H_1'/F_1$ | −0.067438 | −0.067913 | −0.061199 | −0.06465 |
| Bfw/Fw | 2.8231322 | 2.7611486 | 2.7563208 | 2.7274506 |
| $F_1$/Fw | 7.1768678 | 7.216663 | 7.8637751 | 7.1573571 |
| M4max/M3max | 3.1647727 | 3.3870968 | 1.8540925 | 1.7272727 |
| Effective diameter | 6.2731431 | 6.2214488 | 6.1246731 | 5.8900239 |
| Example of outer diameter | 6.4256153 | 6.4172286 | 6.320837 | 6.0856336 |
| Outer diameter/ Effective diameter (+%) | 2.4305556 | 3.1468531 | 3.202847 | 3.3210332 |
| Movement parameter a | 4.5741668 | 4.5681966 | 5.1220575 | 4.5642252 |
| Movement parameter b | −1.857519 | −1.847982 | −4.904098 | −4.346881 |
| Movement parameter c | 2.2461292 | 2.115087 | 4.9123385 | 4.7094253 |
| $D_{2w}/M_2$ | 0.97 | 1.00 | 1.05 | 0.98 |
| lb/cl | 0.83 | 0.87 | 1.00 | 0.92 |
| lb/al | 0.41 | 0.4 | 0.96 | 0.95 |
| vN | 49.6 | | | |
| $M/|f_2|$ | 3.398 | | | |
| $D_1/f_1$ | 0.437 | | | |
| L3,4/Fw | | | | |
| Minimum value | 0.895 | | 0.337 | |
| Minimum value | 2.010 | | 1.214 | |

| | Numerical Examples | | | |
|---|---|---|---|---|
| | 5 | 6 | 7 | 8 |
| Fw/$\phi_1$ | 0.1471667 | 0.164 | 0.1744815 | 0.1816471 |
| Fw/Effective diameter (reference) | 0.1538328 | 0.1694465 | 0.1811923 | 0.1890612 |
| M3max/$\phi_1$ | −0.173333 | −0.190357 | −0.108889 | −0.141608 |
| M3max/ Effective diameter (reference) | −0.181185 | −0.196679 | −0.113077 | −0.147388 |
| (Fm − Fw)/ (Ft − Fw) | 0.1974382 | 0.1984777 | 0.1812401 | 0.2764734 |
| M3max/M2 | −0.247619 | −0.25381 | −0.176725 | −0.240733 |
| $H_1'/F_1$ | −0.080111 | −0.076457 | −0.096579 | −0.05134 |
| Bfw/Fw | 2.8534541 | 2.7560976 | 2.7047336 | 2.6755181 |
| $F_1$/Fw | 6.0561721 | 7.2232143 | 5.9870516 | 5.8408895 |
| M4max/ M3max | 1.5173077 | 1.467167 | 1.8639456 | 1.7474384 |
| Effective diameter | 6.5005663 | 5.9015679 | 5.5189981 | 5.2892919 |
| Example of outer diameter | 6.795017 | 6.097561 | 5.7312672 | 5.5051813 |
| Outer diameter/ Effective diameter (+%) | 4.5296167 | 3.3210332 | 3.8461538 | 4.0816327 |
| Movement parameter a | 4.7565119 | 4.5731707 | 3.5313727 | 3.238342 |
| Movement parameter b | −4.983012 | −4.790941 | −2.82318 | −3.022453 |
| Movement parameter c | 5.2718059 | −1.615307 | 3.199585 | 2.9293454 |
| $D_{2w}/M_2$ | 1.01 | 1.02 | 0.95 | |
| lb/cl | 0.95 | 2.97 | 0.88 | |
| lb/al | 1.05 | 1.05 | 0.80 | |
| vN | | | | 49.6 |
| $M/|f_2|$ | | | | 2.674 |
| $D_1/f_1$ | | | | 0.461 |

-continued

| | | |
|---|---|---|
| L3,4/Fw | | |
| Minimum value | | 0.482 |
| Maximum value | | 1.699 |

| | Numerical Examples | | | |
|---|---|---|---|---|
| | 9 | 10 | 11 | 12 |
| Fw/$\phi_1$ | 0.1357059 | 0.161193 | 0.1478667 | 0.161193 |
| Fw/Effective diameter (reference) | 0.1406707 | 0.1682784 | 0.1532297 | 0.1688971 |
| M3max/$\phi_1$ | −0.172853 | −0.087719 | −0.057767 | −0.169895 |
| M3max/ Effective diameter (reference) | −0.179177 | −0.091575 | −0.059862 | −0.178015 |
| (Fm − Fw)/ (Ft − Fw) | 0.1950644 | 0.1616415 | 0.1309381 | 0.1912124 |
| M3max/M2 | −0.250085 | −0.129561 | −0.082524 | −0.230571 |
| $H_1'/F_1$ | −0.056236 | 0.0046459 | −0.030582 | −0.038734 |
| Bfw/Fw | 2.7414391 | 2.7122333 | 2.8926961 | 2.7361776 |
| $F_1$/Fw | 7.9237104 | 6.1845886 | 7.1871005 | 7.1033957 |
| M4max/ M3max | 1.4837502 | 2.656 | 2.880554 | 1.7426683 |
| Effective diameter | 7.1087993 | 5.9425337 | 6.5261497 | 5.9207662 |
| Example of outer diameter | 7.3688773 | 6.203744 | 6.7628494 | 6.203744 |
| Outer diameter/ Effective diameter (+%) | 3.6585366 | 4.396044 | 3.626943 | 4.7794118 |
| Movement parameter a | 5.0931946 | 4.2002068 | 4.7339946 | 4.5711798 |
| Movement parameter b | −4.876463 | −2.176752 | −1.747671 | −4.353505 |
| Movement parameter c | 4.6672358 | 2.1767523 | 1.9545911 | 4.4949406 |
| vN | | 49.6 | 44.19 | |
| $M/|f_2|$ | | 3.197 | 3.222 | |
| $D_1/f_1$ | | 0.625 | 0.468 | |
| L3,4/Fw | | | | |
| Minimum value | | 1.042 | | 1.082 |
| Maximum value | | 2.643 | | 2.360 |

| | Numerical Examples | | | |
|---|---|---|---|---|
| | 13 | 14 | 15 | 16 |
| Fw/$\phi_1$ | 0.2085106 | 0.1592581 | 0.1615439 | 0.132571 |
| Fw/Effective diameter (reference) | 0.2194357 | 0.1645667 | 0.1668116 | 0.137574 |
| M3max/$\phi_1$ | −0.168298 | | | |
| M3max/ Effective diameter (reference) | −0.177116 | | | |
| (Fm − Fw)/ (Ft − Fw) | 0.1974065 | | | |
| M3max/M2 | −0.226 | | | |
| $H_1'/F_1$ | −0.080931 | −0.091161 | 0.041919 | −0.074875 |
| Bfw/Fw | 2.5689796 | 3.2483289 | 2.7122068 | 2.7163441 |
| $F_1$/Fw | 5.825102 | 6.9434879 | 6.1120765 | 7.283871 |
| M4max/ M3max | 2.3843236 | | | |
| Effective diameter | 4.5571429 | 6.0765647 | 5.9947871 | 7.2688172 |
| Example of outer diameter | 4.7959184 | 6.2791169 | 6.1902693 | 7.5268817 |
| Outer diameter/ | 5.239588 | 3.3333333 | 3.2608696 | 3.5502959 |

-continued

| Effective diameter (+%) | | | | |
|---|---|---|---|---|
| Movement parameter a | 3.5714286 | 4.1946536 | 4.2968119 | 4.516129 |
| Movement parameter b | −3.367347 | | | |
| Movement parameter c | 3.512562 | | | |

Numerical Examples

| | 17 | 18 | 19 | 20 |
|---|---|---|---|---|
| $Fw/\phi_1$ | 0.163 | | | |
| Fw/Effective diameter (reference) | 0.169 | | | |
| $M3max/\phi_1$ | −0.078 | −0.111 | −0.063 | −0.111 |
| M3max/ Effective diameter (reference) | −0.081 | | | |
| (Fm − Fw)/ (Ft − Fw) | 0.126 | 0.176 | 0.123 | 0.175 |
| M3max/M2 | −0.107 | −0.176 | −0.200 | −0.176 |
| $H_1'/F_1$ | −0.073 | | | |
| Bfw/Fw | 2.69 | 2.755 | 2.583 | 2.752 |
| $F_1$/Fw | 7.14 | 5.867 | 7.289 | 5.860 |
| M4max/ M3max | 3.19 | 1.879 | 3.216 | 1.875 |
| Movement parameter a | 4.47 | | | |
| $D_{2w}/M_2$ | 1.07 | | | |
| f1/f2 | −5.46 | | | |
| Movement parameter Bn | −23.16 | | | |
| Movement parameter Bp | 23.17 | | | |
| |Bn|/Bp | 0.99 | | | |
| |b1|/a | 0.61 | | | |
| $|\beta t|/\sqrt{Z}$ | | 1.158 | 0.922 | 1.175 |

Numerical Examples

| | 21 | 22 | 23 | 24 | 25 |
|---|---|---|---|---|---|
| $Fw/\phi_1$ | 0.162 | 0.162 | 0.167 | 0.166 | 0.164 |
| Fw/Effective diameter (reference) | | | | | |
| $M3max/\phi_1$ | −0.0618 | −0.0618 | −0.173 | −0.173 | −0.0893 |
| M3max/ Effective diameter (reference) | | | | | |
| (Fm − Fw)/ (Ft − Fw) | 0.119 | 0.119 | 0.194 | 0.193 | 0.164 |
| M3max/M2 | −0.0839 | −0.0839 | −0.231 | −0.231 | −0.130 |
| $H_1'/F_1$ | −0.0674 | −0.0673 | −0.0379 | −0.0383 | 0.00442 |
| Bfw/Fw | 2.806 | 2.807 | 2.699 | 2.701 | 2.710 |
| $F_1$/Fw | 7.145 | 7.149 | 7.009 | 7.016 | 6.178 |
| M4max/ M3max | 3.122 | 3.129 | 1.705 | 1.699 | 2.675 |

Numerical Examples

| | 26 | 27 | 28 |
|---|---|---|---|
| $F_T/F_{1,3}$ | −0.04 | 0.23 | 0.43 |
| $N_{2,N}$ | 1.735 | 1.746 | 1.74 |
| $D_{2,d}/f_2$ | 0.049 | 0.156 | 0.18 |
| $(1/R_{2,3} − 1/R_{2,2}) f_2$ | 1.599 | 1.320 | 1.35 |
| $|N_{2,1}/N_{2,2}|$ | 0.076 | 0.053 | 0.05 |

Numerical Example 1
f = 1.0–12.5   Fno = 1:1.85–2.6   2ω = 69.8°–6.4°

| r1 = 15.449 | d1 = 0.26 | n1 = 1.184666 | v1 = 23.8 |
|---|---|---|---|
| r2 = 6.090 | d2 = 0.28 | | |
| r3 = 9.215 | d3 = 0.83 | n2 = 1.69680 | v2 = 55.5 |
| r4 = −64.894 | d4 = 0.04 | | |
| r5 = 4.815 | d5 = 0.96 | n3 = 1.69680 | v3 = 55.5 |
| r6 = 51.436 | d6 = Variable | | |
| r7 = 15.137 | d7 = 0.17 | n4 = 1.77250 | v4 = 49.6 |
| r8 = 1.407 | d8 = 0.63 | | |
| r9 = −4.105 | d9 = 0.15 | n5 = 1.72000 | v5 = 50.3 |
| r10 = 1.987 | d10 = 0.17 | | |
| r11 = 2.307 | d11 = 0.48 | n6 = 1.84666 | v6 = 23.8 |
| r12 = 14.465 | d12 = Variable | | |
| r13 = (Stop) | d13 = 0.33 | | |
| r14 = 6.786 | d14 = 0.65 | n7 = 1.58313 | v7 = 59.4 |
| r15 = −3.034 | d15 = 0.11 | | |
| r16 = −2.251 | d16 = 0.22 | n8 = 1.60342 | v8 = 38.0 |
| r17 = −3.452 | d17 = Variable | | |
| r18 = 3.160 | d18 = 0.17 | n9 = 1.84666 | v9 = 23.8 |
| r19 = 1.761 | d19 = 0.74 | n10 = 1.15633 | v10 = 64.2 |
| r20 = −6.350 | d20 = 0.04 | | |
| r21 = 51.743 | d21 = 0.41 | n11 = 1.48749 | v11 = 70.2 |
| r22 = −6.787 | d22 = 1.09 | | |
| G { r23 = ∞ | d23 = 1.09 | n12 = 1.51633 | v12 = 64.2 |
| r24 = ∞ | | | |

Focal Length

| Variable Separation | W 1.00 | M 3.69 | T 12.50 | Movement Parameter |
|---|---|---|---|---|
| d6 | 0.17 | 2.92 | 4.75 | a = 4.57 |
| d12 | 4.44 | 1.39 | 0.26 | b = −1.86 |
| d17 | 2.11 | 1.31 | 1.80 | c = 2.25 |

Numerical Example 2
f = 1.0–57.4   Fno = 1:1.85–2.61   2ω = 69.6°–6.4°

| r1 = 15.530 | d1 = 0.26 | n1 = 1.84666 | v1 = 23.8 |
|---|---|---|---|
| r2 = 6.129 | d2 = 0.25 | | |
| r3 = 8.956 | d3 = 0.83 | n2 = 1.69680 | v2 = 55.5 |
| r4 = −71.603 | d4 = 0.04 | | |
| r5 = 4.802 | d5 = 0.91 | n3 = 1.69680 | v3 = 55.5 |
| r6 = 43.875 | d6 = Variable | | |
| r7 = 11.125 | d7 = 0.17 | n4 = 1.77250 | v4 = 49.6 |
| r8 = 1.414 | d8 = 0.62 | | |
| r9 = −3.537 | d9 = 0.15 | n5 = 1.72000 | v5 = 50.3 |
| r10 = 2.000 | d10 = 0.22 | | |
| r11 = 2.472 | d11 = 0.52 | n6 = 1.84666 | v6 = 23.8 |
| r12 = 17.515 | d12 = Variable | | |
| r13 = (Stop) | d13 = 0.33 | | |
| *r14 = 6.400 | d14 = 0.76 | n7 = 1.58313 | v7 = 59.4 |
| r15 = −3.231 | d15 = 0.11 | | |
| r16 = −2.231 | d16 = 0.22 | n8 = 1.60342 | v8 = 38.0 |
| r17 = −2.984 | d17 = Variable | | |
| r18 = 3.942 | d18 = 0.17 | n9 = 1.84666 | v9 = 23.8 |
| r19 = 1.970 | d19 = 0.74 | n10 = 1.51633 | v10 = 64.2 |
| r20 = −6.180 | d20 = 0.22 | | |
| r21 = 66.671 | d21 = 0.41 | n11 = 1.48749 | v11 = 70.2 |
| r22 = −6.079 | d22 = 1.09 | | |
| G { r23 = ∞ | d23 = 1.09 | n12 = 1.51633 | v12 = 64.2 |
| r24 = ∞ | | | |

Focal Length

| Variable Separation | W 1.00 | M 4.85 | T 12.48 | Movement Parameter |
|---|---|---|---|---|
| d6 | 0.17 | 3.37 | 4.74 | a = 4.57 |
| d12 | 4.55 | 1.09 | 0.25 | b = −1.85 |
| d17 | 1.84 | 0.74 | 1.40 | c = 2.12 | r14: Aspheric

| k | $A_2$ | $A_3$ | $A_4$ | $A_5$ |
|---|---|---|---|---|
| 9.06137D-09 | −2.27319D-03 | 6.07584D-04 | 7.25925D-05 | 1.64596D-06 |

Numerical Example 3
f = 1.0–14.9  Fno = 1:1.85–2.85  2ω = 69.8°–5.37°

| | | |
|---|---|---|
| r1 = 14.039 | d1 = 0.26 | n1 = 1.84666  v1 = 23.8 |
| r2 = 6.203 | d2 = 0.31 | |
| r3 = 10.670 | d3 = 0.72 | n2 = 1.69680  v2 = 55.5 |
| r4 = −193.059 | d4 = 0.04 | |
| r5 = 5.180 | d5 = 1.02 | n3 = 1.69680  v3 = 55.5 |
| r6 = 138.840 | d6 = Variable | |
| r7 = 14.953 | d7 = 0.17 | n4 = 1.77250  v4 = 49.6 |
| r8 = 1.554 | d8 = 0.76 | |
| r9 = −3.460 | d9 = 0.15 | n5 = 1.69680  v5 = 55.5 |
| r10 = 2.264 | d10 = 0.22 | |
| r11 = 2.672 | d11 = 0.52 | n6 = 1.84666  v6 = 23.8 |
| r12 = 13.950 | d12 = Variable | |
| r13 = (Stop) | d13 = 0.33 | |
| *r14 = 5.361 | d14 = 0.76 | n7 = 1.58313  v7 = 59.4 |
| r15 = −3.035 | d15 = 0.03 | |
| r16 = −2.810 | d16 = 0.22 | n8 = 1.60342  v8 = 38.0 |
| r17 = −5.676 | d17 = Variable | |
| r18 = 3.741 | d18 = 0.17 | n9 = 1.84666  v9 = 23.8 |
| r19 = 1.961 | d19 = 0.74 | n10 = 1.51823  v10 = 59.0 |
| r20 = −6.840 | d20 = 0.22 | |
| r21 = 25.641 | d21 = 0.41 | n11 = 1.51823  v11 = 59.0 |
| r22 = −10.398 | d22 = 1.09 | |
| G { r23 = ∞ | d23 = 1.09 | n12 = 1.51633  v12 = 64.2 |
| r24 = ∞ | | |

Focal Length

| Variable Separation | W 1.00 | M 6.17 | T 14.88 | Movement Parameter |
|---|---|---|---|---|
| d6 | 0.17 | 3.76 | 5.30 | a = 5.12 |
| d12 | 5.37 | 0.76 | 0.25 | b = −4.90 |
| d17 | 2.54 | 1.31 | 2.20 | c = 4.91 | r14: Aspheric

| k | $A_2$ | $A_3$ | $A_4$ | $A_5$ |
|---|---|---|---|---|
| 8.59691D-09 | −2.99850D-03 | −1.31562D-04 | −6.55204D-05 | 3.93268D-05 |

Numerical Example 4
f = 1.0–12.4  Fno = 1:1.85–2.6  2ω = 69.6°–6.4°

| | | |
|---|---|---|
| r1 = 12.706 | d1 = 0.26 | n1 = 1.84666  v1 = 23.8 |
| r2 = 5.714 | d2 = 0.32 | |
| r3 = 9.950 | d3 = 0.74 | n2 = 1.69680  v2 = 55.5 |
| r4 = −132.678 | d4 = 0.04 | |
| r5 = 4.723 | d5 = 0.98 | n3 = 1.69680  v3 = 55.5 |
| r6 = 91.165 | d6 = Variable | |
| r7 = 12.228 | d7 = 0.17 | n4 = 1.77250  v4 = 49.6 |
| r8 = 1.477 | d8 = 0.57 | |
| r9 = −3.491 | d9 = 0.15 | n5 = 1.72000  v5 = 50.3 |
| r10 = 2.001 | d10 = 0.22 | |
| r11 = 2.480 | d11 = 0.52 | n6 = 1.84666  v6 = 23.8 |
| r12 = 15.996 | d12 = Variable | |
| r13 = (Stop) | d13 = 0.33 | |
| *r14 = 5.325 | d14 = 0.76 | n7 = 1.58313  v7 = 59.4 |
| r15 = −6.105 | d15 = Variable | |
| r16 = 3.998 | d16 = 0.17 | n8 = 1.84666  v8 = 23.8 |
| r17 = 1.916 | d17 = 0.74 | n9 = 1.51633  v9 = 64.2 |
| r18 = −6.045 | d18 = 0.22 | |
| r19 = −614.015 | d19 = 0.41 | n10 = 1.51633  v10 = 64.2 |
| r20 = −4.554 | d20 = 1.09 | |
| G { r21 = ∞ | d21 = 1.09 | n11 = 1.51633  v11 = 64.2 |
| r22 = ∞ | | |

Focal Length

| Variable Separation | W 1.00 | M 5.78 | T 12.42 | Movement Parameter |
|---|---|---|---|---|
| d6 | 0.17 | 3.37 | 4.74 | a = 4.56 |
| d12 | 4.46 | 0.53 | 0.26 | b = −4.35 |
| d15 | 1.90 | 0.91 | 1.57 | c = −4.71 | r14: Aspheric

| k | $A_2$ | $A_3$ | $A_4$ | $A_5$ |
|---|---|---|---|---|
| 8.95243D-09 | −6.87740D-03 | −5.87727D-04 | −2.90151D-05 | −5.62248D-06 |

Numerical Example 5
f = 1.0–12.3  Fno = 1:1.85–2.36  2ω = 71.9°–6.7°

| | | |
|---|---|---|
| r1 = 13.874 | d1 = 0.27 | n1 = 1.84666  v1 = 23.8 |
| r2 = 6.076 | d2 = 0.34 | |
| r3 = 10.228 | d3 = 0.82 | n2 = 1.69680  v2 = 55.5 |
| r4 = −111.251 | d4 = 0.05 | |
| r5 = 5.021 | d5 = 1.04 | n3 = 1.69680  v3 = 55.5 |
| r6 = 106.013 | d6 = Variable | |
| r7 = 19.187 | d7 = 0.18 | n4 = 1.77250  v4 = 49.6 |
| r8 = 1.428 | d8 = 0.67 | |
| r9 = −3.407 | d9 = 0.16 | n5 = 1.69680  v5 = 55.5 |
| r10 = 2.528 | d10 = 0.23 | |
| r11 = 2.928 | d11 = 0.54 | n6 = 1.84666  v6 = 23.8 |
| r12 = 39.425 | d12 = Variable | |
| r13 = (Stop) | d13 = 0.34 | |
| *r14 = 7.108 | d14 = 0.79 | n7 = 1.58313  v7 = 59.4 |
| r15 = −2.671 | d15 = 0.05 | |
| r16 = −2.881 | d16 = 0.23 | n8 = 1.60342  v8 = 38.0 |
| r17 = −3.766 | d17 = Variable | |
| r18 = 4.943 | d18 = 0.18 | n9 = 1.84666  v9 = 23.8 |
| r19 = 2.241 | d19 = 0.77 | n10 = 1.51633  v10 = 64.2 |
| r20 = −4.945 | d20 = 0.23 | |
| r21 = 52.382 | d21 = 0.43 | n11 = 1.51633  v11 = 64.2 |
| r22 = −6.768 | d22 = 1.13 | |
| G { r23 = ∞ | d23 = 1.13 | n12 = 1.51633  v12 = 64.2 |
| r24 = ∞ | | |

Focal Length

| Variable Separation | W 1.00 | M 5.69 | T 12.32 |
|---|---|---|---|
| d6 | 0.18 | 3.51 | 4.94 |
| d12 | 4.79 | 0.55 | 0.32 |
| d17 | 1.86 | 0.98 | 1.46 |

Movement Parameter a = 4.76
b = −4.98
c = 5.27 r14: Aspheric

| k | $A_2$ | $A_3$ | $A_4$ | $A_5$ |
|---|---|---|---|---|
| 9.81426D-09 | −3.34036D-03 | 1.57821D-04 | 1.56948D-04 | 2.20559D-05 |

Numerical Example 6 f = 1.0–12.4  Fno = 1:1.65–2.3  2ω = 70°–6.4°

| | | | |
|---|---|---|---|
| r1 = 14.220 | d1 = 0.26 | n1 = 1.84666 | ν1 = 23.8 |
| r2 = 6.045 | d2 = 0.27 | | |
| r3 = 10.123 | d3 = 0.74 | n2 = 1.69680 | ν2 = 55.5 |
| r4 = −72.250 | d4 = 0.04 | | |
| r5 = 4.488 | d5 = 1.09 | n3 = 1.69680 | ν3 = 55.5 |
| r6 = 79.500 | d6 = Variable | | |
| r7 = 21.018 | d7 = 0.17 | n4 = 1.77250 | ν4 = 49.6 |
| r8 = 1.334 | d8 = 0.57 | | |
| r9 = −3.140 | d9 = 0.15 | n5 = 1.69680 | ν5 = 55.5 |
| r10 = 2.889 | d10 = 0.22 | | |
| r11 = 3.030 | d11 = 0.52 | n6 = 1.84666 | ν6 = 23.8 |
| r12 = 110.019 | d12 = Variable | | |
| r13 = (Stop) | d13 = 0.33 | | |
| *r14 = 5.121 | d14 = 0.76 | n7 = 1.58313 | ν7 = 59.4 |
| r15 = −2.891 | d15 = 0.10 | | |
| r16 = −2.247 | d16 = 0.22 | n8 = 1.60342 | ν8 = 38.0 |
| r17 = −3.770 | d17 = Variable | | |
| r18 = 4.783 | d18 = 0.17 | n9 = 1.84666 | ν9 = 23.8 |
| r19 = 2.014 | d19 = 0.76 | n10 = 1.51823 | ν10 = 59.0 |
| r20 = −4.742 | d20 = 0.22 | | |
| r21 = 64.162 | d21 = 0.41 | n11 = 1.51823 | ν11 = 59.0 |
| r22 = −6.000 | d22 = 1.09 | | |
| G { r23 = ∞ | d23 = 1.09 | n12 = 1.51633 | ν12 = 64.2 |
| r24 = ∞ | | | |

Focal Length

| Variable Separation | W 1.00 | M 5.74 | T 12.39 |
|---|---|---|---|
| d6 | 0.17 | 3.38 | 4.75 |
| d12 | 4.68 | 0.55 | 0.26 |
| d17 | 1.51 | 0.74 | 1.38 |

Movement Parameter a = 4.57
b = −4.79
c = 4.95 r14: Aspheric

| k | A₂ | A₃ | A₄ | A₅ |
|---|---|---|---|---|
| 1.01550D-08 | −2.73450D-03 | 2.23193D-04 | 4.46818D-04 | 6.69460D-05 |

Numerical Example 7 f = 1.0–9.71  Fno = 1:1.85–2.15  2ω = 68.5°–8.0°

| | | | |
|---|---|---|---|
| r1 = 14.512 | d1 = 0.25 | n1 = 1.84666 | ν1 = 23.8 |
| r2 = 5.541 | d2 = 0.19 | | |
| r3 = 6.717 | d3 = 0.83 | n2 = 1.69680 | ν2 = 55.5 |
| r4 = −37.942 | d4 = 0.04 | | |
| r5 = 4.019 | d5 = 0.83 | n3 = 1.69680 | ν3 = 55.5 |
| r6 = 17.090 | d6 = Variable | | |
| r7 = 13.331 | d7 = 0.17 | n4 = 1.77250 | ν4 = 49.6 |
| r8 = 1.153 | d8 = 0.57 | | |
| r9 = −2.720 | d9 = 0.15 | n5 = 1.72000 | ν5 = 50.3 |
| r10 = 2.327 | d10 = 0.21 | | |
| r11 = 2.791 | d11 = 0.47 | n6 = 1.84666 | ν6 = 23.8 |
| r12 = −37.301 | d12 = Variable | | |
| r13 = (Stop) | d13 = 0.32 | | |
| *r14 = 11.911 | d14 = 0.64 | n7 = 1.58313 | ν7 = 59.4 |
| r15 = −2.871 | d15 = Variable | | |
| r16 = 9.392 | d16 = 0.17 | n8 = 1.84666 | ν8 = 23.8 |
| r17 = 2.315 | d17 = 0.72 | n9 = 1.51633 | ν9 = 64.2 |
| r18 = −3.924 | d18 = 0.21 | | |
| r19 = −23.211 | d19 = 0.51 | n10 = 1.48749 | ν10 = 70.2 |
| r20 = −2.859 | d20 = 1.06 | | |
| r21 = ∞ | d21 = 1.06 | n11 = 1.51633 | ν11 = 64.2 |

-continued

| | | | |
|---|---|---|---|
| G { r22 = ∞ | | | |

Focal Length

| Variable Separation | W 1.00 | M 4.64 | T 9.71 |
|---|---|---|---|
| d6 | 0.17 | 2.64 | 3.70 |
| d12 | 3.36 | 0.48 | 0.21 |
| d15 | 1.25 | 0.50 | 0.94 |

Movement Parameter a = 3.53
b = −2.82
c = 3.20 r14: Aspheric

| k | A₂ | A₃ | A₄ | A₅ |
|---|---|---|---|---|
| 8.39784D-09 | −1.92145D-02 | −5.20848D-04 | −1.27790D-04 | −1.84954D-05 |

Numerical Example 8 f = 1.0–7.76  Fno = 1:1.85–2.18  2ω = 69.3°–10.2°

| | | | |
|---|---|---|---|
| r1 = 11.653 | d1 = 0.26 | n1 = 1.84666 | ν1 = 23.8 |
| r2 = 5.012 | d2 = 0.29 | | |
| r3 = 8.979 | d3 = 0.65 | n2 = 1.69680 | ν2 = 55.5 |
| r4 = −42.221 | d4 = 0.04 | | |
| r5 = 3.990 | d5 = 0.70 | n3 = 1.69680 | ν3 = 55.5 |
| r6 = 76.537 | d6 = Variable | | |
| r7 = 12.126 | d7 = 0.17 | n4 = 1.77250 | ν4 = 49.6 |
| r8 = 1.393 | d8 = 0.47 | | |
| r9 = −2.895 | d9 = 0.15 | n5 = 1.72000 | ν5 = 50.3 |
| r10 = 1.780 | d10 = 0.22 | | |
| r11 = 2.323 | d11 = 0.52 | n6 = 1.84666 | ν6 = 23.8 |
| r12 = 17.726 | d12 = Variable | | |
| r13 = (Stop) | d13 = 0.32 | | |
| *r14 = 5.632 | d14 = 0.76 | n7 = 1.58313 | ν7 = 59.4 |
| r15 = −4.605 | d15 = Variable | | |
| r16 = 4.658 | d16 = 0.17 | n8 = 1.84666 | ν8 = 23.8 |
| r17 = 1.971 | d17 = 0.73 | n9 = 1.51633 | ν9 = 64.2 |
| r18 = −4.748 | d18 = 0.22 | | |
| r19 = −188.790 | d19 = 0.41 | n10 = 1.48749 | ν10 = 70.2 |
| r20 = −3.969 | d20 = 1.08 | | |
| G { r21 = ∞ | d21 = 1.08 | n11 = 1.51633 | ν11 = 64.2 |
| r22 = ∞ | | | |

Focal Length

| Variable Separation | W 1.00 | M 4.21 | T 7.76 |
|---|---|---|---|
| d6 | 0.17 | 2.44 | 3.41 |
| d12 | 3.67 | 0.73 | 0.34 |
| d15 | 1.61 | 0.93 | 0.98 |

Movement Parameter a = 3.238
b = −3.022
c = 2.929 r14: Aspheric

| k | A₂ | A₃ | A₄ | A₅ |
|---|---|---|---|---|
| 8.70217D-09 | −1.01525D-02 | −6.01863D-04 | −3.79022D-05 | −6.64041D-06 |

Numerical Example 9 f = 1.0–14.86    Fno = 1:1.85–2.85    2ω = 69.5°–5.34°

| | | | |
|---|---|---|---|
| r1 = 15.441 | d1 = 0.26 | n1 = 1.84666 | ν1 = 23.8 |
| r2 = 6.435 | d2 = 0.39 | | |
| r3 = 10.648 | d3 = 0.87 | n2 = 1.69680 | ν2 = 55.5 |
| r4 = −108.963 | d4 = 0.04 | | |
| r5 = 5.386 | d5 = 1.08 | n3 = 1.69680 | ν3 = 55.5 |
| r6 = 152.690 | d6 = Variable | | |
| r7 = 8.129 | d7 = 0.17 | n4 = 1.77250 | ν4 = 49.6 |
| r8 = 1.737 | d8 = 0.75 | | |
| r9 = −3.124 | d9 = 0.15 | n5 = 1.69680 | ν5 = 55.5 |
| r10 = 1.980 | d10 = 0.20 | | |
| r11 = 2.420 | d11 = 0.52 | n6 = 1.84666 | ν6 = 23.8 |
| r12 = 10.697 | d12 = Variable | | |
| r13 = (Stop) | d13 = 0.33 | | |
| *r14 = 4.989 | d14 = 0.76 | n7 = 1.58313 | ν7 = 59.4 |
| r15 = −3.222 | d15 = 0.05 | | |
| r16 = −2.779 | d16 = 0.22 | n8 = 1.60342 | ν8 = 38.0 |
| r17 = −5.580 | d17 = Variable | | |
| r18 = 3.673 | d18 = 0.17 | n9 = 1.84666 | ν9 = 23.8 |
| r19 = 1.910 | d19 = 0.74 | n10 = 1.51823 | ν10 = 59.0 |
| r20 = −6.098 | d20 = 0.22 | | |
| r21 = 26.442 | d21 = 0.41 | n11 = 1.51823 | ν11 = 59.0 |
| r22 = −10.127 | d22 = 1.08 | | |
| G { r23 = ∞ | d23 = 1.08 | n12 = 1.51633 | ν12 = 64.2 |
|    { r24 = ∞ | | | |

Focal Length

| Variable Separation | W 1.00 | M 6.20 | T 14.86 |
|---|---|---|---|
| d6 | 0.17 | 3.74 | 5.27 |
| d12 | 5.56 | 0.86 | 0.25 |
| d17 | 1.88 | 1.12 | 2.12 | r14: Aspheric

| k | $A_2$ | $A_3$ | $A_4$ | $A_5$ |
|---|---|---|---|---|
| 8.64909D-09 | −2.68595D-03 | −2.70202D-04 | −5.30276D-05 | 4.33160D-05 |

Numerical Example 10 f = 1.0–12.64    Fno = 1:1.85–2.85    2ω = 69.8°–3.6°

| | | | |
|---|---|---|---|
| r1 = −22.354 | d1 = 0.26 | n1 = 1.84666 | ν1 = 23.8 |
| r2 = 5.376 | d2 = 1.23 | n2 = 1.51742 | ν2 = 52.4 |
| r3 = −12.734 | d3 = 0.04 | | |
| r4 = 15.398 | d4 = 0.65 | n3 = 1.60342 | ν3 = 38.0 |
| r5 = −18.466 | d5 = 0.04 | | |
| r6 = 4.777 | d6 = 0.87 | n4 = 1.60342 | ν4 = 38.0 |
| r7 = −977.699 | d7 = Variable | | |
| r8 = 6.447 | d8 = 0.17 | n5 = 1.77250 | ν5 = 49.6 |
| r9 = 1.112 | d9 = 0.62 | | |
| r10 = −2.134 | d10 = 0.15 | n6 = 1.69680 | ν6 = 55.5 |
| r11 = 2.771 | d11 = 0.04 | | |
| r12 = 2.435 | d12 = 0.44 | n7 = 1.84666 | ν7 = 23.8 |
| r13 = −16.915 | d13 = Variable | | |
| r14 = (Stop) | d14 = 0.33 | | |
| r15 = 5.693 | d15 = 0.65 | n8 = 1.63854 | ν8 = 55.4 |
| r16 = −5.861 | d16 = 0.03 | | |
| r17 = 3.664 | d17 = 0.70 | n9 = 1.56732 | ν9 = 42.8 |
| r18 = −41.762 | d18 = 0.13 | | |
| r19 = −4.724 | d19 = 0.17 | n10 = 1.69895 | ν10 = 30.1 |
| r20 = 6.276 | d20 = Variable | | |
| r21 = 3.722 | D21 = 0.17 | n11 = 1.84666 | ν11 = 23.8 |
| r22 = 1.871 | d22 = 0.85 | n12 = 1.51633 | ν12 = 64.2 |
| r23 = −5.448 | d23 = 0.03 | | |
| r24 = 6.399 | d24 = 0.54 | n13 = 1.51633 | ν13 = 64.2 |
| r25 = −9.080 | d25 = 1.09 | | |
| r26 = ∞ | d26 = 1.09 | n14 = 1.51633 | ν14 = 64.2 |
| G { r27 = ∞ | | | |

Focal Length

| Variable Separation | W 1.00 | M 3.77 | T 12.64 |
|---|---|---|---|
| d7 | 0.17 | 2.69 | 4.37 |
| d13 | 4.48 | 1.44 | 0.28 |
| d20 | 1.73 | 0.95 | 1.92 |

Movement Parameter a = 4.20
b = −2.177
c = 2.177

Numerical Example 11 f = 1.0–11.91    Fno = 1:1.85–2.45    2ω = 71.6°–6.9°

| | | | |
|---|---|---|---|
| r1 = 33.501 | d1 = 0.27 | n1 = 1.84666 | ν1 = 23.8 |
| r2 = 6.372 | d2 = 0.30 | | |
| r3 = 10.526 | d3 = 0.96 | n2 = 1.69680 | ν2 = 55.5 |
| r4 = −22.822 | d4 = 0.05 | | |
| r5 = 5.032 | d5 = 1.00 | n3 = 1.69680 | ν3 = 55.5 |
| r6 = −1092.792 | d6 = Variable | | |
| r7 = 45.309 | d7 = 0.18 | n4 = 1.78590 | ν4 = 44.2 |
| r8 = 1.364 | d8 = 0.79 | | |
| r9 = −3.106 | d9 = 0.16 | n5 = 1.72000 | ν5 = 50.3 |
| r10 = 1.444 | d10 = 0.68 | n6 = 1.84666 | ν6 = 23.8 |
| r11 = −19.691 | d11 = Variable | | |
| r12 = (Stop) | d12 = 0.34 | | |
| *r13 = 3.664 | d13 = 0.79 | n7 = 1.58313 | ν7 = 59.4 |
| *r14 = 22.698 | d14 = Variable | | |
| r15 = 3.803 | d15 = 0.18 | n8 = 1.84666 | ν8 = 23.8 |
| r16 = 1.826 | d16 = 0.05 | | |
| r17 = 1.888 | d17 = 0.77 | n9 = 1.48749 | ν9 = 70.2 |
| r18 = −4.340 | d18 = 0.23 | | |
| r19 = 23.887 | d19 = 0.43 | n10 = 1.48749 | ν10 = 70.2 |
| r20 = −6.068 | d20 = 1.13 | | |
| G { r21 = ∞ | d21 = 1.13 | n11 = 1.51633 | ν11 = 64.2 |
|    { r22 = ∞ | | | |

Focal Length

| Variable Separation | W 1.00 | M 4.71 | T 11.91 |
|---|---|---|---|
| d6 | 0.18 | 3.49 | 4.91 |
| d11 | 4.79 | 1.21 | 0.27 |
| d14 | 1.59 | 0.73 | 1.44 |

Movement Parameter a = 4.73
b = −1.75
c = 1.955

Aspheric

| | k | $A_2$ | $A_3$ |
|---|---|---|---|
| r13: | 8.80668D-02 | −7.63064D-03 | −3.27887D-03 |
| r14: | −1.73245D-11 | −1.43526D-04 | −2.85539D-03 |

| | $A_4$ | $A_5$ |
|---|---|---|
| r13: | −3.69625D-05 | −1.61667D-03 |
| r14: | −1.45007D-03 | −8.47327D-04 |

Numerical Example 12 f = 1.0–12.4    Fno = 1:1.85–2.80    2ω = 69.8°–6.42°

| | | | |
|---|---|---|---|
| r1 = 29.149 | d1 = 0.26 | n1 = 1.84666 | v1 = 23.8 |
| r2 = 6.291 | d2 = 0.24 | | |
| r3 = 9.593 | d3 = 0.79 | n2 = 1.72000 | v2 = 50.3 |
| r4 = −29.057 | d4 = 0.04 | | |
| r5 = 4.813 | d5 = 0.82 | n3 = 1.72000 | v3 = 50.3 |
| r6 = 62.318 | d6 = Variable | | |
| r7 = 8.941 | d7 = 0.17 | n4 = 1.77250 | v4 = 49.6 |
| r8 = 1.557 | d8 = 0.65 | | |
| r9 = −3.481 | d9 = 0.15 | n5 = 1.72000 | v5 = 50.3 |
| r10 = 1.884 | d10 = 0.22 | | |
| r11 = 2.390 | d11 = 0.52 | n6 = 1.84666 | v6 = 23.8 |
| r12 = 11.855 | d12 = Variable | | |
| r13 = (Stop) | d13 = 0.33 | | |
| *r14 = 5.509 | d14 = 0.76 | n7 = 1.58313 | v7 = 59.4 |
| r15 = −4.896 | d15 = Variable | | |
| r16 = 3.075 | d16 = 0.17 | n8 = 1.84666 | v8 = 23.8 |
| r17 = 1.666 | d17 = 0.04 | | |
| r18 = 1.721 | d18 = 0.83 | n9 = 1.48749 | v9 = 70.2 |
| r19 = −3.168 | d19 = 1.09 | | |
| G { r20 = ∞ | d20 = 1.09 | n10 = 1.51633 | v10 = 64.2 |
|   { r21 = ∞ | | | |

Focal Length

| Variable Separation | W 1.00 | M 5.64 | T 12.40 |
|---|---|---|---|
| d6 | 0.17 | 3.37 | 4.75 |
| d12 | 4.69 | 0.64 | 0.26 |
| d15 | 2.28 | 1.29 | 1.99 |

R14: Aspheric

| k | $A_2$ | $A_3$ | $A_4$ | $A_5$ |
|---|---|---|---|---|
| −1.33355D-01 | −7.35256D-03 | −2.94738D-04 | −2.09849D-04 | 5.67115D-05 |

Numerical Example 13 f = 1.0–11.35    Fno = 1:1.85–2.85    2ω = 66.3°–6.6°

| | | | |
|---|---|---|---|
| r1 = 7.963 | d1 = 0.24 | n1 = 1.84666 | v1 = 23.8 |
| r2 = 4.124 | d2 = 0.26 | | |
| r3 = 7.495 | d3 = 0.54 | n2 = 1.69680 | v2 = 55.5 |
| r4 = 46.556 | d4 = 0.04 | | |
| r5 = 3.721 | d5 = 0.92 | n3 = 1.69680 | v3 = 55.5 |
| r6 = 1061.444 | d6 = Variable | | |
| r7 = 28.012 | d7 = 0.16 | n4 = 1.77250 | v4 = 49.6 |
| r8 = 1.114 | d8 = 0.51 | | |
| r9 = −2.986 | d9 = 0.14 | n5 = 1.72000 | v5 = 50.3 |
| r10 = 2.561 | d10 = 0.20 | | |
| r11 = 2.656 | d11 = 0.49 | n6 = 1.84666 | v6 = 23.8 |
| r12 = 25.461 | d12 = Variable | | |
| r13 = (Stop) | d13 = 0.31 | | |
| *r14 = 5.414 | d14 = 0.71 | n7 = 1.58313 | v7 = 59.4 |
| r15 = −3.525 | d15 = Variable | | |
| r16 = 7.565 | d16 = 0.16 | n8 = 1.84666 | v8 = 23.8 |
| r17 = 2.247 | d17 = 0.69 | n9 = 1.51633 | v9 = 64.2 |
| r18 = −4.794 | d18 = 0.20 | | |
| r19 = −179.888 | d19 = 0.39 | n10 = 1.51633 | v10 = 64.2 |
| r20 = −4.091 | d20 = 1.02 | | |
| G { r21 = ∞ | d21 = 1.02 | n11 = 1.51633 | v11 = 64.2 |
|   { r22 = ∞ | | | |

Focal Length

| Variable Separation | W 1.00 | M 5.26 | T 11.35 |
|---|---|---|---|
| d6 | 0.16 | 2.66 | 3.73 |
| d12 | 3.66 | 0.53 | 0.24 |
| d15 | 1.86 | 0.57 | 1.50 | r14: Aspheric

| k | $A_2$ | $A_3$ | $A_4$ | $A_5$ |
|---|---|---|---|---|
| 8.71673D-09 | −1.25039D-02 | −2.33316D-04 | 3.74479D-05 | −4.44092D-07 |

Numerical Example 14 f = 1.0–12.05    Fno = 1:1.85–2.51    2ω = 66°–6.2°

| | | | |
|---|---|---|---|
| r1 = 12.670 | d1 = 0.30 | n1 = 1.84666 | v1 = 23.8 |
| r2 = 5.347 | d2 = 1.36 | n2 = 1.51633 | v2 = 64.2 |
| r3 = −19.569 | d3 = 0.04 | | |
| r4 = 4.738 | d4 = 0.70 | n3 = 1.72000 | v3 = 50.3 |
| r5 = 17.689 | d5 = Variable | | |
| r6 = 12.908 | d6 = 0.16 | n4 = 1.77250 | v4 = 49.6 |
| r7 = 1.174 | d7 = 0.60 | | |
| r8 = −2.249 | d8 = 0.14 | n5 = 1.69680 | v5 = 55.5 |
| r9 = 2.823 | d9 = 0.06 | | |
| r10 = 2.539 | d10 = 0.45 | n6 = 1.84666 | v6 = 23.8 |
| r11 = −29.012 | d11 = Variable | | |
| r12 = (Stop) | d12 = 0.30 | | |
| r13 = 4.647 | d13 = 0.61 | n7 = 1.51742 | v7 = 52.4 |
| r14 = −3.964 | d14 = 0.22 | | |
| r15 = −2.404 | d15 = 0.20 | n8 = 1.77250 | v8 = 49.6 |
| r16 = −3.176 | d16 = Variable | | |
| r17 = 4.592 | d17 = 0.16 | n9 = 1.84666 | v9 = 23.8 |
| r18 = 2.128 | d18 = 0.71 | n10 = 1.51633 | v10 = 64.2 |
| r19 = −6.021 | d19 = 0.03 | | |
| r20 = 5.369 | d20 = 0.51 | n11 = 1.51633 | v11 = 64.2 |
| r21 = −15.987 | d21 = 1.01 | | |
| G { r22 = ∞ | d22 = 1.01 | n12 = 1.51633 | v12 = 64.2 |
|   { r23 = ∞ | | | |

Focal Length

| Variable Separation | W 1.00 | M 3.31 | T 12.05 |
|---|---|---|---|
| d5 | 0.16 | 2.68 | 4.36 |
| d11 | 4.40 | 1.88 | 0.20 |
| d16 | 1.98 | 0.97 | 1.27 |

Numerical Example 15 f = 1.0–12.39    Fno = 1:1.85–2.85    2ω = 69.6°–6.42°

| | | | |
|---|---|---|---|
| r1 = −18.112 | d1 = 0.26 | n1 = 1.84666 | v1 = 23.8 |
| r2 = 5.282 | d2 = 1.58 | n2 = 1.51742 | v2 = 52.4 |
| r3 = −12.525 | d3 = 0.04 | | |
| r4 = 14.996 | d4 = 0.77 | n3 = 1.60342 | v3 = 38.0 |
| r5 = −16.458 | d5 = 0.04 | | |
| r6 = 5.051 | d6 = 0.90 | n4 = 1.60342 | v4 = 38.0 |
| r7 = −126.345 | d7 = Variable | | |
| r8 = 6.555 | d8 = 0.17 | n5 = 1.77250 | v5 = 49.6 |
| r9 = 1.101 | d9 = 0.62 | | |
| r10 = −2.133 | d10 = 0.15 | n6 = 1.69680 | v6 = 55.5 |
| r11 = 2.712 | d11 = 0.07 | | |
| r12 = 2.489 | d12 = 0.43 | n7 = 1.84666 | v7 = 23.8 |
| r13 = −20.147 | d13 = Variable | | |
| r14 = 0.000 (Stop) | d14 = 0.33 | | |
| r15 = 5.804 | d15 = 0.65 | n8 = 1.63854 | v8 = 55.4 |
| r16 = −6.142 | d16 = 0.03 | | |
| r17 = 3.680 | d17 = 0.70 | n9 = 1.56732 | v9 = 42.8 |
| r18 = −45.570 | d18 = 0.34 | | |
| r19 = −4.691 | d19 = 0.17 | n10 = 1.69895 | v10 = 30.1 |
| r20 = 6.231 | d20 = Variable | | |

-continued

|  |  |  |  |
|---|---|---|---|
| r21 = 3.769 | d21 = 0.17 | n11 = 1.84666 | v11 = 23.8 |
| r22 = 1.900 | d22 = 0.85 | n12 = 1.51633 | v12 = 64.2 |
| r23 = −5.850 | d23 = 0.03 |  |  |
| r24 = 6.587 | d24 = 0.54 | n13 = 1.51633 | v13 = 64.2 |
| r25 = −9.411 | d25 = 1.09 |  |  |
| G { r26 = ∞ | d26 = 1.09 | n14 = 1.51633 | v14 = 64.2 |
| r27 = ∞ |  |  |  |

| | Focal Length | | |
|---|---|---|---|
| Variable Separation | W 1.00 | M 3.22 | T 12.39 |
| d7 | 0.17 | 2.75 | 4.47 |
| d13 | 4.62 | 2.04 | 0.33 |
| d20 | 2.26 | 1.09 | 1.83 |

Numerical Example 16
f = 1.0–12.24  Fno = 1:1.85–2.14  2ω = 69.1°–6.4°

|  |  |  |  |
|---|---|---|---|
| r1 = 15.098 | d1 = 0.26 | n1 = 1.84666 | v1 = 23.8 |
| r2 = 6.431 | d2 = 0.38 |  |  |
| r3 = 9.797 | d3 = 0.97 | n2 = 1.69680 | v2 = 55.5 |
| r4 = −60.897 | d4 = 0.04 |  |  |
| r5 = 5.005 | d5 = 1.07 | n3 = 1.69680 | v3 = 55.5 |
| r6 = 44.229 | d6 = Variable |  |  |
| r7 = 30.804 | d7 = 0.17 | n4 = 1.77250 | v4 = 49.6 |
| r8 = 1.320 | d8 = 0.62 |  |  |
| r9 = −4.992 | d9 = 0.15 | n5 = 1.72000 | v5 = 50.3 |
| r10 = 3.861 | d10 = 0.21 |  |  |
| r11 = 2.779 | d11 = 0.47 | n6 = 1.84666 | v6 = 23.8 |
| r12 = 7.241 | d12 = Variable |  |  |
| r13 = (Stop) | d13 = 0.32 |  |  |
| *r14 = 5.014 | d14 = 0.75 | n7 = 1.58313 | v7 = 59.4 |
| r15 = −7.588 | d15 = Variable |  |  |
| r16 = 3.691 | d16 = 0.17 | n8 = 1.84666 | v8 = 23.8 |
| r17 = 1.966 | d17 = 0.75 | n9 = 1.51633 | v9 = 64.2 |
| r18 = −4.661 | d18 = 0.03 |  |  |
| r19 = 23.221 | d19 = 0.54 | n10 = 1.51633 | v10 = 64.2 |
| r20 = −12.813 | d20 = 1.07 |  |  |
| G { r21 = ∞ | d21 = 1.07 | n11 = 1.51633 | v11 = 64.2 |
| r22 = ∞ |  |  |  |

| | Focal Length | | |
|---|---|---|---|
| Variable Separation | W 1.00 | M 3.25 | T 12.24 |
| d6 | 0.21 | 2.92 | 4.73 |
| d12 | 4.76 | 2.05 | 0.25 |
| d15 | 1.99 | 0.17 | 1.84 | r14: Aspheric

| k | $A_2$ | $A_3$ | $A_4$ | $A_5$ |
|---|---|---|---|---|
| 9.17642D-09 | −6.87167D-03 | −1.70574D-04 | 1.50780D-05 | −4.76785D-07 |

Numerical Example 17
f = 1.0–12.50  Fno = 1:1.85–2.61  2ω = 69.8°–6.39°

|  |  |  |  |
|---|---|---|---|
| r1 = 13.374 | d1 = 0.26 | n1 = 1.84666 | v1 = 23.8 |
| r2 = 5.879 | d2 = 0.22 |  |  |
| r3 = 8.135 | d3 = 0.77 | n2 = 1.69680 | v2 = 55.5 |
| r4 = −328.115 | d4 = 0.04 |  |  |
| r5 = 4.654 | d5 = 0.84 | n3 = 1.69680 | v3 = 55.5 |
| r6 = 32.761 | d6 = Variable |  |  |
| r7 = 14.348 | d7 = 0.17 | n4 = 1.77250 | v4 = 49.6 |
| r8 = 1.274 | d8 = 0.64 |  |  |

-continued

|  |  |  |  |
|---|---|---|---|
| r9 = −4.190 | d9 = 0.15 | n5 = 1.72000 | v5 = 50.3 |
| r10 = 2.642 | d10 = 0.24 |  |  |
| r11 = 2.735 | d11 = 0.52 | n6 = 1.84666 | v6 = 23.8 |
| r12 = 12.897 | d12 = Variable |  |  |
| r13 = ∞ (Stop) | d13 = 0.33 |  |  |
| r14 = 4.805 | d14 = 0.76 | n7 = 1.58313 | v7 = 59.4 |
| r15 = −5.572 | d15 = Variable |  |  |
| r16 = 5.229 | d16 = 0.17 | n8 = 1.84666 | v8 = 23.8 |
| r17 = 2.186 | d17 = 0.74 | n9 = 1.51633 | v9 = 64.2 |
| r18 = −5.525 | d18 = 0.22 |  |  |
| r19 = 39.747 | d19 = 0.41 | n10 = 1.48749 | v10 = 70.2 |
| r20 = −6.422 | d20 = 1.09 |  |  |
| r21 = ∞ | d21 = 1.09 | n11 = 1.51633 | v11 = 64.2 |
| r22 = ∞ |  |  |  |

| | Focal Length | | |
|---|---|---|---|
| Variable Separation | W 1.00 | M 4.77 | T 12.50 |
| d6 | 0.17 | 3.30 | 4.65 |
| d12 | 4.81 | 1.30 | 0.35 |
| d15 | 1.90 | 0.80 | 1.47 |

Movement Parameter a = 4.471
b1 = −2.770
b2 = 6.120
b3 = −8.995
b4 = 12.667
b5 = −11.400
b6 = 4.383 r14: Aspheric

| k | $A_2$ | $A_3$ | $A_4$ | $A_5$ |
|---|---|---|---|---|
| 5.656D-05 | −7.386D-03 | −1.610D-04 | 8.074D-05 | −2.159D-05 |

Numerical Example 18
f = 1.0–10.06  Fno = 1:1.85–2.24  2ω = 64.2°–7.1°

|  |  |  |  |
|---|---|---|---|
| r1 = 13.619 | d1 = 0.251 | n1 = 1.84666 | v1 = 23.8 |
| r2 = 5.474 | d2 = 0.188 |  |  |
| r3 = 6.931 | d3 = 0.817 | n2 = 1.69680 | v2 = 55.5 |
| r4 = −36.423 | d4 = 0.041 |  |  |
| r5 = 3.968 | d5 = 0.817 | n3 = 1.69680 | v3 = 55.5 |
| r6 = 17.959 | d6 = Variable |  |  |
| r7 = 13.159 | d7 = 0.167 | n4 = 1.77250 | v4 = 49.6 |
| r8 = 1.137 | d8 = 0.565 |  |  |
| r9 = −2.685 | d9 = 0.146 | n5 = 1.72000 | v5 = 50.3 |
| r10 = 2.296 | d10 = 0.209 |  |  |
| r11 = 2.754 | d11 = 0.461 | n6 = 1.84666 | v6 = 23.8 |
| r12 = −36.821 | d12 = Variable |  |  |
| r13 = (Stop) | d13 = 0.314 |  |  |
| r14 = 12.078 | d14 = 0.628 | n7 = 1.58313 | v7 = 59.4 |
| r15 = −2.911 | d15 = Variable |  |  |
| r16 = 9.271 | d16 = 0.167 | n8 = 1.84666 | v8 = 23.8 |
| r17 = 2.285 | d17 = 0.712 | n9 = 1.54633 | v9 = 64.2 |
| r18 = −3.873 | d18 = 0.209 |  |  |
| r19 = −22.913 | d19 = 0.502 | n10 = 1.48749 | v10 = 70.2 |
| r20 = −2.822 | d20 = 1.047 |  |  |
| r21 = ∞ | d21 = 1.047 | n11 = 1.51633 | v11 = 64.2 |
| r22 = ∞ |  |  |  | r8, r14: Aspheric
Aspheric Coefficients

| | K | $A_2$ | $A_3$ | $A_4$ | $A_5$ |
|---|---|---|---|---|---|
| r8 | 7.283 D-02 | −1.913 D-02 | −1.473 D-03 | −1.149 D-06 | 3.072 D-06 |
| r14 | 8.397 D-09 | −1.997 D-02 | −5.556 D-04 | −1.398 D-04 | −2.077 D-05 |

Numerical Example 19
f = 1.0–12.5  Fno = 1:1.85–2.44  2ω = 61.6°–5.7°

| | | | |
|---|---|---|---|
| r1 = 4.227 | d1 = 0.198 | n1 = 1.80518 | ν1 = 25.4 |
| r2 = 2.974 | d2 = 1.789 | n2 = 1.58913 | ν2 = 61.2 |
| r3 = −27.893 | d3 = Variable | | |
| r4 = −13.816 | d4 = 0.159 | n3 = 1.77250 | ν3 = 49.6 |
| r5 = 1.284 | d5 = 0.577 | | |
| r6 = −3.746 | d6 = 0.139 | n4 = 1.72000 | ν4 = 50.3 |
| r7 = 1.813 | d7 = 0.159 | | |
| r8 = 2.105 | d8 = 0.437 | n5 = 1.84666 | ν5 = 23.8 |
| r9 = 13.203 | d9 = Variable | | |
| r10 = (Stop) | d10 = 0.298 | | |
| r11 = 6.194 | d11 = 0.596 | n6 = 1.58313 | ν6 = 59.4 |
| r12 = −2.769 | d12 = 0.102 | | |
| r13 = −2.054 | d13 = 0.198 | n7 = 1.60342 | ν7 = 38.0 |
| r14 = −3.151 | d14 = Variable | | |
| r15 = 2.884 | d15 = 0.159 | n8 = 1.84666 | ν8 = 23.8 |
| r16 = 1.607 | d16 = 0.676 | n9 = 1.51633 | ν9 = 64.2 |
| r17 = −5.795 | d17 = 0.039 | | |
| r18 = 47.230 | d18 = 0.377 | n10 = 1.48749 | ν10 = 70.2 |
| r19 = −6.195 | d19 = 0.994 | | |
| r20 = ∞ | d20 = 0.994 | n11 = 1.51633 | ν11 = 64.2 |
| r21 = ∞ | | | | r3: Aspheric
Aspheric Coefficients

| K | $A_2$ | $A_3$ | $A_4$ | $A_5$ |
|---|---|---|---|---|
| r3 | 1.511 D+01 | −1.411 D-03 | −3.511 D-05 | −1.053 D-06 | 0 |

| Variable Separation | Focal Length W 1.00 | M 3.69 | T 12.50 |
|---|---|---|---|
| d3 | 0.16 | 2.66 | 4.33 |
| d9 | 4.05 | 1.27 | 0.23 |
| d14 | 1.83 | 1.09 | 1.40 |

Numerical Example 20
f = 1.0–10.12  Fno = 1:1.85–2.25  2ω = 64.2°–7.1°

| | | | |
|---|---|---|---|
| r1 = 14.207 | d1 = 0.251 | n1 = 1.84666 | ν1 = 23.8 |
| r2 = 5.424 | d2 = 0.188 | | |
| r3 = 6.575 | d3 = 0.816 | n2 = 1.69680 | ν2 = 55.5 |
| r4 = −37.145 | d4 = 0.041 | | |
| r5 = 3.934 | d5 = 0.816 | n3 = 1.69680 | ν3 = 55.5 |
| r6 = 16.731 | d6 = Variable | | |
| r7 = 13.143 | d7 = 0.167 | n4 = 1.77250 | ν4 = 49.6 |
| r8 = 1.136 | d8 = 0.565 | | |
| r9 = −2.681 | d9 = 0.146 | n5 = 1.72000 | ν5 = 50.3 |
| r10 = 2.294 | d10 = 0.209 | | |
| r11 = 2.751 | d11 = 0.460 | n6 = 1.84666 | ν6 = 23.8 |
| r12 = −36.774 | d12 = Variable | | |
| r13 = (Stop) | d13 = 0.313 | | |
| r14 = 12.062 | d14 = 0.627 | n7 = 1.58313 | ν7 = 59.4 |
| r15 = −2.907 | d15 = Variable | | |
| r16 = 9.259 | d16 = 0.167 | n8 = 1.84666 | ν8 = 23.8 |
| r17 = 2.282 | d17 = 0.711 | n9 = 1.51633 | ν9 = 64.2 |
| r18 = −3.868 | d18 = 0.209 | | |
| r19 = −22.883 | d19 = 0.502 | n10 = 1.48749 | ν10 = 70.2 |
| r20 = −2.818 | d20 = 1.046 | | |
| r21 = ∞ | d21 = 1.046 | n11 = 1.51633 | ν11 = 64.2 |
| r22 = ∞ | | | | r3, r14: Aspheric
Aspheric Coefficients

| | K | $A_2$ | $A_3$ | $A_4$ | $A_5$ |
|---|---|---|---|---|---|
| r3 | −1.230 D-01 | 9.955 D-05 | −4.822 D-06 | −5.351 D-07 | 1.270 D-07 |
| r14 | 8.397 D-09 | −2.005 D-02 | −5.591 D-04 | −1.411 D-04 | −2.101 D-05 |

| Variable Separation | Focal Length W 1.00 | M 4.71 | T 10.12 |
|---|---|---|---|
| d6 | 0.17 | 2.60 | 3.65 |
| d12 | 3.31 | 0.47 | 0.20 |
| d15 | 1.23 | 0.50 | 1.07 |

Numerical Example 21
f = 1.0–2.38  Fno = 1:1.85–2.6  2ω = 69.5°–6.4°

| | | | |
|---|---|---|---|
| r1 = 15.352 | d1 = 0.259 | n1 = 1.84666 | ν1 = 23.8 |
| r2 = 6.053 | d2 = 0.276 | | |
| r3 = 9.175 | d3 = 0.822 | n2 = 1.69680 | ν2 = 55.5 |
| r4 = −64.975 | d4 = 0.044 | | |
| r5 = 4.788 | d5 = 0.952 | n3 = 1.69680 | ν3 = 55.5 |
| r6 = 51.540 | d6 = Variable | | |
| r7 = 14.746 | d7 = 0.173 | n4 = 1.77250 | ν4 = 49.6 |
| r8 = 1.398 | d8 = 0.627 | | |
| r9 = −4.127 | d9 = 0.151 | n5 = 1.72000 | ν5 = 50.3 |
| r10 = 1.980 | d10 = 0.173 | | |
| r11 = 2.291 | d11 = 0.476 | n6 = 1.84666 | ν6 = 23.8 |
| r12 = 14.349 | d12 = Variable | | |
| r13 = ∞ (Stop) | d13 = 0.324 | | |
| r14 = 6.744 | d14 = 0.649 | n7 = 1.58313 | ν7 = 59.4 |
| r15 = −3.015 | d15 = 0.111 | | |
| r16 = −2.237 | d16 = 0.216 | n8 = 1.60342 | ν8 = 38.0 |
| r17 = −3.434 | d17 = Variable | | |
| r18 = 3.143 | d18 = 0.173 | n9 = 1.84666 | ν9 = 23.8 |
| r19 = 1.751 | d19 = 0.736 | n10 = 1.51633 | ν10 = 64.2 |
| r20 = −6.323 | d20 = 0.043 | | |
| r21 = 50.546 | d21 = 0.411 | n11 = 1.48749 | ν11 = 70.2 |
| r22 = −6.750 | d22 = 1.082 | | |
| r23 = ∞ | d23 = 1.082 | n12 = 1.51633 | ν12 = 64.2 |
| r24 = ∞ | | | |

| Variable Separation | Focal Length W 1.00 | M 3.68 | T 12.38 |
|---|---|---|---|
| d6 | 0.17 | 2.90 | 4.72 |
| d12 | 4.42 | 1.38 | 0.25 |
| d17 | 2.10 | 1.31 | 1.80 | r18: Aspheric

| K | $A_2$ | $A_3$ | $A_4$ | $A_5$ |
|---|---|---|---|---|
| −5.554D-08 | −1.037D-05 | −1.381D-07 | −2.999D-07 | 4.809D-06 |

Numerical Example 22
f = 1.0–12.34  Fno = 1:1.85–2.6  2ω = 69.5°–6.4°

| | | | |
|---|---|---|---|
| r1 = 15.447 | d1 = 0.261 | n1 = 1.84666 | ν1 = 23.8 |
| r2 = 6.088 | d2 = 0.277 | | |
| r3 = 9.229 | d3 = 0.827 | n2 = 1.69680 | ν2 = 55.5 |
| r4 = −65.521 | d4 = 0.044 | | |
| r5 = 4.816 | d5 = 0.958 | n3 = 1.69680 | ν3 = 55.5 |
| r6 = 51.811 | d6 = Variable | | |
| r7 = 14.835 | d7 = 0.174 | n4 = 1.77250 | ν4 = 49.6 |
| r8 = 1.405 | d8 = 0.631 | | |

-continued

| | | | |
|---|---|---|---|
| r9 = −4.151 | d9 = 0.152 | n5 = 1.72000 | ν5 = 50.3 |
| r10 = 1.991 | d10 = 0.174 | | |
| r11 = 2.304 | d11 = 0.479 | n6 = 1.84666 | ν6 = 23.8 |
| r12 = 14.433 | d12 = Variable | | |
| r13 = ∞ (Stop) | d13 = 0.326 | | |
| r14 = 6.782 | d14 = 0.653 | n7 = 1.58313 | ν7 = 59.4 |
| r15 = −3.033 | d15 = 0.112 | | |
| r16 = −2.250 | d16 = 0.217 | n8 = 1.60342 | ν8 = 38.0 |
| r17 = −3.454 | d17 = Variable | | |
| r18 = 3.161 | d18 = 0.174 | n9 = 1.84666 | ν9 = 23.8 |
| r19 = 1.761 | d19 = 0.740 | n10 = 1.51633 | ν10 = 64.2 |
| r20 = −6.360 | d20 = 0.043 | | |
| r21 = 50.816 | d21 = 0.413 | n11 = 1.48749 | ν11 = 70.2 |
| r22 = −6.790 | d22 = 1.089 | | |
| r23 = ∞ | d23 = 1.089 | n12 = 1.51633 | ν12 = 64.2 |
| r24 = ∞ | | | |

| | Focal Length | | |
|---|---|---|---|
| Variable Separation | W 1.00 | M 3.70 | T 12.34 |
| d6 | 0.17 | 2.92 | 4.75 |
| d12 | 4.44 | 1.39 | 0.26 |
| d17 | 2.00 | 1.22 | 1.68 | r22: Aspheric

| K | $A_2$ | $A_3$ | $A_4$ | $A_5$ |
|---|---|---|---|---|
| −1.857D-10 | 4.377D-07 | −1.216D-08 | −1.762D-07 | −1.076D-05 |

Numerical Example 23
f = 1.0–12.61  Fno = 1:1.85–2.85  2ω = 69.7°–6.3°

| | | | |
|---|---|---|---|
| r1 = −22.588 | d1 = 0.263 | n1 = 1.84666 | ν1 = 23.8 |
| r2 = 5.415 | d2 = 1.236 | n2 = 1.51742 | ν2 = 52.4 |
| r3 = −12.820 | d3 = 0.043 | | |
| r4 = 15.531 | d4 = 0.655 | n3 = 1.60342 | ν3 = 38.0 |
| r5 = −18.573 | d5 = 0.043 | | |
| r6 = 4.809 | d6 = 0.879 | n4 = 1.60342 | ν4 = 38.0 |
| r7 = −1056.154 | d7 = Variable | | |
| r8 = 6.484 | d8 = 0.175 | n5 = 1.77250 | ν5 = 49.6 |
| r9 = 1.119 | d9 = 0.624 | | |
| r10 = −2.148 | d10 = 0.153 | n6 = 1.69680 | ν6 = 55.5 |
| r11 = 2.789 | d11 = 0.043 | | |
| r12 = 2.450 | d12 = 0.438 | n7 = 1.84666 | ν7 = 23.8 |
| r13 = −17.004 | d13 = Variable | | |
| r14 = ∞ (Stop) | d14 = 0.328 | | |
| r15 = 5.730 | d15 = 0.657 | n8 = 1.63854 | ν8 = 55.4 |
| r16 = −5.900 | d16 = 0.032 | | |
| r17 = 3.687 | d17 = 0.701 | n9 = 1.56732 | ν9 = 42.8 |
| r18 = −42.033 | d18 = 0.127 | | |
| r19 = −4.753 | d19 = 0.175 | n10 = 1.69895 | ν10 = 30.1 |
| r20 = 6.318 | d20 = Variable | | |
| r21 = 3.747 | d21 = 0.175 | n11 = 1.84666 | ν11 = 23.8 |
| r22 = 1.883 | d22 = 0.854 | n12 = 1.51633 | ν12 = 64.2 |
| r23 = −5.485 | d23 = 0.032 | | |
| r24 = 6.441 | d24 = 0.547 | n13 = 1.51633 | ν13 = 64.2 |
| r25 = −9.142 | d25 = 1.095 | | |
| r26 = ∞ | d26 = 1.095 | n14 = 1.51633 | ν14 = 64.2 |
| r27 = ∞ | | | |

| | Focal Length | | |
|---|---|---|---|
| Variable Separation | W 1.00 | M 3.85 | T 12.61 |
| d7 | 0.18 | 2.71 | 4.40 |
| d13 | 4.51 | 1.45 | 0.28 |
| d20 | 1.53 | 0.73 | 1.72 | r21: Aspheric

| K | $A_2$ | $A_3$ | $A_4$ | $A_5$ |
|---|---|---|---|---|
| 5.836D-11 | 1.783D-08 | 3.974D-08 | 3.177D-07 | 7.568D-08 |

Numerical Example 24
f = 1.0–12.17  Fno = 1:1.85–2.80  2ω = 68.8°–6.45°

| | | | |
|---|---|---|---|
| r1 = 29.022 | d1 = 0.258 | n1 = 1.84666 | ν1 = 23.8 |
| r2 = 6.247 | d2 = 0.244 | | |
| r3 = 9.486 | d3 = 0.778 | n2 = 1.72000 | ν2 = 50.3 |
| r4 = −28.725 | d4 = 0.045 | | |
| r5 = 4.780 | d5 = 0.813 | n3 = 1.72000 | ν3 = 50.3 |
| r6 = 58.542 | d6 = Variable | | |
| r7 = 8.186 | d7 = 0.172 | n4 = 1.77250 | ν4 = 49.6 |
| r8 = 1.531 | d8 = 0.655 | | |
| r9 = −3.510 | d9 = 0.151 | n5 = 1.72000 | ν5 = 50.3 |
| r10 = 1.875 | d10 = 0.215 | | |
| r11 = 2.366 | d11 = 0.517 | n6 = 1.84666 | ν6 = 23.8 |
| r12 = 11.903 | d12 = Variable | | |
| r13 = ∞ (Stop) | d13 = 0.323 | | |
| r14 = 5.380 | d14 = 0.754 | n7 = 1.58313 | ν7 = 59.4 |
| r15 = −4.924 | d15 = Variable | | |
| r16 = 3.057 | d16 = 0.172 | n8 = 1.84666 | ν8 = 23.8 |
| r17 = 1.652 | d17 = 0.043 | | |
| r18 = 1.708 | d18 = 0.819 | n9 = 1.48749 | ν9 = 70.2 |
| r19 = −3.154 | d19 = 1.078 | | |
| r20 = ∞ | d20 = 1.078 | n10 = 1.51633 | ν10 = 64.2 |
| r21 = ∞ | | | |

| | Focal Length | | |
|---|---|---|---|
| Variable Separation | W 1.00 | M 5.61 | T 12.17 |
| d6 | 0.17 | 3.34 | 4.70 |
| d12 | 4.64 | 0.63 | 0.25 |
| d15 | 2.15 | 1.22 | 1.91 | r14: Aspheric

| K | $A_2$ | $A_3$ | $A_4$ | $A_5$ |
|---|---|---|---|---|
| −1.333D-01 | −7.818D-03 | −3.252D-04 | −2.543D-04 | 1.550D-04 | r16: Aspheric

| K | $A_2$ | $A_3$ | $A_4$ | $A_5$ |
|---|---|---|---|---|
| 1.076D-07 | 9.692D-05 | 4.234D-06 | 3.408D-05 | −6.216D-05 |

Numerical Example 25
f = 1.0–12.20  Fno = 1:1.85–2.80  2ω = 68.9°–6.4°

| | | | |
|---|---|---|---|
| r1 = 28.993 | d1 = 0.259 | n1 = 1.84666 | ν1 = 23.8 |
| r2 = 6.263 | d2 = 0.245 | | |
| r3 = 9.462 | d3 = 0.779 | n2 = 1.72000 | ν2 = 50.3 |
| r4 = −28.794 | d4 = 0.045 | | |
| r5 = 4.791 | d5 = 0.814 | n3 = 1.72000 | ν3 = 50.3 |
| r6 = 57.116 | d6 = Variable | | |
| r7 = 8.194 | d7 = 0.172 | n4 = 1.77250 | ν4 = 49.6 |
| r8 = 1.532 | d8 = 0.657 | | |
| r9 = −3.511 | d9 = 0.151 | n5 = 1.72000 | ν5 = 50.3 |
| r10 = 1.877 | d10 = 0.215 | | |
| r11 = 2.369 | d11 = 0.518 | n6 = 1.84666 | ν6 = 23.8 |
| r12 = 11.910 | d12 = Variable | | |
| r13 = ∞ (Stop) | d13 = 0.323 | | |
| r14 = 5.385 | d14 = 0.755 | n7 = 1.58313 | ν7 = 59.4 |
| r15 = −4.934 | d15 = Variable | | |
| r16 = 3.061 | d16 = 0.172 | n8 = 1.84666 | ν8 = 23.8 |
| r17 = 1.655 | d17 = 0.043 | | |
| r18 = 1.710 | d18 = 0.820 | n9 = 1.48749 | ν9 = 70.2 |
| r19 = −3.154 | d19 = 1.079 | | |
| r20 = ∞ | d20 = 1.079 | n10 = 1.51633 | ν10 = 64.2 |
| r21 = ∞ | | | |

| | Focal Length | | |
|---|---|---|---|
| Variable Separation | W 1.00 | M 5.61 | T 12.20 |
| d6 | 0.17 | 3.35 | 4.71 |
| d12 | 4.65 | 0.64 | 0.25 |

-continued

| | d15 | 2.15 | 1.23 | 1.92 |
|---|---|---|---|---| r14: Aspheric

| K | $A_2$ | $A_3$ | $A_4$ | $A_5$ |
|---|---|---|---|---|
| −1.333D-01 | −7.726D-03 | −3.190D-04 | −2.470D-04 | 1.405D-04 | r19: Aspheric

| K | $A_2$ | $A_3$ | $A_4$ | $A_5$ |
|---|---|---|---|---|
| 1.762D-08 | −3.680D-06 | −1.308D-07 | −4.692D-07 | 8.387D-05 |

Numerical Example 26
f = 1.0–12.05  Fno = 1:1.85–2.51  2ω = 66°–6.2°

| | | | |
|---|---|---|---|
| r1 = 12.670 | d1 = 0.30 | n1 = 1.84666 | ν1 = 23.8 |
| r2 = 5.347 | d2 = 1.36 | n2 = 1.51633 | ν2 = 64.2 |
| r3 = −19.569 | d3 = 0.04 | | |
| r4 = 4.738 | d4 = 0.70 | n3 = 1.72000 | ν3 = 50.3 |
| r5 = 17.689 | d5 = Variable | | |
| r6 = 12.908 | d6 = 0.16 | n4 = 1.77250 | ν4 = 49.6 |
| r7 = 1.174 | d7 = 0.60 | | |
| r8 = −2.249 | d8 = 0.14 | n5 = 1.69680 | ν5 = 55.5 |
| r9 = 2.823 | d9 = 0.06 | | |
| r10 = 2.539 | d10 = 0.45 | n6 = 1.84666 | ν6 = 23.8 |
| r11 = −29.012 | d11 = Variable | | |
| r12 = (Stop) | d12 = 0.30 | | |
| r13 = 4.647 | d13 = 0.61 | n7 = 1.51742 | ν7 = 52.4 |
| r14 = −3.964 | d14 = 0.22 | | |
| r15 = −2.404 | d15 = 0.20 | n8 = 1.77250 | ν8 = 49.6 |
| r16 = −3.176 | d16 = Variable | | |
| r17 = 4.592 | d17 = 0.16 | n9 = 1.84666 | ν9 = 23.8 |
| r18 = 2.128 | d18 = 0.71 | n10 = 1.51633 | ν10 = 64.2 |
| r19 = −6.021 | d19 = 0.03 | | |
| r20 = 5.369 | d20 = 0.51 | n11 = 1.51633 | ν11 = 64.2 |
| r21 = −15.987 | d21 = 1.01 | | |
| r22 = ∞ | d22 = 1.01 | n12 = 1.51633 | ν12 = 64.2 |
| r23 = ∞ | | | |

| | Focal Length | | |
|---|---|---|---|
| Variable Separation | W 1.00 | M 3.31 | T 12.05 |
| d5 | 0.16 | 2.68 | 4.36 |
| d11 | 4.40 | 1.88 | 0.20 |
| d16 | 1.98 | 0.97 | 1.27 |

Movement Parameter a = 4.195

Numerical Example 27
f = 1.0–12.24  Fno = 1:1.85–2.14  2ω = 69.1°–6.4°

| | | | |
|---|---|---|---|
| r1 = 15.098 | d1 = 0.26 | n1 = 1.84666 | ν1 = 23.8 |
| r2 = 6.431 | d2 = 0.38 | | |
| r3 = 9.797 | d3 = 0.97 | n2 = 1.69680 | ν2 = 55.5 |
| r4 = −60.897 | d4 = 0.04 | | |
| r5 = 5.005 | d5 = 1.07 | n3 = 1.69680 | ν3 = 55.5 |
| r6 = 44.229 | d6 = Variable | | |
| r7 = 30.804 | d7 = 0.17 | n4 = 1.77250 | ν4 = 49.6 |
| r8 = 1.320 | d8 = 0.62 | | |
| r9 = −4.992 | d9 = 0.15 | n5 = 1.72000 | ν5 = 50.3 |
| r10 = 3.861 | d10 = 0.21 | | |
| r11 = 2.779 | d11 = 0.47 | n6 = 1.84666 | ν6 = 23.8 |
| r12 = 7.241 | d12 = Variable | | |
| r13 = (Stop) | d13 = 0.32 | | |
| r14 = 5.014 | d14 = 0.75 | n7 = 1.58313 | ν7 = 59.4 |
| r15 = −7.588 | d15 = Variable | | |
| r16 = 3.691 | d16 = 0.17 | n8 = 1.84666 | ν8 = 23.8 |
| r17 = 1.966 | d17 = 0.75 | n9 = 1.51633 | ν9 = 64.2 |
| r18 = −4.661 | d18 = 0.03 | | |

-continued

| | | | |
|---|---|---|---|
| r19 = 23.221 | d19 = 0.54 | n10 = 1.51633 | ν10 = 64.2 |
| r20 = −12.813 | d20 = 1.07 | | |
| r21 = ∞ | d21 = 1.07 | n11 = 1.51633 | ν11 = 64.2 |
| r22 = ∞ | | | |

| | Focal Length | | |
|---|---|---|---|
| Variable Separation | W 1.00 | M 3.25 | T 12.24 |
| d6 | 0.21 | 2.92 | 4.73 |
| d12 | 4.76 | 2.05 | 0.25 |
| d15 | 1.99 | 1.17 | 1.84 |

Movement Parameter a = 4.513 r14: Aspheric

| K | $A_2$ | $A_3$ | $A_4$ | $A_5$ |
|---|---|---|---|---|
| 9.716D-09 | −6.871D-03 | −1.705D-04 | 1.507D-05 | −4.767D-07 |

Numerical Example 28
f = 1.0–11.35  Fno = 1:1.85–2.85  2ω = 66.3°–6.6°

| | | | |
|---|---|---|---|
| r1 = 7.963 | d1 = 0.24 | n1 = 1.84666 | ν1 = 23.8 |
| r2 = 4.124 | d2 = 0.26 | | |
| r3 = 7.495 | d3 = 0.54 | n2 = 1.69680 | ν2 = 55.5 |
| r4 = 46.556 | d4 = 0.04 | | |
| r5 = 3.721 | d5 = 0.92 | n3 = 1.69680 | ν3 = 55.5 |
| r6 = 1061.444 | d6 = Variable | | |
| r7 = 28.012 | d7 = 0.16 | n4 = 1.77250 | ν4 = 49.6 |
| r8 = 1.114 | d8 = 0.51 | | |
| r9 = −2.986 | d9 = 0.14 | n5 = 1.72000 | ν5 = 50.3 |
| r10 = 2.561 | d10 = 0.20 | | |
| r11 = 2.656 | d11 = 0.49 | n6 = 1.84666 | ν6 = 23.8 |
| r12 = 25.461 | d12 = Variable | | |
| r13 = (Stop) | d13 = 0.31 | | |
| r14 = 5.414 | d14 = 0.71 | n7 = 1.58313 | ν7 = 59.4 |
| r15 = −3.525 | d15 = Variable | | |
| r16 = 7.565 | d16 = 0.16 | n8 = 1.84666 | ν8 = 23.8 |
| r17 = 2.247 | d17 = 0.69 | n9 = 1.51633 | ν9 = 64.2 |
| r18 = −4.794 | d18 = 0.20 | | |
| r19 = −179.888 | d19 = 0.39 | n10 = 1.51633 | ν10 = 64.2 |
| r20 = −4.091 | d20 = 1.02 | | |
| r21 = ∞ | d21 = 1.02 | n11 = 1.51633 | ν11 = 64.2 |
| r22 = ∞ | | | |

| | Focal Length | | |
|---|---|---|---|
| Variable Separation | W 1.00 | M 5.26 | T 11.35 |
| d6 | 0.16 | 2.66 | 3.73 |
| d12 | 3.66 | 0.53 | 0.24 |
| d15 | 1.86 | 0.57 | 1.50 |

Movement Parameter a = 3.571
b1 = −3.367
b2 = 3.513 r14: Aspheric

| K | $A_2$ | $A_3$ | $A_4$ | $A_5$ |
|---|---|---|---|---|
| 8.716D-09 | −1.250D-02 | −2.333D-04 | 3.744D-05 | −4.440D-07 |

What is claimed is:

1. A zoom lens of the rear focus type comprising, from front to rear, a stationary first lens unit of positive refractive power, a second lens unit of negative refractive power, a stop, a third lens unit of positive refractive power and a fourth lens unit of positive refractive power, wherein during zooming from a wide-angle end to a telephoto end, said second lens unit is moved toward the image side, said third lens unit and said stop are moved in unison in a locus convex toward an object side, said fourth lens unit is moved in a locus convex toward the object side, and a spacing between said third lens unit and said fourth lens unit is varied, and wherein during focusing, said fourth lens unit is moved.

2. A zoom lens of the rear focus type according to claim 1, satisfying the following condition:

$$M_{4max}/M_{3max} > 1.2$$

where $M_{3max}$ and $M_{4max}$ are maximum values of the amounts of movement of said third lens unit and said fourth lens unit, respectively, from the wide-angle end during zooming from the wide-angle end to the telephoto end with an object at infinity.

3. A zoom lens of the rear focus type according to claim 1, satisfying the following condition:

$$2.5 < bfw/fw < 4.0$$

where bfw is a back focal distance (excluding a glass block, filter or the like) in the wide-angle end with an object at infinity, and fw is the focal length of the entire system in the wide-angle end.

4. A zoom lens of the rear focus type according to claim 1, satisfying the following condition:

$$5.7 < f_1/fw < 9.0$$

where f1 is the focal length of said first lens unit, and fw is the focal length of the entire system in the wide angle end.

* * * * *

UNITED STATES PATENT AND TRADEMARK OFFICE
CERTIFICATE OF CORRECTION

PATENT NO.  :  5,739,961
DATED       :  April 14, 1998
INVENTOR(S) :  Hiroki NAKAYAMA, et al.

It is certified that error appears in the above-identified patent and that said Letters Patent is hereby corrected as shown below:

ON THE COVER PAGE:

AT [30] Foreign Application Priority Data:

"Apr. 30, 1992" should read --Apr. 30, 1993--.

COLUMN 4:

Line 46, "becomes" should read --become--.

COLUMN 5:

Line 10, "3(c)" should read --3(C)--.
Line 64, "13(S)" should read --13(B)--.

COLUMN 8:

Line 55, "possible shallowest" should read --shallowest possible--.

COLUMN 10:

Line 8, "el" should read --e1--.
Line 32, "el" should read --e1--.

UNITED STATES PATENT AND TRADEMARK OFFICE
CERTIFICATE OF CORRECTION

PATENT NO. : 5,739,961
DATED : April 14, 1998
INVENTOR(S) : Hiroki NAKAYAMA, et al.

Page 2 of 3

It is certified that error appears in the above-identified patent and that said Letters Patent is hereby corrected as shown below:

COLUMN 11:

Line 40, "el" should read --e1--.
    Line 57, "el" should read --e1--.
    Line 61, "el" should read --e1--.

COLUMN 12:

Line 3, "el" should read --e1--.
    Line 41, "desirable," should read --desirable--.
    Line 48, "iimit" should read --limit--.

COLUMN 14:

Line 8, "in" should read --in an--.
    Line 14, "in" should read --in an--.
    Line 32, "f1" should read --$f_1$--.
    Line 33, "f2" should read --$f_2$--.

COLUMN 18:

Line 8, "el" should read --e1--.
    Line 61, "hi-concave" should read --bi-concave--.

UNITED STATES PATENT AND TRADEMARK OFFICE
CERTIFICATE OF CORRECTION

PATENT NO. : 5,739,961
DATED : April 14, 1998
INVENTOR(S) : Hiroki NAKAYAMA, et al.

It is certified that error appears in the above-identified patent and that said Letters Patent is hereby corrected as shown below:

COLUMN 19:

Line 58, "tends" should read --tend--.

COLUMN 34:

Line 52, "1.54633" should read --1.51633--.

Signed and Sealed this

Fourth Day of May, 1999

Attest:

Attesting Officer

Q. TODD DICKINSON

Acting Commissioner of Patents and Trademarks